USO11557002B2

(12) United States Patent
Mason et al.

(10) Patent No.: US 11,557,002 B2
(45) Date of Patent: Jan. 17, 2023

(54) SYSTEM AND METHOD FOR RELEVANCE SCORING OF A DIGITAL RESOURCE

(71) Applicant: BITLY, INC, New York, NY (US)

(72) Inventors: Hilary Mason, New York, NY (US); Todd Levy, New York, NY (US)

(73) Assignee: BITLY, INC., New York, NY (US)

( * ) Notice: Subject to any disclaimer, the term of this patent is extended or adjusted under 35 U.S.C. 154(b) by 0 days.

(21) Appl. No.: 16/701,939

(22) Filed: Dec. 3, 2019

(65) Prior Publication Data

US 2020/0104946 A1  Apr. 2, 2020

Related U.S. Application Data

(63) Continuation of application No. 15/483,627, filed on Apr. 10, 2017, now Pat. No. 10,504,192, which is a
(Continued)

(51) Int. Cl.
*G06Q 30/02* (2012.01)
*G06Q 50/00* (2012.01)
(Continued)

(52) U.S. Cl.
CPC ....... *G06Q 50/01* (2013.01); *G06F 16/90335* (2019.01); *G06Q 10/10* (2013.01);
(Continued)

(58) Field of Classification Search
CPC ........ G06Q 50/00; G06Q 50/01; G06Q 10/10; G06Q 30/02; G06F 16/90335
See application file for complete search history.

(56) References Cited

U.S. PATENT DOCUMENTS 6,957,224 B1 10/2005 Megiddo et al.
7,072,888 B1  7/2006 Perkins
(Continued)

FOREIGN PATENT DOCUMENTS

GB  2 510 343  8/2014

OTHER PUBLICATIONS

Adomavicius, G. et al., "Toward the Next Generation of Recommender Systems: A Survey of the State-of-the-Art and Possible Extensions," © 2005, IEEE, pp. 734-749.
(Continued)

*Primary Examiner* — James A Edwards
(74) *Attorney, Agent, or Firm* — Foley & Lardner LLP

(57) ABSTRACT

The present disclosure is directed to a method for tracking influence of a user on content shared via encoded uniform resource locator (URL) links. Measuring influence of a user may identify what level of engagement the user drives to content when the user shares content with other users, such as via encoded links. A high influencer may be a user who drives a high level of engagement with content when the user shares content. A low influencer may be a user who does not drive a high level of engagement, or otherwise drives a low level of engagement with content when the user shares content. The method may include receiving, by a server, identification of a user for each of a plurality of encoded uniform resource locator (URL) links. The server may identify a plurality of keywords from content identified by each encoded URL link. The server may determine a number of actions via a plurality of users that decoded each encoded URL link of the plurality of encoded URL links of the user. The server may store, in a profile of the user, information on the one or more keywords and the number of actions.

20 Claims, 16 Drawing Sheets

Related U.S. Application Data continuation of application No. 13/332,098, filed on Dec. 20, 2011, now Pat. No. 9,619,811.

(51) Int. Cl.
*G06F 16/903* (2019.01)
*G06Q 10/10* (2012.01)
*G06F 16/00* (2019.01)

(52) U.S. Cl.
CPC ............ *G06Q 30/02* (2013.01); *G06F 16/00* (2019.01); *G06Q 50/00* (2013.01)

(56) References Cited

U.S. PATENT DOCUMENTS

| | | | |
|---|---|---|---|
| 7,454,417 B2 | 11/2008 | Tong et al. | |
| 7,720,720 B1 | 5/2010 | Sharma et al. | |
| 8,186,572 B2 | 5/2012 | Herzig | |
| 8,271,878 B2 | 9/2012 | Kane et al. | |
| 8,281,232 B2 | 10/2012 | Vishria et al. | |
| 8,401,009 B1 | 3/2013 | Dorsey et al. | |
| 8,412,726 B2 | 4/2013 | Yan et al. | |
| 8,442,929 B2 | 5/2013 | Park et al. | |
| 8,452,772 B1 | 5/2013 | Carpio et al. | |
| 8,612,435 B2 | 12/2013 | Sambrani et al. | |
| 8,892,647 B1 | 11/2014 | Koulomzin | |
| 9,288,118 B1 | 3/2016 | Pattan | |
| 9,990,114 B1* | 6/2018 | Horton | G06Q 30/02 |
| 10,019,731 B1 | 7/2018 | Wu et al. | |
| 2002/0010625 A1 | 1/2002 | Smith et al. | |
| 2002/0178366 A1 | 11/2002 | Ofir | |
| 2003/0131045 A1 | 7/2003 | McGee et al. | |
| 2005/0097204 A1 | 5/2005 | Horowitz et al. | |
| 2005/0108299 A1* | 5/2005 | Nakajima | G06F 16/9574 |
| 2005/0262052 A1* | 11/2005 | Daniels | G06F 16/951 |
| 2006/0242554 A1* | 10/2006 | Gerace | G06Q 30/0218 |
| | | | 715/209 |
| 2007/0005587 A1 | 1/2007 | Johnson et al. | |
| 2007/0022005 A1 | 1/2007 | Hanna | |
| 2007/0027864 A1 | 2/2007 | Collins et al. | |
| 2007/0038620 A1 | 2/2007 | Ka et al. | |
| 2007/0124500 A1 | 5/2007 | Bedingfield et al. | |
| 2007/0288514 A1 | 12/2007 | Reitter et al. | |
| 2008/0065659 A1 | 3/2008 | Watanabe et al. | |
| 2008/0071774 A1 | 3/2008 | Gross | |
| 2008/0133540 A1 | 6/2008 | Hubbard et al. | |
| 2008/0147780 A1 | 6/2008 | Trevor et al. | |
| 2008/0162475 A1 | 7/2008 | Meggs et al. | |
| 2009/0138472 A1* | 5/2009 | MacLean | G06F 16/951 |
| 2009/0171968 A1 | 7/2009 | Kane et al. | |
| 2009/0327275 A1 | 12/2009 | Walker et al. | |
| 2010/0070448 A1* | 3/2010 | Omoigui | H01L 27/14647 |
| | | | 706/47 |
| 2010/0100537 A1 | 4/2010 | Druzgalski et al. | |
| 2010/0153404 A1 | 6/2010 | Ghosh et al. | |
| 2010/0205541 A1 | 8/2010 | Rapaport et al. | |
| 2010/0229045 A1 | 9/2010 | Schultz et al. | |
| 2010/0274815 A1* | 10/2010 | Vanasco | G06Q 10/107 |
| | | | 707/798 |
| 2011/0035784 A1 | 2/2011 | Jakobsson | |
| 2011/0066613 A1 | 3/2011 | Berkman et al. | |
| 2011/0082850 A1* | 4/2011 | Ball | G06F 17/30 |
| | | | 707/706 |
| 2011/0107260 A1 | 5/2011 | Park et al. | |
| 2011/0113047 A1 | 5/2011 | Guardalben | |
| 2011/0231296 A1 | 9/2011 | Gross et al. | |
| 2011/0258204 A1 | 10/2011 | Hubbard et al. | |
| 2011/0264992 A1 | 10/2011 | Vishria et al. | |
| 2011/0295878 A1 | 12/2011 | Bennett et al. | |
| 2011/0313996 A1 | 12/2011 | Strauss et al. | |
| 2011/0314007 A1 | 12/2011 | Dassa et al. | |
| 2012/0020473 A1* | 1/2012 | Mart | H04L 51/14 |
| | | | 379/265.09 |
| 2012/0023390 A1* | 1/2012 | Howes | G06F 16/986 |
| | | | 715/205 |
| 2012/0072835 A1* | 3/2012 | Gross | G06Q 10/10 |
| | | | 715/243 |
| 2012/0137224 A1 | 5/2012 | Carlsen et al. | |
| 2012/0210119 A1 | 8/2012 | Baxter et al. | |
| 2012/0260182 A1* | 10/2012 | Hansen | G06Q 10/00 |
| | | | 715/736 |
| 2012/0278428 A1 | 11/2012 | Harrison et al. | |
| 2012/0296919 A1 | 11/2012 | Sinha et al. | |
| 2012/0296920 A1 | 11/2012 | Sahni et al. | |
| 2013/0031110 A1 | 1/2013 | Bhola et al. | |
| 2013/0036191 A1 | 2/2013 | Fink et al. | |
| 2013/0046759 A1 | 2/2013 | Grady et al. | |
| 2013/0097186 A1* | 4/2013 | van Hoff | H04L 67/306 |
| | | | 707/749 |
| 2013/0104038 A1 | 4/2013 | Galper et al. | |
| 2013/0110823 A1 | 5/2013 | Su et al. | |
| 2013/0124309 A1 | 5/2013 | Traasdahl et al. | |
| 2013/0124437 A1 | 5/2013 | Pennacchiotti et al. | |
| 2014/0067825 A1 | 3/2014 | Oztaskent et al. | |
| 2014/0120864 A1 | 5/2014 | Manolarakis et al. | |
| 2014/0129733 A1 | 5/2014 | Klais | |
| 2014/0317266 A1 | 10/2014 | Fuchs et al. | |
| 2015/0019721 A1 | 1/2015 | Zinin | |
| 2016/0142858 A1 | 5/2016 | Molinet et al. | |
| 2016/0142859 A1 | 5/2016 | Molinet et al. | |
| 2016/0359945 A1 | 12/2016 | Boudville | |
| 2017/0364964 A1 | 12/2017 | Wang | |
| 2021/0266356 A1 | 8/2021 | Rizvi et al. | |

OTHER PUBLICATIONS

Burke, R. et al., "Recommender Systems: An Overview," © 2011, AAAI, pp. 13-18.

Chen, J. et al., "Short and Tweet: Experiments on Recommending Content from Information Streams," © Apr. 2010, ACM, pp. 1185-1194.

Dachis, Google URL Shortener, aka Goo.gl, Finally Gets Its Own Web Site, Sep. 30, 2010, accessed Jan. 28, 2015.

Ekstrand, M.D. et al., "Collaborative Filtering Recommender Systems," ©, Foundations & Trends in Human-Computer Interaction, pp. 81-173.

Final Office Action on U.S. Appl. No. 14/793,279 dated Jan. 24, 2018.

Final Office Action on U.S. Appl. No. 15/483,627 dated Nov. 26, 2018.

Gard, N. et al., "Personalized, Interactive Tag Recommendation for Flickr," © 2008, ACM, pp. 67-74.

Glance, N. et al., "Collaborative Document Monitoring via a Recommender System," © 2000, 8 pages.

International Preliminary Report on Patentability dated Jul. 3, 2014 in PCT Application No. PCT/US2012/059233 (10 pages).

International Search Report and Written Opinion dated Jun. 4, 2013 in PCT Application No. PCT/US2012/59233.

Karypis, G., "Evaluation of Item-Based Top-N Recommendation Algorithms," © 1999, 8 pages.

Linden, G. et al., "Amazon.com Recommendations: Item-to-Item Collaborative Filtering," © 2003, IEEE, pp. 76-80.

Nkweteyim, D.L.,"A Collaborative Filtering Approach to Predict Web Pages of Interest From Navigation Patterns of Past Users Within an Academic Website," © 2005, Ph. D Thesis, Univ. of Pittsburg, 153 pages total.

Non-Final Office Action on U.S. Appl. No. 14/793,279 dated Oct. 30, 2018.

Notice of Allowability on U.S. Appl. No. 13/332,111 dated Nov. 2, 2016.

Notice of Allowance on U.S. Appl. No. 13/332,098 dated Dec. 14, 2016.

Notice of Allowance on U.S. Appl. No. 13/332,098 dated May 25, 2016.

Notice of Allowance on U.S. Appl. No. 13/332,111 dated Oct. 18, 2016.

Notice of Allowance on U.S. Appl. No. 14/793,279 dated May 1, 2019.

(56) References Cited

OTHER PUBLICATIONS

Notice of Allowance on U.S. Appl. No. 15/483,627 dated Jul. 25, 2019.
Oard, D.W. et al.,"Implicit Feedback for Recommender Systems," © 1998, AAAI, pp. 81-83.
Office Action on U.S. Appl. No. 14/793,279 dated Jan. 24, 2018.
Office Action on U.S. Appl. No. 15/483,627 dated Apr. 26, 2018.
Popescul, A. et al., "Probabilistic Models for Unified Collaborative and Content-based Recommendation in Sparse-Data Environments," © 2001, UAI 2001, pp. 437-444.
Resnick, P. et al., "Recommender Systems," © 1997, ACM, pp. 56-58.
Romero, C. et al., "Applying Web Usage Mining for Personalizing Hyperlinks in Web-based Adaptive Educational Systems," © 2009, Elsevier, pp. 828-839.
Schafer, J.B. et al., "Collaborative Filtering Recommender Systems," © 2007, Springer-Verlag, pp. 291-324.
Sigurbjornsson, B. et al., "Flickr Tag Recommendation based on Collective Knowledge," © 2008, WWW 2008, pp. 327-336.
Su, X. et al., "A Survey of Collaborative Filtering Techniques," © 2009, Hindawi Publishing Corp., 19 pages.
Terveen, L. et al.,"Phoaks: A System for Sharing Recommendations," © 1997, ACM, pp. 59-62.
U.S. Notice of Allowance in U.S. Appl. No. 13/332,019 dated Jul. 13, 2015.
U.S. Notice of Allowance in U.S. Appl. No. 13/332,051 dated Aug. 5, 2015.
U.S. Notice of Allowance in U.S. Appl. No. 13/332,062 dated Apr. 6, 2015.
U.S. Notice of Allowance in U.S. Appl. No. 13/332,062 dated Jul. 31, 2015.
U.S. Notice of Allowance in U.S. Appl. No. 13/332,019 dated Apr. 9, 2015.
U.S. Notice of Allowance in U.S. Appl. No. 13/332,090 dated Apr. 8, 2015.
U.S. Notice of Allowance on U.S. Appl. No. 13/332,090 dated Jul. 30, 2015.
U.S. Office Action for U.S. Appl. No. 13/332,051 dated Feb. 4, 2015.
U.S. Office Action for U.S. Appl. No. 13/332,111 dated Jan. 15, 2015.
U.S. Office Action for U.S. Appl. No. 13/332,019 dated Jun. 23, 2014.
U.S. Office Action for U.S. Appl. No. 13/332,051 dated Jun. 4, 2014.
U.S. Office Action for U.S. Appl. No. 13/332,111 dated Jun. 26, 2014.
U.S. Office Action for U.S. Appl. No. 13/332,062 dated Nov. 19, 2014.
U.S. Office Action for U.S. Appl. No. 13/332,090 dated Oct. 7, 2014.
U.S. Office Action for U.S. Appl. No. 13/332,098 dated Nov. 3, 2014.
U.S. Office Action in U.S. Appl. No. 13/332,051 dated Feb. 21, 2014.
U.S. Office Action in U.S. Appl. No. 13/332,062 dated Apr. 8, 2014.
U.S. Office Action in U.S. Appl. No. 13/332,090 dated Mar. 26, 2014.
U.S. Office Action in U.S. Appl. No. 13/332,111 dated Nov. 2, 2015.
U.S. Office Action on U.S. Appl. No. 13/332,051 dated May 22, 2015.
U.S. Office Action on U.S. Appl. No. 13/332,098 dated May 4, 2015.
U.S. Office Action on U.S. Appl. No. 13/332,098 dated Dec. 3, 2015.
U.S. Office Action on U.S. Appl. No. 13/332,111 dated Jun. 2, 2016.
U.S. Office Action on U.S. Appl. No. 14/793,279 dated Jun. 28, 2017.
Wartena, C. et al., "Using Tag Co-occurrence for Recommendation," © 2009, IEEE, pp. 273-278.
Wikipedia, URL shortening, Dec. 10, 2011, accessed Jan. 28, 2015.
Notice of Allowance on U.S. Appl. No. 16/577,900 dated Aug. 18, 2020.
Notice of Allowance on U.S. Appl. No. 16/577,900 dated Oct. 8, 2020.
U.S. Office Action on U.S. Appl. No. 17/121,568 dated Sep. 16, 2021.

\* cited by examiner

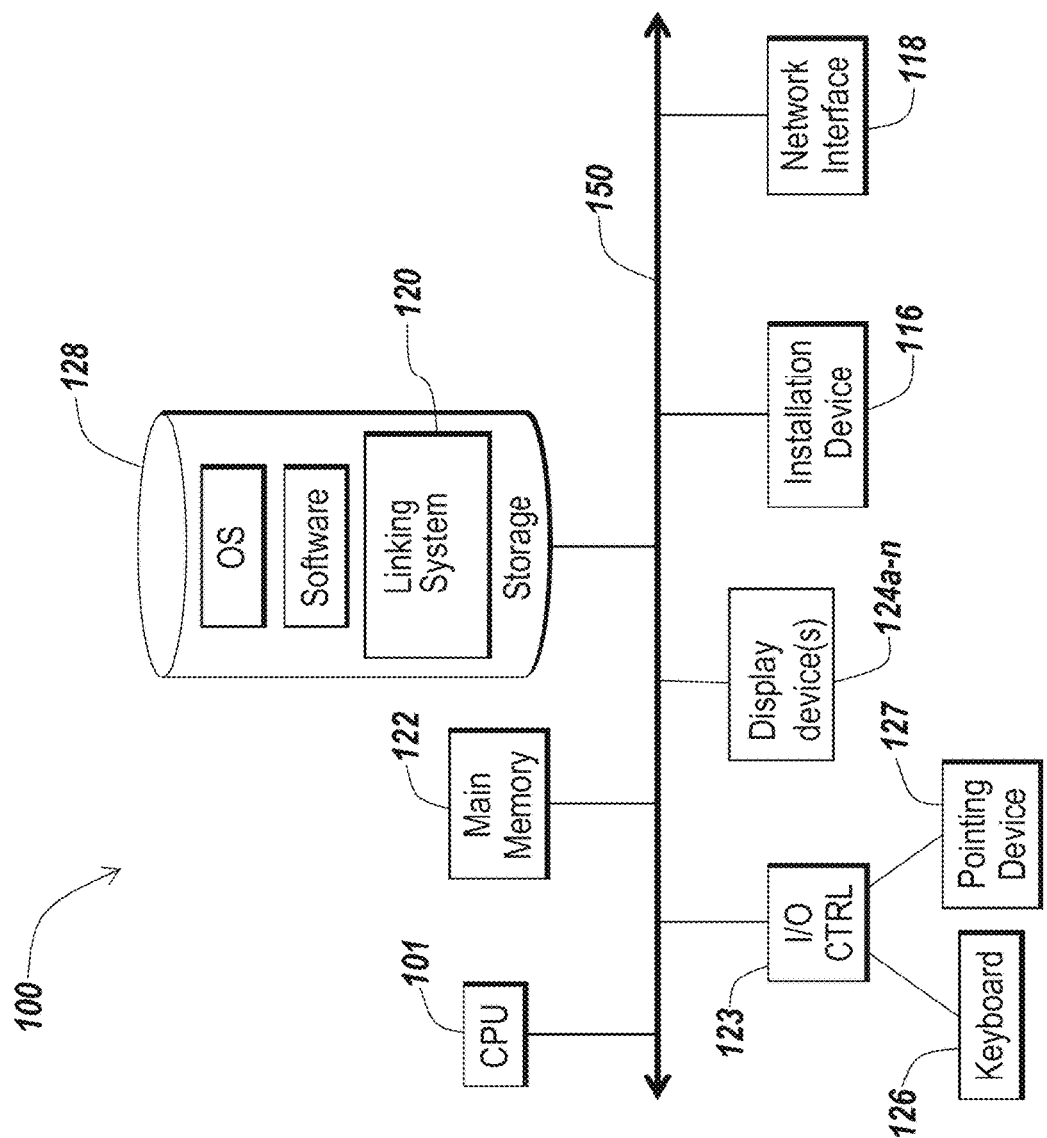

SYSTEM AND METHOD FOR RELEVANCE SCORING OF A DIGITAL RESOURCE

CROSS REFERENCE TO RELATED APPLICATIONS

The present application is a continuation application under 35 U.S.C. § 120 of U.S. patent application Ser. No. 14/483,627, filed Apr. 10, 2017, titled "SYSTEMS AND METHODS FOR INFLUENCE OF A USER ON CONTENT SHARED VIA AN ENCODED UNIFORM RESOURCE LOCATOR (URL) LINK," which is a continuation application under 35 U.S.C. § 120 of U.S. patent application Ser. No. 14/332,098, filed Dec. 20, 2011, now U.S. Pat. No. 9,619,811, issued Apr. 11, 2017, titled "SYSTEMS AND METHODS FOR INFLUENCE OF A USER ON CONTENT SHARED VIA AN ENCODED UNIFORM RESOURCE LOCATOR (URL) LINK," each of which is hereby incorporated by reference in their entirety.

FIELD OF THE INVENTION

The present application is generally directed to systems and methods for tracking and scoring user interactions with content. In particular, the present application is directed to tracking influence of a user on content shared via encoded uniform resource locator (URL) links

BACKGROUND

With the proliferation of mobile devices and mobile applications connected to the Internet and with the growth of social networking and content on the Internet in general, more and more people are sharing content with other people on a regular basis. To share content that people may like or that they think others may like, people may forward links to the content to other people via email, tweeting, texting or posting to a web-site or social networking site. Likewise, those people may in turn forward the forwarded content to other people, and so on. As a result of one person sharing content, a multitude of users may interact with the same content.

This sharing and forwarding may occur with a plurality of different content from different sources. It is challenging to identify, track and analyze the forwarding and sharing of such content via the multitude of users, devices and sources of content.

SUMMARY OF THE INVENTION

The present solution provides multiple techniques for identifying, tracking and analyzing user's interactions with content that may be shared across the Internet. Embodiments of the present solution identifies and tracks user's interactions with content, such as via clicking on shortened URLs or links that may be shared among users. One technique of the present solution provides a relevance score of a digital resource based on user's interactions with digital resources. Another technique of the present solution provides relevance search results based on user interaction with content. Another technique of the present solution identifies phrases that are trending or are temporally popular based on aggregating multiple users' interactions with an aggregate of content. Yet another technique of the present solution identifies trending phrases that are relevant to a unique user. One technique of the present solution provides for tracking influence of a user, based on engagement or clicks driven by that user on content shared by that user, such as via shortened links. Another technique of the present solution provides a recommended set of URLs given an input URL based on user interactions with a list of related URLs.

In one aspect, the present application is directed to a method for relevance scoring of a digital resource keyword based on user actions associated with a plurality of digital resources. The method scores content, URLs, domains, phrases or any entity (all of which are examples of digital resources) based on an expected relevance to an individual user which may be based on that user's previous engagement with digital resources. The method may include receiving, by a server, identification of a first plurality of actions of a user. Each of the first plurality of actions may include a click by the user on a link associated with a digital resource of a plurality of digital resources. The server may receive identification of a second plurality of actions of the user to share one or more digital resources of the plurality of digital resources. The server may identify a plurality of keywords from content of one or more digital resources of the plurality of digital resources. The server may classify patterns from the first plurality of actions, the second plurality of actions and the plurality of keywords. The server may generate, based on the pattern classification, a relevance score responsive to receiving a user identifier and a digital resource keyword.

In some embodiments, the server may receive identification of the first plurality of actions of the user comprising clicks by the user on an encoded link associated with the digital resource. The encoded link may provide a shortened version of the link to the digital resource. The server may receive identification of the first plurality of actions of the user from one or more cookies associated with the user. The server may receive identification of the second plurality of actions of the user comprising forwarding at least a portion of content of the digital resource to a second user. The server may receive identification of the second plurality of actions of the user comprising sharing at least a portion of content from the digital resource in a social networking site. The server may identify the plurality of keywords from the content based on one or more of the following: text, phrases and meta-data. The server may identify the plurality of keywords from analyzing text or phrases in media files, such as video and/or audio files.

In some embodiments, the server may classify patterns from the plurality of digital resources. The server may match the digital resource keyword to the pattern classification data of the user identified by the user identifier. The server may receive the user identifier and the digital resource keyword comprising any of the following: uniform resource locator, domain name and a phrase. The server may generate a data score identifying an amount or quality of data classified for the user. The digital resource may include any of the following: content, a web page, a uniform resource locator, a domain name and a phrase.

In another aspect, the present application is directed to a system for relevance scoring of a digital resource keyword based on user actions associated with a plurality of digital resources. The system scores content, URLs, domains, phrases or any entity (all of which are examples of digital resources) based on an expected relevance to an individual user which may be based on that user's previous engagement with digital resources. The system may include a server receiving identification of a first plurality of actions associated with digital resources and a second plurality actions of user engagement with digital resources such as via viewing of the digital resource by others to whom the user shared the digital resource. Each of the first plurality of actions may include a click by the user on a link associated with a digital resource of a plurality of digital resources. Each of the second plurality of actions of the user may include an action to share one or more digital resources of the plurality of digital resources. A content extractor may identify a plurality of keywords from content of one or more digital resources of the plurality of digital resources. A classifier may classify patterns from the first plurality of actions, the second plurality of actions and the plurality of keywords. In addition, a relevance score generator may generate, responsive to the classifier, a relevance score responsive to receiving a user identifier and a digital resource keyword.

In some embodiments, the first plurality of actions of the user includes clicks by the user on an encoded link associated with the digital resource. The encoded link may provide a shortened version of the link to the digital resource. The server may identify the first plurality of actions of the user from one or more cookies associated with the user. The second plurality of actions of the user may comprise forwarding at least a portion of content of the digital resource to a second user. The second plurality of actions of the user may include sharing at least a portion of content from the digital resource in a social networking site.

In certain embodiments, the content extractor may identify the plurality of keywords from the content based on one or more of the following: text, phrases, images and metadata. The content extractor may identify the plurality of keywords from media by analyzing text, phrases or content of media files, such as video and/or audio files. The relevance score generator may match, via the classifier, the digital resource keyword to the pattern classification data of the user identified by the user identifier. The classifier may further classify patterns from the plurality of digital resources. The relevance score generator may receive the digital resource keyword comprising any of the following: uniform resource locator, domain name and a phrase. The relevance score generator may generate a data score identifying an amount of data of the classifier for the user. The digital resource may, in some embodiments, comprise any of the following: content, a web page, a uniform resource locator, a domain name and a phrase.

In yet another aspect, the present application is directed to a method for providing search results based on user interaction with content. The method may include receiving, by a server, identification of a plurality of clicks of encoded uniform resource locator (URL) links. The server may identify, for each of the plurality of clicks, data about a user who clicked an encoded URL link and traffic data associated with a device from which the user clicked the encoded URL link. The server may store a record for each click of the plurality of clicks, the record comprising data about the user and traffic data associated with each click. The server may determine, based on the records, a relevancy score for each content identified from decoding the encoded URL links. The server may communicate, responsive to receiving a request to search content based on a keyword, a set of search results based on the keyword and the relevancy score. The search results may be based on audience segmenting parameters identified via the request, such as geography, language or other demographic parameters.

In some embodiments, the server decodes each of the encoded URL links. The server may identify data about the user from a cookie communicated via a click by the user on the encoded URL link. The server may identify traffic data comprising one or more of a browser type, a referring web site, a source internet protocol address and a destination internet protocol address. In certain embodiments, the server may determine an engagement score for each content based on a number of clicks received via one or more encoded URL links to the content. Each of the number of clicks may be weighted based on when received. The server may determine a distribution score for each content based on a number of clicks from different sources via one or more encoded URL links to the content. The server may determine a social score for each content. The server may determine a frequency normalization value for each content by extracting keywords from the content, normalizing the keywords and storing the keywords and corresponding normalization values into a database.

In certain embodiments, the server may apply a time decay function to the relevancy score based on the length of time a content has been stored in a record after being identified from decoding the encoded URL links. The server may determine the relevancy score by a combination of two or more of a social score, a distribution score, an engagement score, a frequency normalization value and a time decay function. In some embodiments, the server may order the set of search results by relevance score. Although sometimes referred to as scores, these score may be considered weights to be applied to determine the relevance score.

In still another aspect, the present application is directed to a system for providing search results based on user interaction with content. A server may receive identification of a plurality of clicks of encoded uniform resource locator (URL) links. A click tracker may identify, for each of the plurality of clicks, data about a user who clicked an encoded URL link and traffic data associated with a device from which the user clicked the encoded URL link. A database may store a record for each click of the plurality of clicks. The record may include data about the user and/or traffic data associated with each click. A relevancy scorer may determine, based on the records, a relevancy score for each content identified from decoding the encoded URL links. The server may communicate a set of search results based on the keyword and the relevancy score responsive to receiving a request to search content based on a keyword. The server may perform the search based on any audience segmentation parameters, such as a geography, language or other demographics.

In some embodiments, the server may decode each of the encoded URL links. The click tracker may identify data about the user from a cookie communicated via a click by the user on the encoded URL link. The click tracker may identify traffic data comprising one or more of a browser type, a referring web site, a source internet protocol address and a destination internet protocol address. In certain embodiments, the relevancy scorer determines a distribution score for each content based on a number of clicks from different sources via one or more encoded URL links to the content. The relevancy scorer may determine an engagement score for each content based on a number of clicks received via one or more encoded URL links to the content. Each of the number of clicks may be weighted based on when received.

In some embodiments, the relevancy scorer determines a frequency normalization value for each content by extracting keywords from the content. The relevancy scorer may normalize the keywords and may store the keywords and corresponding normalization values into a database. The relevancy scorer may apply a time decay function to the relevancy score based on the length of time a content has been stored in a record after being identified from decoding the encoded URL links. The relevancy scorer may determine the relevancy score by a combination of two or more of a distribution score, an engagement score, a frequency normalization value and a time decay function. The relevancy scorer generate and/or may order search results by relevance score.

In another aspect, the present application is directed to a method for identifying trends in phrases based on users interaction with content containing, related to or associated with the phrases. The method may identify trending or temporally popular phrases based on aggregating multiple users' interactions with an aggregate of content. The method may include receiving, by a server, identification of a plurality of clicks of encoded uniform resource locator (URL) links. The server may identify, for each of the plurality of clicks, in content identified from decoding the encoded URL links, a plurality of phrases that correspond to a predetermined set of keywords. The server may determine a velocity of clicks on content corresponding to each phrase of the plurality of phrases. The server may identify a trend in one or more phrases of the plurality of phrases based on the velocity of clicks. The server may receive identification of the plurality of clicks from a plurality of different users via a plurality of different sources.

In some embodiments, the server decodes each of the encoded URL links to obtain a URL to the content. The server may identify the plurality of phrases in the content based on one of text or meta-data in the content. The server may identify one or more phrases of the plurality of phrases in the content that deviates from a predetermined norm for the content. The server may determine velocity based on a number of clicks via one or more encoded URL links within a predetermined time period on content corresponding to a phrase. The server may determine velocity based on a rate of clicks via one or more encoded URL links to content corresponding to a phrase. The server may determine velocity based on a change in rate of clicks via one or more encoded URL links to content corresponding to a phrase. In some embodiments, the server enumerates a list of phrases from the plurality of phrases based on increasing velocity of clicks. The server may enumerate a list of phrases from the plurality of phrases based on decreasing velocity of clicks.

In yet another aspect, the present application is directed to a system for identifying trends in phrases based on users interaction with content containing, related to or associated with the phrases. The system may identify trending or temporally popular phrases based on aggregating multiple users' interactions with an aggregate of content. The system may include a server receiving identification of a plurality of clicks of encoded uniform resource locator (URL) links. A content extractor may identify, for each of the plurality of clicks, in content identified from decoding the encoded URL links, a plurality of phrases that correspond to a predetermined set of keywords. A trending engine may determine a velocity of clicks on content corresponding to each phrase of the plurality of phrases and identifying a trend in one or more phrases of the plurality of phrases based on the velocity of clicks.

In some embodiments, the server receives identification of the plurality of clicks from a plurality of different users via a plurality of different sources. The server may decode each of the encoded URL links to obtain a URL to the content. In certain embodiments, the content extractor identifies the plurality of phrases in the content based on one of text or meta-data in the content. In some embodiments, the content extractor identifies a plurality of phrases in the media content based on analyzing text or meta-data in a media file, such as video and/or audio files. The content extractor may identify one or phrases of the plurality of phrases in the content that deviates from a predetermined norm for the content. The trending engine may determine velocity based on a number of clicks via one or more encoded URL links within a predetermined time period on content corresponding to a phrase. The trending engine may determine velocity based on a rate of clicks via one or more encoded URL links to content corresponding to a phrase. The trending engine may determine velocity based on a change in rate of clicks via one or more encoded URL links to content corresponding to a phrase. The trending engine may enumerate a list of phrases from the plurality of phrases based on increasing velocity of clicks. The trending engine may enumerate a list of phrases from the plurality of phrases based on decreasing velocity of clicks.

In yet another aspect, the present application is directed to a method for identifying which phrases are trending across an aggregate of users that are relevant to a specific user. The method may include receiving, by a server, identification of a user. The server may identify a plurality of phrases that are trending upwards based on velocity of clicks to content containing, related to or associated with the plurality of phrases. The server may identify trending or temporally popular phrases based on aggregating multiple users' interactions with an aggregate of content. The server may determine a relevance score for each phrase of the plurality of phrases that are trending upwards based on identification of the user and actions of the user on content associated with each phrase, such as user clicking on content identifying or related to each phrase. The server may identify one or more phrases of the plurality of phrases based on relevance score.

In some embodiments, the server may receive identification of the user via a cookie. The server may identify the plurality of phrases that are trending upwards above a predetermined threshold. The server may identify an enumerated list of the plurality of phrases based on trending from highest to lowest. The server may determine the relevance score for each phrases based on a plurality of actions of the user to click on a link to content user on content related to or identifying each phrase. The server may determine the relevance score for each phrase based on a plurality of actions of the user to share content associated with each phrase. The server may select the one or more phrases with the highest relevance score. In some embodiments, the server selects the one or more phrases with a relevance score greater than a predetermined threshold. The server may select the one or more phrases with a relevance score greater than a first predetermined threshold and that are trending within a second predetermined threshold. The server may select content to serve the user based on the identified one or more phrases.

In yet another aspect, the present application is directed to a system for identifying phrases trending across an aggregate of user interactions that are relevant to a specific user. The system may include a server receiving identification of a user. A trending engine may identify a plurality of phrases that are trending upwards based on velocity of clicks from a plurality of user to content containing, associated with or related to the plurality of phrases. The trending engine may identify trending or temporally popular phrases based on aggregating multiple users' interactions with an aggregate of content. A relevance scorer may determine for each phrase of the plurality of phrases that are trending upwards based on identification of the user and actions of the user on content associated with or identifying each phrase, such as a user clicking on content related to each phrase. The server may identify one or more phrases of the plurality of phrases based on relevance score.

In some embodiments, the server receives identification of the user via a cookie. The trending engine may identify the plurality of phrases that are trending upwards above a predetermined threshold. The trending engine may identify the plurality of phrases that are trending based on rank ordered relative to other phrases. The trending engine may identify an enumerated list of the plurality of phrases based on trending from highest to lowest. In certain embodiments, the relevance scorer determines the relevance score for each phrase based on a plurality of actions of the user to click on a link to content relating to or identifying each phrase. The relevance scorer may determine the relevance score for each phrase for each user based on a plurality of actions of the user to share content associated with each phrase. The server may select the identified one or more phrases with the highest relevance score. The server may select the identified one or more phrases with a relevance score greater than a predetermined threshold. The server may select the identified one or more phrases with a relevance score greater than a first predetermined threshold and that are trending within a second predetermined threshold. In some embodiments, one of the server or a second server selects content to serve the user based on the identified one or more phrases.

In yet another aspect, the present application is directed to a method for tracking influence of a user on content shared via encoded uniform resource locator (URL) links. Measuring influence of a user may identify what level of engagement the user drives to content when the user shares content with other users, such as via encoded links. A high influencer may be a user who drives a high level of engagement with content when the user shares content. A low influencer may be a user who does not drive a high level of engagement, or otherwise drives a low level of engagement with content when the user shares content. The method may include receiving, by a server, identification of a user for each of a plurality of encoded uniform resource locator (URL) links. The server may identify a plurality of keywords from content identified by each encoded URL link. The server may determine a number of actions via a plurality of users that decoded each encoded URL link of the plurality of encoded URL links of the user. The server may store, in a profile of the user, information on the one or more keywords and the number of actions.

In some embodiments, the server receives one or more requests from the user to encode one or more the plurality of encoded URL links. The server may identify the user via one of a cookie or a user account with the server. The server may identify the plurality of keywords from the content identified by the decoded URL links based on one or more of the following: text, phrases and meta-data. The server may identify the plurality of keywords from media associated with or in the content identified by the decoded URL links based on analyzing text or phrases in the media file, such as video and/or audio files. The server may determine the plurality of actions of the plurality of users on the encoded URLs links from one or more cookies associated with each of the plurality of users. The server may receive identification of the plurality of actions of the plurality of users comprising forwarding by each of the plurality of the users an encoded URL link. The server may receive identification of the plurality of actions of the plurality of users comprising sharing by each of the plurality of the users an encoded URL link in one or more social networking sites. In certain embodiments, the server may receive a request for a relevance score for the user and a keyword. The server may generate the relevance score responsive to the request and one of up weighting or down weighting the relevance score based on the profile of the user. The server may generate the relevance score responsive to the request and generating the relevance score based on the profile of the user and the profiles of users who decoded the encoded URL links of the user.

In still another aspect, the present application is directed to a system for tracking influence of a user on content shared via encoded uniform resource locator (URL) links. The system may include a server receiving identification of a user for each of a plurality of encoded uniform resource locator (URL) links. A content extractor may identify a plurality of keywords from content identified by each encoded URL link. A click tracker determining a number of actions via a plurality of users that decoded each encoded URL link of the plurality of encoded URL links of the user. The server may store in a profile of the user information on the one or more keywords and the number of actions.

In certain embodiments, the server may receive one or more requests from the user to encode one or more of the plurality of encoded URL links. The server may identify the user via one of a cookie or a user account with the server. The server may identify the plurality of keywords from the content identified by the decoded URL links based on one or more of the following: text, phrases and meta-data. The server may identify the plurality of keywords from media associated with or in the content identified by the decoded URL links based on analyzing text or phrases in the media file, such as video and/or audio files. The click tracker may determine the plurality of actions of the plurality of users on the encoded URLs links from one or more cookies associated with each of the plurality of users.

In some embodiments, the plurality of actions of the plurality of users may include forwarding by each of the plurality of the users an encoded URL link. The plurality of actions of the plurality of users may include sharing by each of the plurality of the users an encoded URL link in one or more social networking sites. The server may receive a request for a relevance score for the user and a keyword. A relevance scorer may generate the relevance score responsive to the request and one of up weights or down weights the relevance score based on the profile of the user. A relevance scorer may generate, responsive to the request, the relevance score based on the profile of the user and the profiles of users who decoded the encoded URL links of the user.

In still another aspect, the present application is directed to a method for providing a recommended list of uniform resource locators (URLs) responsive to a uniform resource locator (URL). The method may include identifying, by a server, a plurality of users that clicked on an encoded uniform resource locator (URL) link corresponding to a URL. The server may identify a plurality of encoded URL links clicked by each of the plurality of users. The server may determine a number of users who clicked on each encoded URL link of the plurality of encoded URL links and also clicked on the encoded URL link. The server may enumerate, responsive a request comprising the URL, a list of URLs and their corresponding score based on the determination, each URL of the list of URLs corresponding to one of the plurality of encoded URL links.

In certain embodiments, the server may receive identification of a click of the encoded URL link from each of the plurality of users. The server may determine a decoded URL corresponding to the encoded URL link. The server may identify the user via a cookie. The server may track clicks on encoded URL links for each user of the plurality of users. The server may generate a click co-occurrence map that correlates the plurality of users that clicked on the encoded URL link. The server may generate the click co-occurrence map or co-occurrence map that correlates the plurality of users that clicked on the encoded URL link to the plurality of encoded URLs link that each of the plurality of users has clicked. The server may communicate a response to the request. The response may include the enumerated list of URLs and their corresponding score. The server may enumerate the list of URLS ordered by the number of users who clicked on the encoded URL link corresponding to the URL and clicked on the encoded URL link. The server may filter the list of URLs based on content or domain.

In another aspect, the present application is directed to a system for providing a recommended list of uniform resource locators (URLs) responsive to a uniform resource locator (URL). The system may include a server identifying a plurality of users that clicked on an encoded uniform resource locator (URL) link corresponding to a URL. A click tracker may identify a plurality of encoded URL links clicked by each of the plurality of users. A correlation engine may determine a number of users who clicked on each encoded URL link of the plurality of encoded URL links and also clicked on the encoded URL link. The server may, responsive to a request comprising the URL, enumerate a list of URLs. Each URL of the list of URLs may correspond to one of the plurality of encoded URL links.

In certain embodiments, the server may receive identification of a click of the encoded URL link from each of the plurality of users. The server may determine a decoded URL corresponding to the encoded URL link. In certain embodiments, the server identifies the user via a cookie. The click tracker may track clicks on encoded URL links for each user of the plurality of users. The correlation engine may generate a click coherency or co-occurrence map that correlates the plurality of users that clicked on the encoded URL link. The correlation engine may generate the click co-occurrence map that correlates the plurality of users that clicked on the encoded URL link to the plurality of encoded URLs link that each of the plurality of users has clicked. In certain embodiments, the server communicates a response to the request, the response comprising the enumerated list of URLs and their corresponding score.

The server may enumerate the list of URLS ordered by the number of users who clicked on the encoded URL link corresponding to the URL and clicked on the encoded URL link. The server may filter the list of URLs based on content identified by the URL.

The details of various embodiments of the invention are set forth in the accompanying drawings and the description below.

BRIEF DESCRIPTION OF DRAWINGS

The foregoing and other objects, aspects, features, and advantages of the present invention will become more apparent and better understood by referring to the following description taken in conjunction with the accompanying drawings, in which:

FIGS. 1B and 1C are block diagrams of embodiments of a computing device;

In the drawings, like reference numbers generally indicate identical, functionally similar, and/or structurally similar elements.

DETAILED DESCRIPTION

For purposes of reading the description of the various embodiments below, the following enumeration of the sections of the specification and their respective contents may be helpful:

Section A describes a network and computing environment which may be useful for practicing embodiments described herein;

Section B describes embodiments of a system to shorten, track and analyze links; Section C describes embodiments of systems and methods for relevance scoring of a digital resource;

Section D describes embodiments of systems and methods for providing search results based on user interaction with content;

Section E describes embodiments of systems and methods for identifying trends in phrases of content;

Section F describes embodiments of systems and methods for identifying trending and relevance of phrases for a user;

Section G describes embodiments of systems and methods for tracking influence of a user on content shared via encoded uniform resource locator (URL) link; and Section H describes embodiments of systems and methods for providing recommended list of uniform resource locators (URLs) responsive to a uniform resource locator (URL).

A. Network and Computing Environment

Figure 1A:
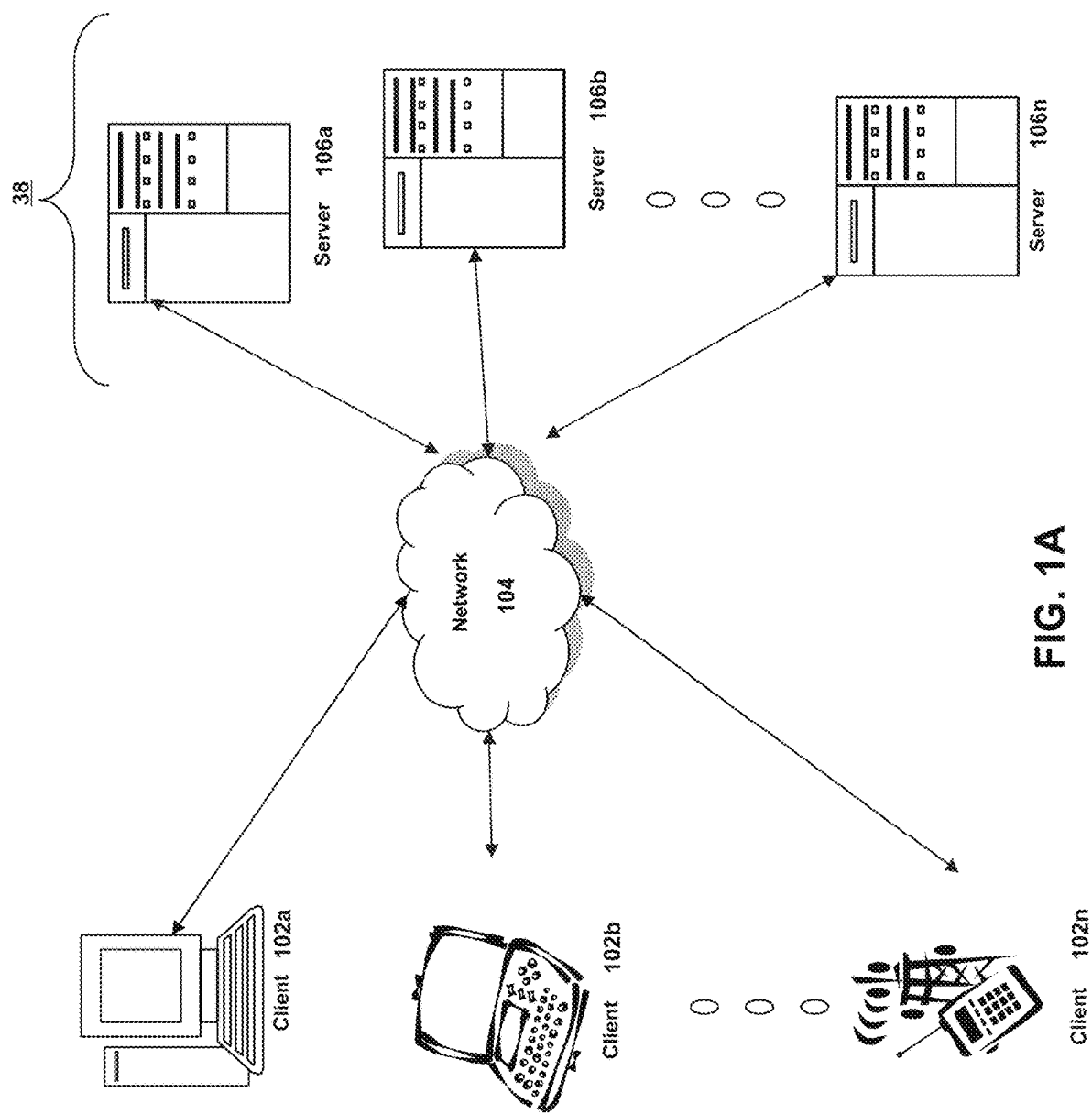
FIG. 1A is a block diagram of an embodiment of a network environment for a client to access servers.

Prior to discussing the specifics of embodiments of the systems and methods of server and/or client, it is helpful to discuss the network and computing environments in which such embodiments may be deployed. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer or virtual PC hypervisors provided by Microsoft or others.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1C:
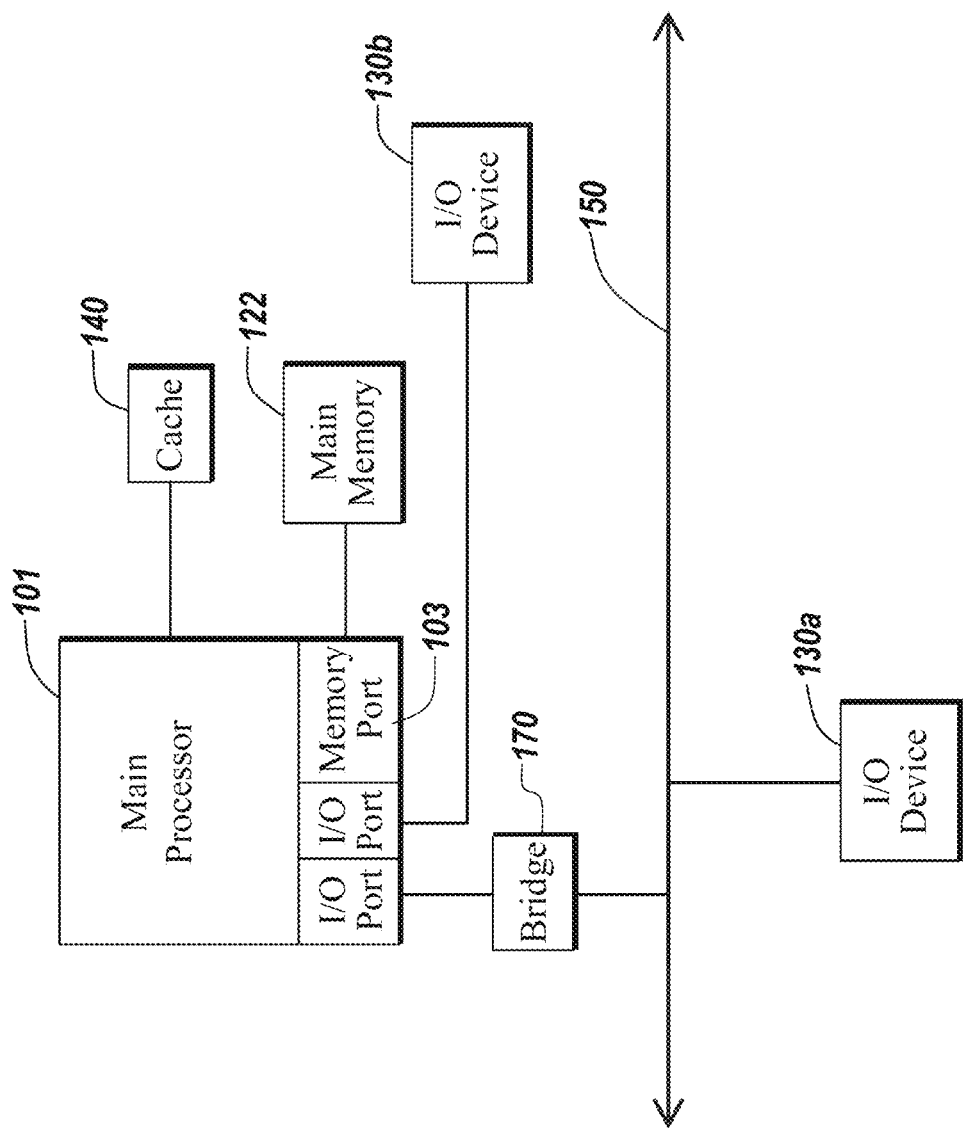

The client 102 and server 106 may be deployed as and/or executed as any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-102n, a keyboard 126 and a pointing device 127, such as a mouse. The storage device 128 may include, without limitation, an operating system, software, and software for sharing, tracking and analyzing links 120. As shown in FIG.

1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below).

FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the software 120 for sharing, tracking and analyzing links. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, WINDOWS VISTA, and WINDOWS 7, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD, IPHONE, or APPLE TV family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED, NINTENDO REVOLUTION, or a NINTENDO WII device manufactured by Nintendo Co., Ltd., of Kyoto, Japan, an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, and IPOD NANO lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudimpression opportunity layer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the communications device 102 includes a combination of devices, such as a mobile phone combined with a digital audio player or portable media player. In one of these embodiments, the communications device 102 is a smartphone, for example, an iPhone manufactured by Apple Computer, or a Blackberry device, manufactured by Research In Motion Limited. In yet another embodiment, the communications device 102 is a laptop or desktop computer equipped with a web browser and a microphone and speaker system, such as a telephony headset. In these embodiments, the communications devices 102 are web-enabled and can receive and initiate phone calls. In other embodiments, the communications device 102 is a Motorola RAZR or Motorola ROKR line of combination digital audio players and mobile phones.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. System for Shortening, Sharing and Tracking Links

Figure 2:
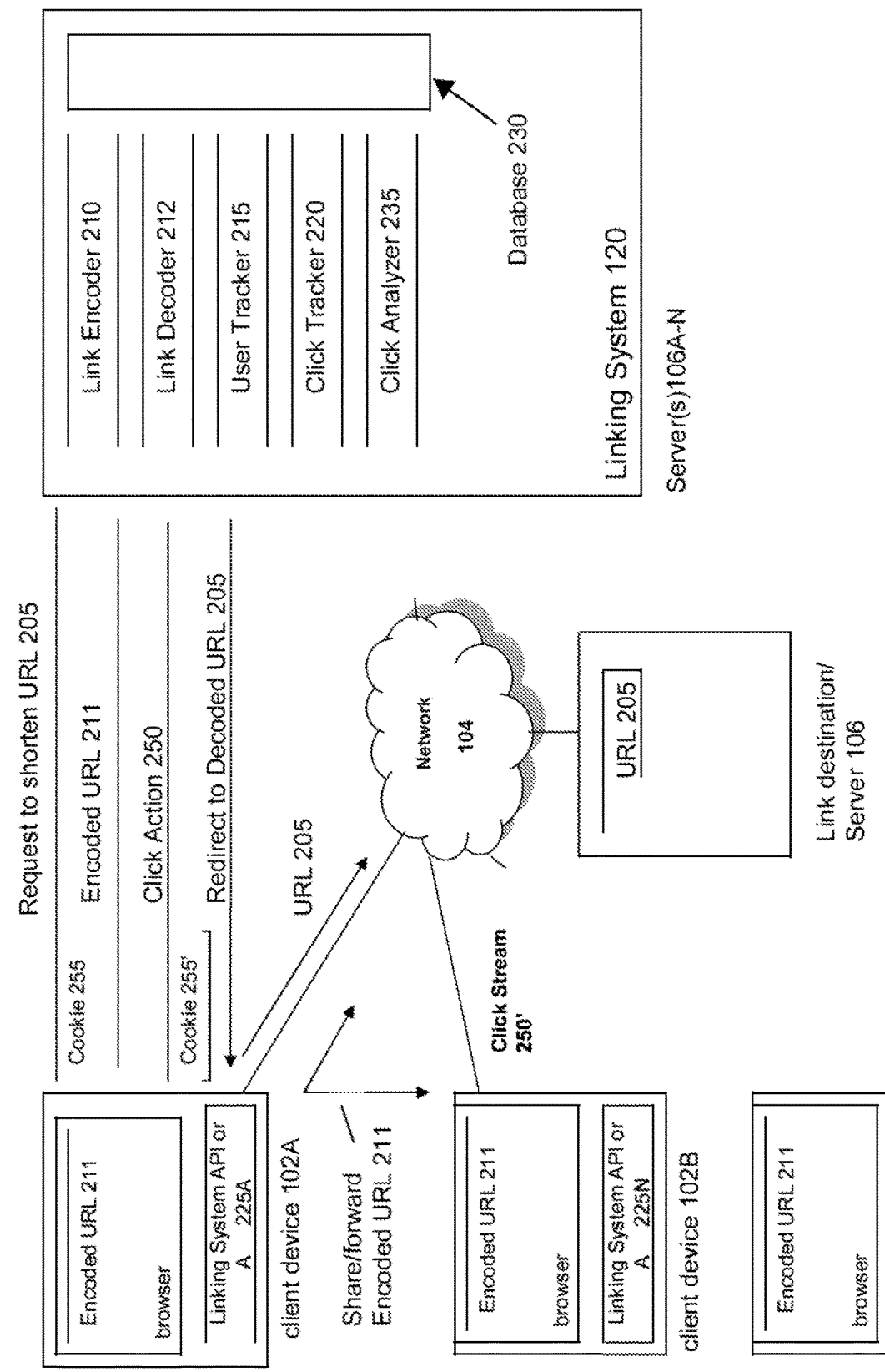
FIG. 2 is a diagram of an embodiment of a system to shorten, share and track links.

Referring now to FIG. 2, embodiments of a system 120 for shortening, sharing and tracking links is depicted. In brief overview, a linking system 120 executes on one or more server(s) 106A-N and may be accessed by a plurality of clients 102A-102N via a network 104. The linking system 120 may include a link encoder 210 that shortens a link, such as a uniform resource locator (URL) 205 to a resource on a destination server 106. The link encoder may encode (e.g., shorten) the link responsive to a request to shorten the URL 205. The client may include a link system API or application 225A-225N to interface with the linking system 120 and request to shorten the link. The request may include a cookie 255 identifying user and client information. The link encoder 210 may generate or otherwise provide an encoded URL 211 to a client. The link encoder may store in a database 230 information about the encoding of the URL and the URL 205. The user tracker 215 may track information about the user, such as via the cookie 255 and store the information in the database 230.

Via the browser of the client, a user may click on or otherwise activate 250 the encoded URL 211 which directs the browser to the linking system 120. The click action 250 may be a request to decode the URL. The click action or request thereof may include a cookie 255' which provides user and client information. The link decoder 212 may decode the encoded URL 211, such as via database 230. For example, the link decoder may perform a lookup of the URL corresponding to the shortened or encoded URL. The linking system, such as via decoder 212, may send a redirect, such as an Hypertext Transfer Protocol (HTTP) redirect (e.g., 301 redirect), to the client to the decoded URL 205. The browser of the client may access or be directed to the URL 205 of the link destination server 106. The click tracker 220 may track user actions on the encoded URL, such as when the encoded URL was clicked, from what source and by what user and store such tracking in the database 230. The click tracker and/or user tracker may track user information from the cookies 255' in connection with or associated with the click action 250. The click tracker and/or user tracker may track and store user the referrer information from the request.

A user of client 102A may share via email, web-site posting, social networking, etc. the encoded URL 211 to any one or more other users, such as users of clients 102B-102N. Any of these users may click on or activate the encoded URL 211. The plurality of click actions on the encoded URL provide a stream of requests from user click actions to decode the encoded URL, which may be generally referred to as a click stream 250'. The linking system via link decoder 212 may decode the encoded URL and redirect each of the clients to the URL 205. The user tracker and click tracker may track information on the user and the click actions of the client stream 250' in the database. The click analyzer 235 may provide metrics on the click actions of the encoded URL, such as the number of clicks, the times of clicks and the sources of the clicks.

In further details, the linking system 120 may comprise an application, program, library, process, service, script, task or any type and form of executable instructions executable or executing on a device. The linking system may operate on a plurality of servers 106A-106N. The linking system may comprise logic, function, and operations for shortening, sharing and tracking links, such as URLs. The linking system may comprise application programming interfaces, such as web services, XML, Jason (JSON), etc. for accessing the functionality, operations and/or data of the linking system. The linking system may include one or more modules, components or executables for providing these APIs and performing the function and operations described herein. For example, in some embodiments, the linking system may include a link encoder 210, a link decoder 212, a user tracker 215, a click tracker 220 and a click analyzer 235. The modules, components or executables of the linking system may operate in a client/server architecture. The modules, components or executables of the linking system may operate in a distributed manner across multiple devices.

The linking system may include, operate, communicate or interface with a linking system API or application 225A-225N (generally referred to as 225). In some embodiments, an application 225 may execute on the client that communicates with or interfaces to the linking system to encode and decode URLs. In some embodiments, an application 225 may include any portion of the linking system. In some embodiments, the application may be a mobile application, generally referred to as an app, executing on a mobile device, such as a smart phone or tablet device. In some embodiments, the application may include an add-on, extension, script, ActiveX control, applet, widget or other types and forms of executable instructions executed by or in a browser. In some embodiments, the application may include, use or call one or more APIs to the linking system. The application may be programmed to programmatically integrate the linking system, or interface thereto, into the application. Via the one or more APIs, the application may access data from the linking system. Via the one or more APIs, the application may perform or execute any of the functions or operations of the linking system. Via the one or more APIs, the application may perform or execute any of the systems and methods described herein.

The link encoder may include an application, program, library, process, service, script, task or any type and form of executable instructions for encoding a link. The link encoder may shorten a URL. The encoded URL may be referred to or be a shortened URL. Creating a shortened link may be referred to as encoding. The link encoder may shorten the URL to a predetermined string length or to a predetermined number of characters. The link encoder may shorten the URL to a length determined responsive to the length of the URL to be encoded. The link encoder may encode the URL into an encoded URL using an encoding scheme. In some embodiments, the link encoder applies a hash to the URL to generate or produce the encoded URL. In some embodiments, the encoded URL is a hash or hash code. In some embodiments, the link encoder transforms the URL using a transformation function, such as a reversible transformation function. In some embodiments, the link encoder removes a portion of the URL. In some embodiments, the link encoder rewrites a portion of the URL with a portion of another URL. In some embodiments, the link encoder encrypts the URL or a portion of the URL using one or more encryption keys. In some embodiments, the link encoder generates a unique identifier for the encoded URL in which the unique identifier uniquely identifies the URL. In some embodiments, the link encoder obfuscates information from the original URL, such as information relating to a directory structure of the server from the URL. The link encoder may encode the URL into an encoded URL that comprises a domain name hosted by or recognized by the linking system or any server thereof. The link encoder may encode the URL into an encoded URL that comprises a domain name configured, specified or identified by a user, such as a domain name of an entity that is a user of the linking system. The link encoder may encode the URL to identify a URL of the linking system, such as a landing page or intermediate page of the linking system. In some embodiments, the link encoder may encode the URL to be resolved to an intermediate URL or page of the linking system prior to being redirected by the linking system to the URL after decoding.

The link decoder may include an application, program, library, process, service, script, task or any type and form of executable instructions for decoding an encoded link. The link decoder may be designed and constructed to decode, un-shorten, generate, produce or otherwise provide the original URL corresponding to the encoded URL. Clicking on a shortened link may be referred to or called decoding. In some embodiments, the link decoder determines the URL from the encoded URL via lookup in the database. In some embodiments, the link decoder uses the encoded URL as an index to look up the URL in the database. In some embodiments, the link decoder uses the encoded URL as a hash index into a has table of the database. In some embodiments, the link decoder users the encoded URL or a portion thereof as a unique identifier to the URL stored in memory, storage of database of the linking system. In some embodiments, the link decoder uses a decoding scheme designed and constructed to perform the reverse of the encoding scheme or otherwise produce or generate the original input (e.g., the URL) to the encoding scheme. In some embodiments, the link decoder applies a reverse transformation function to the encoded URL. In some embodiments, the link decoder replaces a portion of the encoded URL with a portion of the URL. In some embodiments, the link decoder un-obfuscates information in the encoded URL to a portion of the original URL. In some embodiments, the link decoder replaces a domain name of the encoded URL with a domain name of the URL.

In some embodiments, the linking system, such as via link decoder, generates, issues or communicates a redirect responsive to receipt of an encoded URL and/or decoding the encoded URL. In some embodiments, the linking system issues any type of 3XX HTTP redirect. In HTTP, a redirect is a response with a status code beginning with a 3XX that induces a browser to go to another location. In some embodiments, the response or status code includes an annotation describing the reason, which allows for the correct subsequent action (such as changing links in the case of code 301, a permanent change of address). In some embodiments, the linking system issues a 301 type of HTTP redirect. In some embodiments, the redirect response comprises or uses a technique for making a webpage available under many URLs. In some embodiments, the linking system uses scripting for redirection. In some embodiments, the linking system uses a refresh meta tag or HTTP refresh header technique for redirection.

In some embodiments, when the user clicks on or activates the shortened link 211 the user or browser is taken to an interstitial page of the linking system, and then using an HTTP redirect page, an intermediate website of the linking system refers the user to the final destination site of URL 204. While doing so, the intermediate website may track from which website the user clicked on the short link, stores various user specific data, and notes any related cookies, or if there are no cookies, stores a new cookie on the user for the future.

A user of one device, such as client device 102, may share the encoded URL 211 with a plurality of users, such as users on client devices 102B-102N. A user or application may share the encoded URL by emailing the encoded URL to a user. A user or application may share the encoded URL by posting or publishing the encoded URL to a web-site. A user or application may share the encoded URL by posting, publishing or forwarding the encoded URL to a social networking site, such as but not limited to LinkedIn or Facebook. A user or application may share the encoded URL by texting the encoded URL. A user or application may share the encoded URL by posting or communicating the encoded URL via a communication tool, such as Skype or Instant Messenger. A user or application may share the encoded URL by serving the encoded URL in content served by a web-site. A user or application may share the encoded URL by serving the encoded URL in an advertisement or impression opportunity served by an ad server. A user or application may share the encoded URL via the linking system API or app 225, such as via a linking system bookmark applet on a browser. Any user receiving the encoded URL from any device may click on or activate the encoded URL to communicate with the linking system and be directed to the URL decoded from or corresponding to the encoded URL.

A click tracker 220 may include an application, program, library, process, service, script, task or any type and form of executable instructions for tracking actions regarding an encoded URL and/or decoding the encoded URL. In some embodiments, the click tracker identifies each instance of a user clicking on an encoded URL and tracks the number of clicks for the URL via the encoded URL in the database 230. In some embodiments, the click tracker identifies each instance of a user clicking on any of a plurality of encoded URLs that correspond to a URL and tracks the number of clicks for the URL via any encoded URL in the database 230. In some embodiments, the click tracker may identify and track via the database any temporal information regarding the clicks on the encoded URL, such as date and time of the click action 250. In some embodiments, the click tracker may identify and track via the database any source information regarding the clicks on the encoded URL, such a source internet protocol (IP) address, source port and Machine Access Control (MAC) identifier of the device from which the user clicked on the encoded URL. In some embodiments, the click tracker may identify and track via the database any header, field or other information via any application layer payload, such as the HTTP payload of the packet(s) carrying the click action or request to decode the URL. In some embodiments, the click tracker may identify and track via the database the HTTP header field of referrer to identify and track the URL or webpage from which the click action or request was referred or originated.

A user tracker 215 may include an application, program, library, process, service, script, task or any type and form of executable instructions for tracking and managing information regarding users of the linking system and/or users interacting with encoded and decoded URLs. The user tracker may include an interface, such as a web page, to have users register as users of the linking system. The user tracker may collect via registration authentication information of the user, such as a user identifier and a password. The user tracker may identify and collect information from any type and form of cookie 255. The user tracker may receive the cookie via a request to shorten a URL. The cookie may be any third-party cookie. The cookie may be a cookie generated by, provided by or tracked for the linking system. The user tracker or linking system may insert, modify or provide any data, information or attributes in the cookie for the linking system. The user tracker or linking system may include or provide a cookie 255' in communicating the redirect response for a click action that decodes the encored URL. The cookie may comprise information, data or attributes that identify the user, any user's actions, preferences of the user and/or history of user activity or behavior. The cookie may comprise information, data or attributes that identify any click actions. The cookie may comprise information, data or attributes that identify the URL and/or any encoding and/or decoding of the URL. The cookie may comprise information, data or attributes of redirection or the redirect response by the linking system. The user tracker may identify and track any user activity in encoding URLs. The user tracker may identify and track any user activity in decoding URLs. The user tracker may identify and track any user activity in sharing encoded URLs. The user tracker may store tracked information, data and attributes to the database.

In some embodiments, the click tracker comprises the user tracker or a portion thereof. In some embodiments, the user tracker comprises the click tracker or a portion thereof. In some embodiments, a tracker 215 or 220 comprises both the click tracker and user tracker. In some embodiments, the user tracker is integrated with, interfaced to or communicates with the click tracker. The user tracker and click tracker may be designed and constructed to track and store to the database information about encoding URLs, decoding URLs and clicks of encoded URLS in association with users connected to the encoding of the URLs, decoding of the URLS and clicking on the encoded URLs.

The database 230 may include an application, program, library, process, service, script, task or any type and form of executable instructions for tracking and managing information and data stored by, accessed by and/or used by the linking system or any modules or components thereof. The database may be any type and form of Structured Query Language (SQL) database. The database may be any type and form of object oriented or object based database. The database may be any type and form of in-memory or real-time memory database. The database may comprise any type and form of graphical database. The database may comprise any type and form of data warehousing and/or analytical database. The database may comprise any type and form of multi-dimensional database. The database may store any data and information from any of the functions, operations, systems and methods described herein.

A click analyzer 235 may include an application, program, library, process, service, script, task or any type and form of executable instructions for analyzing, searching and/or reporting any of the information, data and metrics stored by the linking system in the database 230. The click analyzer may include any type and form of online analytical processing (OLAP). The click analyzer may analyze click and user data stored in the database to determine a number of clicks to a URL per encoding of the URL. The click analyzer may analyze click and user data stored in the database to determine a number of clicks to a URL for all encodings of the URL across a plurality of users. The click analyzer may analyze click and user data stored in the database to determine a location of users who clicked on an encoded URL, such as what countries the clicks originated from. The click analyzer may analyze click and user data stored in the database to determine the different referring sites from which users clicked on an encoded URL. The click analyzer may analyze click and user data stored in the database to determine the different types of clients or client applications from which users clicked on an encoded URL. The click analyzer may analyze click and user data stored in the database to determine a number of clicks over a predetermined time period or a frequency of clicks. The click analyzer may analyze click and user data stored in the database to determine a number of conversations across different social media networks regarding or in connection with an encoded URL. The click analyzer may provide any data, information and/or analysis in a graphical format, such as any type and form of statistical charts or diagrams.

A plurality of users may click on 250 the same encoded URL 211. Each of these users may also click on a plurality of different encoded URLs to the same URL or to different URLs. The plurality of click actions 250 may generated and/or providing data that is tracked and stored via the linking system. The set of data resulting from a click action and/or data associated with the click and/or collected, tracked, and analyzed either statically or in real-time by the linking system may be referred to as a clickstream 250' or click stream 250'. The click stream may include any data tracked by the user tracker. The click stream may include any data tracked by the click tracker, such as any network traffic data. The click stream may include any data provided by the browser. The click stream may include any data provided via the HTTP request. The click stream may include any data analyzed by the click analyzer. The click stream may include any data traversing the linking system.

C. Systems and Methods for Scoring Digital Resources

Figure 3A:
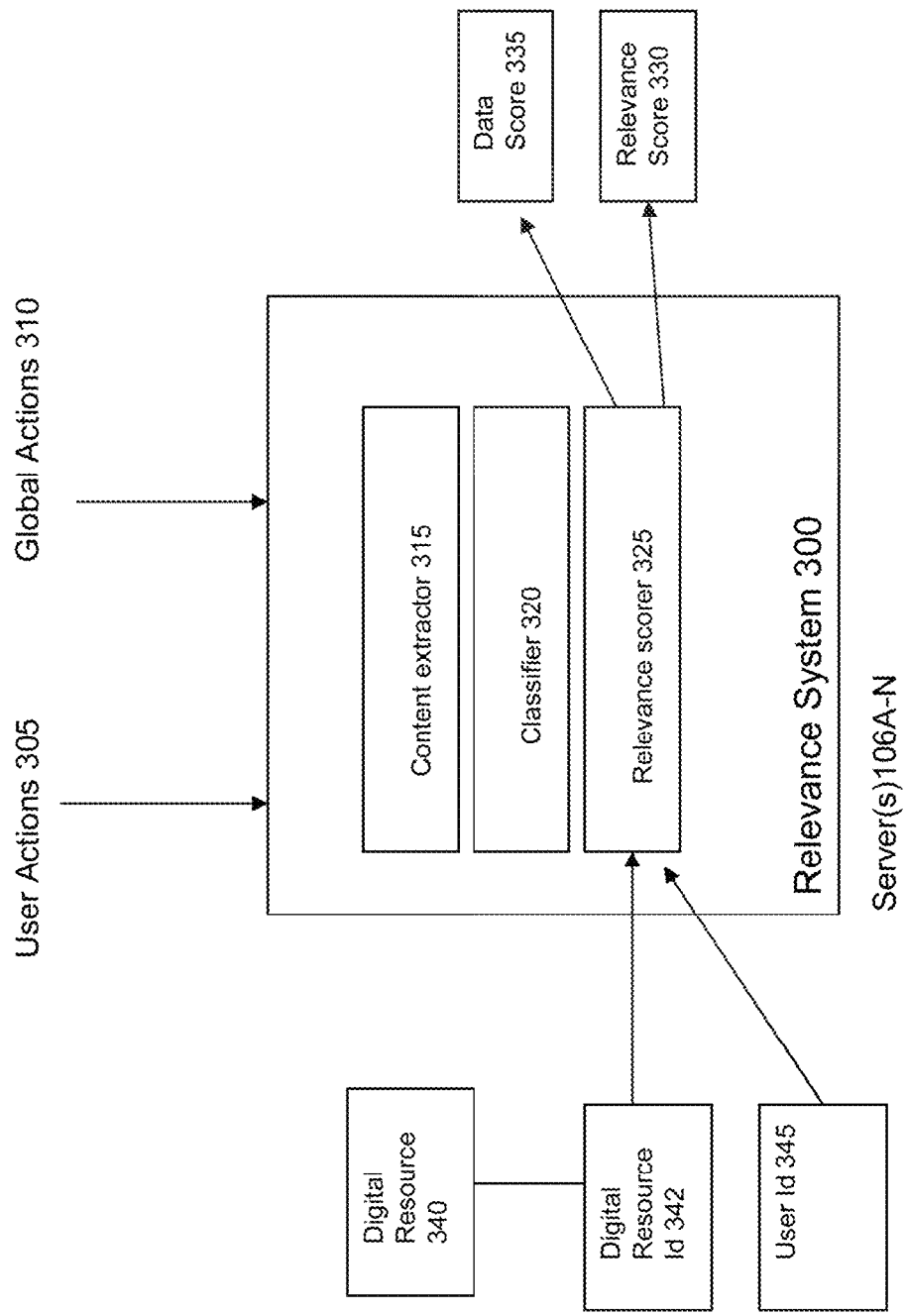
FIG. 3A is a block diagram of an embodiment of a system for relevance scoring of a digital resource.
Figure 3B:
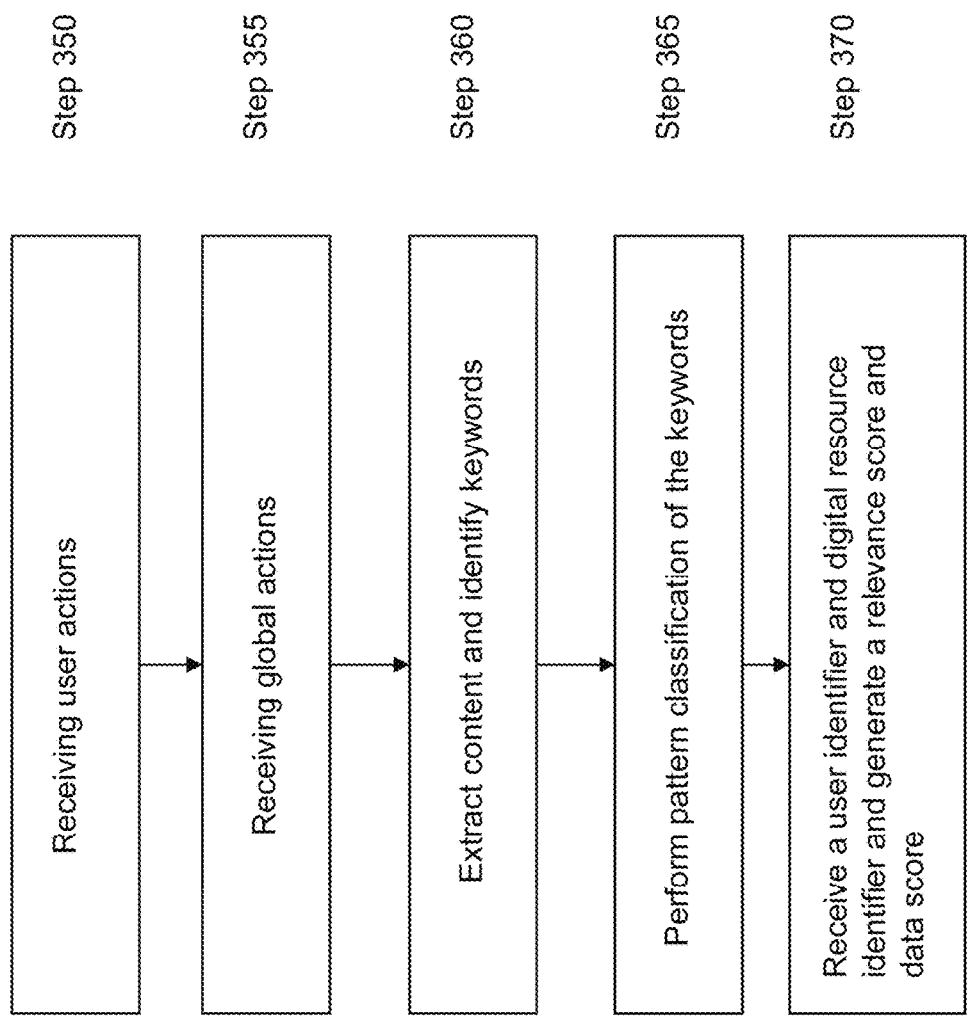
FIG. 3B is a flow diagram of an embodiment of a method for relevance scoring of a digital resource.

Referring now to FIGS. 3A and 3B, systems and methods for scoring a digital resource, such as content is depicted. These systems and methods score content, URLs, domains, phrases or any entity (all of which are examples of digital resources) based on an expected relevance to an individual user which may be based on that user's previous engagement with digital resources. Relevance is from the perspective of a user to a digital resource. By tracking what digital resources a user has interacted with and analyzing and classifying those digital resources, these systems and methods generate a score that identifies how similar a presented or identified digital resource is to other digital resources the user has engaged with For example, by tracking what content a user has clicked on, and by analyzing and classifying that content, the systems and methods of the present solution, when shown a new set of content, may generate a score determining how similar that content is to other content the user has engaged with. The relevance score produced by these systems and methods provide an indicator of relevance of identified digital resource is to a particular user.

Embodiments of the system of the present solution may take as input: (i) a list of actions associated with a given user (user actions) and (ii) a list of actions associated with entities (global actions). For user actions, the system may identify users via a cookie or a set of cookies. For example, a typical user may have actions associated with a set of cookies, all associated with an individual user. In some embodiments, a cookie-classifier can be used to associate multiple cookies with a specific individual. A list of actions associated with users may be obtained outside of cookies, such as importing web logs or user activity databases. Global actions may include sharing a link, or sharing a piece of content. Typical examples may include a user forwarding a link via email to another user (e.g., the link is the entity, the forwarding is the action). In another example, a global action may include sharing a paragraph of content on a social media platform like a Facebook update (e.g., the update content is the entity, and "shared on Facebook" is the action). Embodiments of the system of the present solution may use click stream 250' data.

In example operation, the system processes the global actions through a content extractor, which extracts meta-data, phrases, keywords that are specific to the entity. The system may provide the global actions and extracted content as input to a pattern classifier. The system may also provide user actions to the pattern classifier. The pattern classifier may classify the global actions, the user actions and the extracted content into a plurality of classes that is stored by the system. The system may receive a request to score a digital resource for a specific user. For example the digital resource may include piece of data, a keyword, phrase, URL, or domain name, and the user may be identified by a user ID such as the user's cookie ID. The system matches the digital resource and user identifier with the classified data from the classifier, and the output is a content or relevance score and a data score. The relevance score indentifies how closely the digital resource (e.g., new piece of data) matches the digital resources associated with that user. The data score estimates or identified how valid the relevance score is. The data score may be based on how much data was associated with the intersection of the user action and the global actions.

Referring now to FIG. 3A, an embodiment of a system for scoring digital resources 340 is depicted. In brief overview, embodiments of the linking system 120 may receive or obtain user actions 305 and global actions 310, such as via a click stream 250'. The linking system may include a content extractor 315 to identify keywords, meta-data and phrases from content identified by any of the user actions and/or the global actions. The linking system may include a classifier 320 that classifies patterns from the user actions, global actions and the keywords, meta-data and/or phrases from the content extractor. A relevance scorer 325 receives a request to generate a score for a user id 345 and a digital resource identifier 342 that identifies a digital resource 240. The relevance scorer matches the user id and digital resource identifier via the classification data of the classifier and generates a relevance score 330 to identify the relevance of the identified digital resource for the identified user based on what digital resources the user has previously interacted with. The relevance scorer may generate a data score that identifies or estimates the validity or quality of the relevance score.

In further details, a digital resource 340 may comprise any type and form of electronic, digital or web based resource (sometimes referred to as an entity or digital entity). The digital resource may be a domain name. The digital resource may be a web-site. The digital resource may be a URL. The digital resource may be an encoded URL. The digital resource may be a web page. The digital resource may be a keyword in digital content. The digital resource may be a phrase in electronic content. The digital resource may be meta-data in or of digital content. The digital resource may be digital content. The digital resource may be a file. The digital resource may be a portion, copy or snippet of digital content or a file. The digital resource may be an advertisement. The digital resource may be a text or SMS message. The digital resource may be an email. The digital resource may be an IM or chat message. The digital resource may be an IP based audio and/or video communication. The digital resource may be a posting on a web-site. The digital resource may be a discussion or conversation, or portion thereof, on a web-site. The digital resource may be a message, posting or content on a social networking site. The digital resource may be digital audio, such as an audio file. The digital resource may be music or music file. The digital resource may be a video. The digital resource may be an image. The digital resource may be a graphic file. The digital resource may be an application, program, library, program or script. The digital resource may be a device.

The digital resource identifier or id 342 may comprise any type and form of identifier associated with, corresponding to or that otherwise identifies a digital resource. The digital resource id may be a unique identifier. The digital resource id may be a hash code. The digital resource id may be a hash of the digital resource. The digital resource id may be a name of the digital resource. The digital resource id may be a URL of or to the digital resource. The digital resource id may be a memory location of the digital resource. The digital resource id may be a storage location of the digital resource. The digital resource id may be a name of a file corresponding to the digital resource. The digital resource id may be the digital resource itself, such as a URL identifying the digital resource of the URL itself or a domain name identifying the digital resource of a domain.

The user actions 305 may comprise any type and form of actions of a user. In some embodiments, the user actions may comprise any actions of a user to interact or interacting with a digital resource. the user actions may comprise any actions of a user to request, access, obtain, view, print, edit, user or otherwise process a digital resource. In some embodiments, a user action comprises registering and/or logging in to the linking system. In some embodiments, a user action comprises registering and/or logging in to a web-site. In some embodiments, a user action comprises encoding a URL or requesting the linking system to encode the URL. In some embodiments, a user action comprises clicking or activating by a user a URL. In some embodiments, a user action comprises clicking or activating by a user an encoded URL. In some embodiments, a user action comprises requesting a browser to go to a URL or web-page. In some embodiments, a user action comprises a pointer over or mouse over of a keyword, phrase or URL on a web page. In some embodiments, a user action comprises a selection of a keyword, phrase or URL on a web page. In some embodiments, a user action comprises a traversal between URLS or web-links, such as clicking on a hyperlink of one page to get to another page of a web-site. In some embodiments, a user action comprises launching, executing or using a browser, such as a browser of a certain type. In some embodiments, user actions comprise a history of activity of a user on a computer, browser or web-site, including date and time of such activity. In some embodiments, user actions comprise a log or file of activity of a user on a computer, browser or web-site, including date and time of such activity. User actions may comprise the click stream or any portion thereof.

The global actions 310 may include any type and form of actions regarding sharing, forwarding, propagating or otherwise providing a digital resource to another entity, user or another digital resource. In some embodiments, a global actions comprises a user electronically communicating a digital resource or digital resource identifier to an entity, user or digital resource. In some embodiments, a global action comprises a user emailing a digital resource or digital resource identifier. In some embodiments, a global action comprises a user texting or sending an SMS message comprising a digital resource or digital resource identifier. In some embodiments, a global action comprises a user instant messaging a digital resource or digital resource identifier. In some embodiments, a global action comprises a user posting a digital resource to a web-site. In some embodiments, a global action comprises a user posting, sharing or provide a digital resource or digital resource identifier via, in or to a social networking site. In some embodiments, a global action comprises a user cutting, copying and/or pasting a digital resource to another digital resource, such as copying and pasting a portion of content of a web-site to a social networking web-site. In some embodiments, a global action comprises a user forwarding, sharing or providing an encoded URL to another user, entity or digital resource. In some embodiments, a global action comprises a user transforming or processing a digital resource in one form or format to a digital resource in another form or format. Global actions may comprise the click stream or any portion thereof.

The content extractor 315 may comprise an application, program, library, process, service, script, task or any type and form of executable instructions for identifying, extracting, or processing keywords, phrases and data from content. The content extractor may be designed and constructed to identify, obtain or retrieve content from a digital resource, such as a web page identified by a URL. The content extractor may be designed and constructed to identify, determine, and/or extract keywords and/or phrases associated with, corresponding to from content of a digital resource. The content extractor may identify, determine, and/or extract keywords and/or phrases corresponding to or matching a predetermined list or enumerations of keywords and/or phrases. The content extractor may identify and retrieve content for a URL decoded from an encoded URL. The content extractor may identify and retrieve keywords and/or phrases from content identified by a URL decoded from an encoded URL. The content extractor may identify and retrieve content, and/or keywords and/or phrases, from a predetermined portion of a digital resource. The content extractor may identify and retrieve text areas of a digital resource. The content extractor may identify and retrieve keywords and/or phrases from text areas of the digital resource. The content extractor may identify and retrieve meta-data from or about a digital resource. The content extractor may identify and retrieve keywords and/or phrases from the meta-data. In some embodiments, the content extractor may identify and retrieve content, and/or keywords and/or phrases, from user selected or defined portions of the digital resource. In some embodiments, the content extractor may identify a keyword in the digital resource. In some embodiments, the content extractor may identify a phrase in the digital resource. The content extractor may identify one or more URLs on a web page. In some embodiments, the content extractor may identify URLs from predetermined portions of the page. In some embodiments, the content extractor may identify URLs from user selected or defined portions of a page. The content extractor may retrieve content from the identified one or more URLs and identify or retrieve keywords and/or phrases from such content.

In view of any media content, such as video and/or audio files, the content extractor may be designed and constructed to analyze the content of such media to determine any text, phrases or meta-data contained therein or related thereto. In some embodiments, the content extractor may include any type and form of voice or audio recognition technology to identify audio content in the media, such as spoken words, music or sounds. In some embodiments, the content extractor may convert any of the audio content into corresponding text. In some embodiments, the content extractor may identify text or phrases from the text converted from and corresponding to the audio content. In some embodiments, the content extractor may include any type and form of video processing and analysis technology that identifies persons, location, objects or things in a video. From such video processing and analysis, the content extractor may provide a description, such as in text format, of the subject matter of or the persons, location, objects or things in the video. In some embodiments, the content extractor may identify text or phrases from the description determines from and corresponding to the video content.

The classifier 320 may comprise an application, program, library, process, service, script, task or any type and form of executable instructions for performing or providing pattern classification of a set of data. The classifier may use any type and form of classification scheme or algorithm to identify a sub-population, class or category to which a new observation or item belongs in which the identity of the sub-population, class or category for the new observation or item is not known. The classifier may perform pattern recognition, which is the assignment of some sort of output value (or label) to a given input value (or instance), according to some specific algorithm. Via pattern recognition, the classifier attempts to assign each input value to one of a given set of classes (for example, determine whether a given email is "spam" or "non-spam"). Classifier may classify based on a training, learning or established set of data containing observations or items with a known sub-population, class or category. The classifier may comprise any type of classifier, such as a neural network, support vector machines, k-nearest neighbors, Gaussian mixture model, Gaussian, naive Bayes, decision tree and/or Radial Basis Function (RBF) classifier.

The classifier may take as input any one or more of the following: a digital resource, a digital identifier, user actions and global actions. The classifier may take as input any one or more of the keywords and/or phrases identified by the content extractor. The classifier may classify this input to assign or designate a sub-population, class or category to each input or sets of input. The classifier may perform this classification on a per user basis. The classifier make take input associated with a user, such as user actions and global actions for a particular user, and classify such input into classes or categories and store such classification in association with the user. The classifier make take input associated with a user, such as user actions and global actions for a particular user, identify keywords from the input and classify the keywords into classes or categories and store such classification in association with the user.

The classifier may classify the input into categories or classes based on keywords and/or phrases identified from the digital resource and/or from content of, identified by or associated with the digital resource. The classifier may classify the input into categories or classes based on subject matter. The classifier may classify the input into categories or classes based on topics.

The classifier may classify the input into categories or classes based on context. The classifier may classify the input into categories or classes based on areas of interest. The classifier may classify the input into categories or classes based on preferences of the user. The classifier may classify the input into categories or classes based on favorites of the user. The classifier may classify the input into categories or classes based on an affinity or affinities of the user. The classifier may classify the input into categories or classes based on type of digital resource. The classifier may classify the input into categories or classes based on source of the digital resource. The classifier may classify the input into categories or classes based on digital resource identifier. The classifier may classify the input into categories or classes based on type of action. The classifier may classify the input into categories or classes based on encoded URLs. The classifier may classify the input into categories or classes based on decoding URLs. The classifier may classify the input into categories or classes based on URLs. The classifier may classify the input into categories or classes based on domain names. The classifier may classify the input into categories or classes based on temporal information, such as time and/or date of interaction with the digital resource.

The classifier may classify the input based on a cross-section, matching or association of user actions to global actions. The classifier may identify those URLs encoded by a user and the encoded URLs clicked on by the same user but encoded from and shared by other users. The classifier may match those URLs encoded by a user to those global actions in which the user's encoded URLS were shared. The classifier may classify these URLs into categories or classes. The classifier may classify keywords and/or phrases from these URLs or content associated therewith into categories or classes. The classifier may classify into categories or classes based time and/or date of interaction with encoded URLs.

The relevance scorer 325 may comprise an application, program, library, process, service, script, task or any type and form of executable instructions for generating and/or providing a score for a digital resource. The relevance scorer and/or classifier may perform any type and form of statistical analysis or modeling of the classification data. The relevance scorer may perform any type and form of fuzzy logic matching to match an input, such as a digital resource identifier, to the classification data and/or statistical analysis or model to generate or provide a relevance score 330. The relevance scorer may receive or process as input a digital resource identifier 342 and a user identifier 345. Based on this input, the relevance scorer may determine how relevant the digital resource identified by the digital resource identifier is to the user identified by the user id based on that users previous interaction with digital resources as may be represented or reflected in the classification data and/or statistical analysis or model.

The relevance scorer may classify the digital resource identified by the digital resource identifier into an existing class or category of the classification data and/or statistical analysis or model for the user specified by the user id. In some embodiments, the relevance scorer determines whether the classification of the digital resource identified by the digital resource identifier fits into an existing class/category or a new class/category of the classification data and/or statistical analysis or model for the user specified by the user id. In some embodiments, the relevance scorer determines a number of classes or categories into which the digital resource identified by the digital resource identifier may be classified. In some embodiments, the relevance scorer determines a number of other digital resources previously classified in the class or category into which the digital resource identified by the digital resource identifier may be classified. In some embodiments, the relevance scorer determines temporal information (time sand dates of interaction, velocity of rate of interaction, etc.) for digital resources previously classified in the class or category into which the digital resource identified by the digital resource identifier may be classified. For example, in some embodiments, the relevance scorer may classify or match the digital resource identified by the digital resource identifier based on classification data within a predetermined time period. In some embodiments, the relevance scorer may generate, extract or identify one or more keywords for or from the digital resource identified by the digital resource identifier and match these one or more keywords to keywords in the classification data and/or statistical analysis or model for the user specified by the user id.

The relevance scorer may generate or provide a relevance score 330 responsive to an analysis or classification of digital resource identified by the digital resource identifier to the classification data of the user identified by the user id. The relevance scorer may generate the relevance score by any statistical calculation of the classification of the digital resource identified by the digital resource identifier into or using the classification data of the user specified by the user id. The relevance scorer may generate the relevance score by any temporal weighting of temporal information of the classification data of the user specified by the user id. The relevance scorer may generate the relevance score using any of the scoring methods and techniques described elsewhere herein.

The relevance score 330 may comprise a value that provides an indication of or otherwise identifies how relevant the digital resource identified by the digital resource identifier is to the user specified by the user id. The relevance score may be generated for or on an absolute or relative scale. The relevance score may be generated for or normalized to a predetermined relevance range, such as for example −100 to 100, 0 to 100 or X to Y.

The relevance scorer may generate or provide a data score responsive to, in connection with or in conjunction to generating or providing the relevance score 330. The relevance scorer may generate or provide a data score by any statistical calculation of an amount of cross-section or matching in the classification data between user actions and global actions associated with the user. The relevance scorer may generate or provide a data score based on an amount or volume of data for the user in the classification data. The relevance scorer may generate or provide a data score based on an amount or volume of data of user actions for the user in the classification data. The relevance scorer may generate or provide a data score based on an amount or volume of data of global actions for the user in the classification data.

The relevance scorer may generate or provide a data score based on temporal qualities of the data for the user in the classification data.

The data score 335 may comprise a value that provides an indication of or otherwise identifies a quality of data supporting or underlying the relevance score. The data score 335 may comprise a value that provides an indication of or otherwise identifies a validity of the relevance score based on a volume or quality of the classification data. The data score 335 may comprise a value that provides an indication of or otherwise identifies a validity of the relevance score based on a temporal quality of the classification data. The data score 335 may comprise a value that provides an indication of or otherwise identifies an amount of cross-section or matching between user actions and global actions associated with the user. The data score may be generated for or on an absolute or relative scale. The data score may be generated for or normalized to a predetermined range, such as for example −100 to 100, 0 to 100 or X to Y.

The linking system and/or relevance scorer may identify the user via the user identifier. The user identifier 345 may comprise any type and form of identification of a user, such a name, alias, an account name, a login name, or email address. The user identifier may be user identifier for the user for using or accessing the linking system. The user identifier may be user identifier for the user for using or accessing a social networking site. The user identifier may be user identifier for the user for using or accessing a third-party or partner web-site. The user identifier may be based on a cookie. The user identifier may be stored in a cookie. The linking system and/or relevance scorer may identify the user via one or more cookies.

Referring now to FIG. 3B, an embodiment of a method for scoring a digital resource 340 is depicted. In brief overview, at step 350, the linking system receives user actions and at step 355, the linking system receives global actions. At step 360, a content extractor extracts or identified keywords from content identified by or associated with a digital resource identified in any of the user actions and/or global actions. At step 365, the classifier performs classification on the input of user actions, global actions and keywords identified therein. At step 370, a relevance scorer receives a user identifier and a digital resource identifier and generates a relevance score and data score.

In further details, at step 350, a server, such as the linking system, receives user actions from a plurality of users. The server may receive user actions via click streams 250'. The server may receive user actions via or comprising a user interacting, user or accessing a digital resource. The server may receive users actions from the digital resource. The server may receive a user action via a user requesting to encode an URL. The server may receive a user action via a user clicking on an encoded URL. The server may receive a user action via a request to decode an encoded URL. The server may receive and track user actions over any period of time. The server may receive a user action via a client linking system API or application 225.

The server may receive one or more user actions via a log file or activity log from an application, system, device or server. The click tracker may identify clicks of user on encoded URLs. The user tracker may identify the user who clicked the encoded URL. The user tracker may identify the user who encoded the encoded URL. The server may store the user actions associated with or attributed to each user into a database 230 and associated with or identifiable via a user identifier.

At step 355, a server, such as the linking system receives global actions. The server may receive global actions via a plurality of click streams 250'. The server may receive global actions via a user clicking on an encoded URL, such as encoded URL shared on a social networking site. The server may receive global actions via or comprising a user sharing a digital resource. The server may receive global actions from the digital resource. The server may receive one or more global actions via one or more log files or activity logs from an application, system, device or server. The user tracker may identify the user who shared the encoded URL. The click tracker may identify clicks of users on encoded URLs that have been shared. The user tracker may identify the user who clicked the shared encoded URL. The server may store the global actions associated with or attributed to each user into a database 430 and associated with or identifiable via a user identifier.

In some embodiments, steps 350 and 355 are provided or performed as a single step. In some embodiments, steps 350 and 355 are provided or performed in conjunction during the same step or sets of steps. For example, in some embodiments, the server may receive user actions and global actions via click streams received by the server. The server may track, manage and store any user and global actions on a per user basis in a database.

At step 360, a content extractor may identify keywords and/or phrases from a digital resource, content identified by the digital resource or content otherwise associated with or corresponding to the digital resource. The content extractor may operate responsive to receipt of user actions and/or global action. As the server receives a click stream, the content extractor may identifier keywords or phrases from the click stream. In some embodiments, the context extractor obtains or fetches content corresponding to the digital resource. In some embodiments, the content extractor uses a predetermined list of phrases and/or keywords to identify those phrases and/or keywords in the digital resource, content identified by the digital resource or content otherwise associated with or corresponding to the digital resource. In some embodiments, the content extractor identifies keywords and/or phrases from predetermined locations or portions of a digital resource or content associated with the digital resource. In some embodiments, the content extractor identifies keywords and/or phrases from user actions. In some embodiments, the content extractor identifies keywords and/or phrases from global actions. In some embodiments, the content extractor identifies keywords and/or phrases on a per user basis or for each user.

At step 365, a classifier performs classification or otherwise classifies the keywords and/or phrases. The classifier may operate responsive to the content extractor. As the content extractor identified keywords or phrases, the classifier may receive these keywords or phrases and perform classification. The classifier may classify any combination of keywords and/or phrases from the digital resource identifier, digital resource, content identified by the digital resource or content otherwise associated with or corresponding to the digital resource, user actions and global actions. The classifier may store classification data for each user. The classification data may represent a classification of the user's interactions with digital resources into categories or classes. The classifier may generate classification data that represent a classification of the user's interactions with the digital resources based on subject matter, interests or topics.

At step 370, the relevance scorer may receive a digital resource identifier and a user identifier. The relevance scorer may receive a request to provide a relevance score for a digital resource or entity identified by the digital resource identifier for a user identified by the user identifier. Responsive to the request for a relevance score or receipt of a digital resource identifier and a user identifier, the relevance scorer may generate, communicate or otherwise provide a relevance or content score. The relevance scorer may receive a request to provide a data score for a digital resource or entity identified by the digital resource identifier for a user identified by the user identifier. Responsive to the request for a data score or receipt of a digital resource identifier and a user identifier, the relevance scorer may generate, communicate or otherwise provide a data score. In some embodiments, responsive to generating, communicating or providing a relevance or content score, the relevance score may also generate, communicate or otherwise provide a data score.

The relevance scorer may receive a digital resource identifier and a user identifier or a request from any application, system or server. In some embodiments, a third party web site serving content may transmit the request and/or digital resource identifier and a user identifier to the linking system or relevance scorer. In some embodiments, an ad server serving advertisement or matching content to impression opportunities may transmit the request and/or digital resource identifier and a user identifier to the linking system or relevance scorer. In some embodiments, a client application may transmit the request and/or digital resource identifier and a user identifier to the linking system or relevance scorer.

D. Systems and Methods for Providing Search Results Based on User Interaction with Content In some embodiments, the present disclosure is directed to systems and methods for providing relevant real-time or static search results. These real-time or static search results may be provided based on user activity and/or engagement measurement from users with respect to particular content and websites. In some embodiments, the linking system 120 may provide or support interactive search based on global engagement patterns of users, for example, across large internet platforms or across multiple platforms. The search results may rank available content based on popularity of the content, which may be determined by user visits and/or referring websites. These results may be determined based on actual interactions between people and content. Such methods, when incorporated into searches, may yield significant improvements over those using typical link crawling and ranking based on links that reside on a page.

Figure 4A:
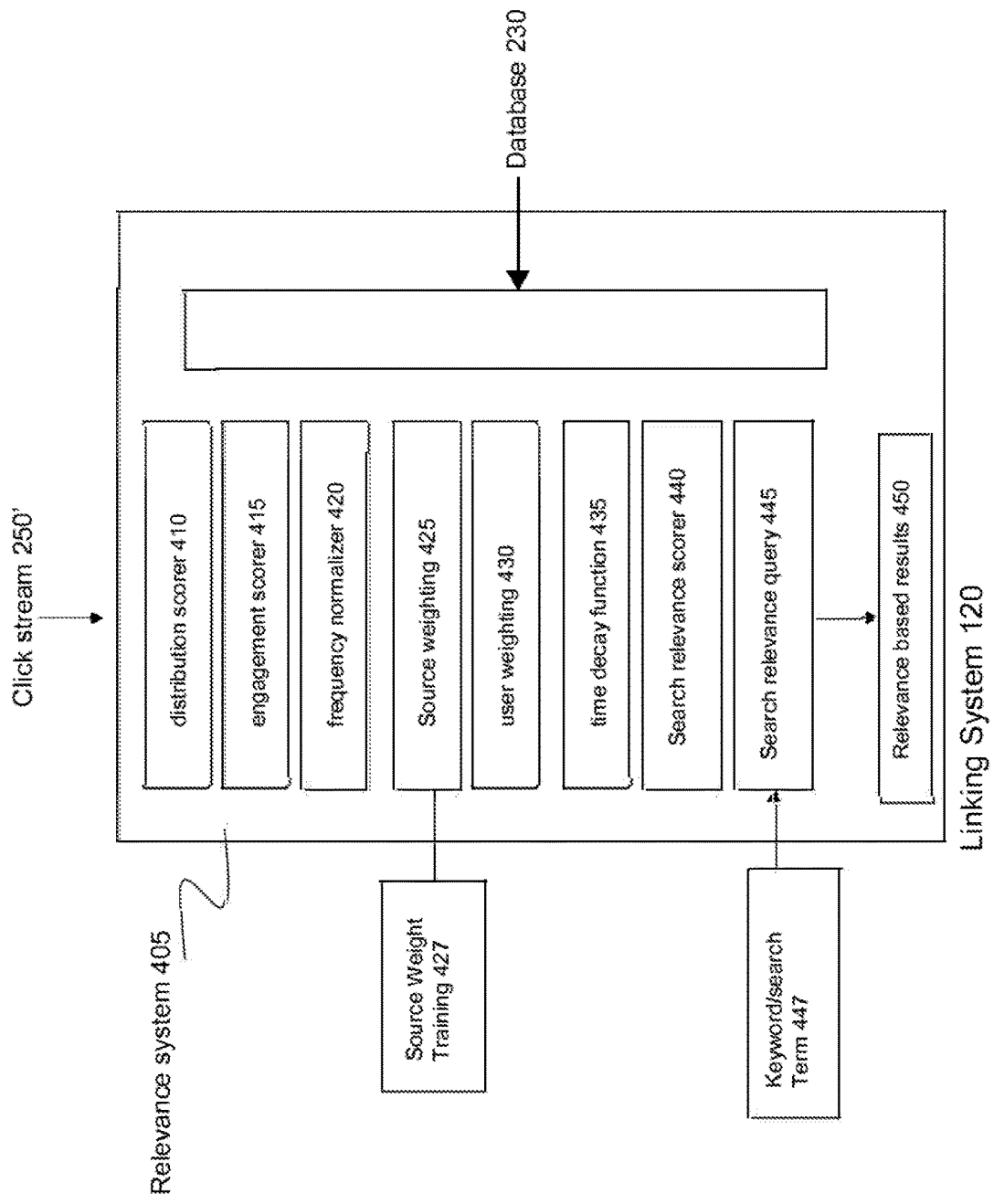
FIG. 4A is a block diagram of an embodiment of a system for providing search results based on user interaction with content.

Referring to FIG. 4A, one embodiment of a system for providing search results based on user interaction with content is depicted. In brief overview, the system includes a linking system 120 that incorporates a relevance system 405 for facilitating a search request. The relevance system 405 may receive a click stream 250', as well as keywords or search terms 447 from a search request. In some embodiments, the relevance system 405 includes one or more of the following modules: distribution scorer 410, engagement scorer 415, frequency normalizer 420, source weighting module 425, user weighting module 430, time decay function 435 and search relevance scorer 440. The relevance system 405 may determine a relevancy score for each document identified in a clickstream, for ranking documents during a search.

In certain embodiments, the linking system 120, via a click tracker, may collect, track or otherwise monitor information about links or content accessed by one or more users. The linking system 120 or the click tracker may determine the content that users selected via encoded links, and may analyze the selected content to facilitate interactive search.

By way of illustration, and in one embodiment, the linking system 120 may prioritize content and/or links based on one or more of: (i) the identity or other information of the user clicking on the link, (ii) the identity or other information of the website providing the content or link to the content, and (iii) the timing and/or number of users accessing the content via a certain link. In certain embodiments, this prioritization may be determined or computed based on one or more mathematical and/or computer techniques, which may be custom or proprietary to the linking system 120. The linking system 120 may establish, maintain and/or update a database of content or links based on the above determination, analysis and/or prioritization.

The database 230 may include any information or data associated with a click on an encoded link. The database 230 may include data collected, tracked, and analyzed either statically or in real-time, and associated with the click. The linking system, via the click tracker, may analyze and/or parse a clickstream for data to extract and store in the database 230. In some embodiments, the database 230 may store data collected, tracked, and analyzed by the linking system 120 in response to a mouse-over, copy or paste of an encoded link. The linking system may store any portion of the collected data in a record of the database. In some embodiments, a stored record may correspond to a click or other user action. The record may include any user and/or traffic data provided by a web browser, such as those described above in connection with FIGS. 2, 3A and 3B.

In some embodiments, a search engine or system is supported by the linking system 120 in real time or substantially in real time. The search system may change or update the relevancy of content for a user as that user and/or other users click on or navigate links (e.g., encoded links) on a page. The relevancy of a content may be determined in relation to keywords or search terms, user activity and/or activity from various websites. The search system may communicate with or rely on the linking system 120 to process the clickstreams in real time or substantially real time. In some embodiments, the linking system includes a clickstream processing module, which may be referred to as a relevance system 405 or omniflector. The linking system 120 may process or decode a clickstream in real time, and may dissect, organize, buffer and/or store the processed information to the database 230.

In some embodiments, the database 230 may be referred to as a redistribution database or a sharded redis cluster database. The database 230 may comprise one or more sharded redis cluster databases, e.g., in a storage area network (SAN). In certain embodiments, the relevance system 405 may receive and/or process a portion of the clickstream to obtain a social score for each content or document (hereafter sometimes generally referred to as "document" or "content"). The relevance system 405 may perform calculations on a portion of the decoded stream, to generate the social score and/or other data. The linking system 120 may store the social score and/or other data to the database 230. In some embodiments, the linking system, e.g., via the relevance system 405, may receive or access a portion of the stored or buffered information. The linking system 120 may use this information to generate, create, calculate or otherwise determine a social score for each document.

In some embodiments, a social score indicates, describes or represents how popular or in demand a certain document is. In some embodiments, a social score is a weight to be applied to the relevancy scoring. A social score may be determined based on the number of times a document is "clicked" or accessed, and/or how widely the document is being shared or referred (e.g., a corresponding encoded link is forwarded or copied). The social score may be tempered by, or incorporate, a decay function to allow old content to decay, and new content to gain traction, prominence or relevance in searches. The linking system 120 or relevance system 405 may include a decode processor, which may comprise or execute any application, algorithm, program, library, process, service, script, task or any type and form of instructions for determining social scores. In some embodiments, the decode processor includes a chip or a chipset, e.g., a CPU, an application specific integrated circuit (ASIC), a Field-programmable gate array (FPGA), or any other hardware for determining the social score.

By way of illustration, and not intended to be limiting in any way, the social score may be any real number or integer ranging between 1 and 100 (or any other range). A maximum of 80 points for example, may be mapped, derived, or contributed from a raw social score. A maximum of 10 points, for example, may be mapped, derived, or contributed from a count of the total number of social referrers. A maximum of 10 points, for example, may be mapped, derived, or contributed from a count of the total number of other referrers. The raw score may indicate the reach of a website or a document online, and may include a number of components, including a distribution score, an engagement score, etc. The raw score may have any value larger than one (or zero, in some embodiments). A raw score falling within certain predefined range may be mapped to a value that makes up a portion (e.g., 80%) of the social score. The total number of social and/or other referrers may similarly yield component value(s) that contribute to the final value of the social score. By way of example, one embodiment of a pseudo code or algorithmic description of the determination of a social score is depicted below:

a=raw social score [e.g., weighted number of clicks, weight may indicate the reach of a site on the internet]
    b=total count of social referrers
    c=total count of other (e.g., non-social) referrers
    d=mapped social score [a: 1-400->buckets 1-70; a: 401-2000->buckets 71-80, >2000=80]
    e=mapped social referrers [b*3, may be bounded between 0 and 10] f=mapped other referrers [c/2, may be bounded between 0 and 10].

In some embodiments, the raw social score may contribute the largest component of the social score. However, various different attribution weights may be implemented in various embodiments, and applied to each of the social score components. In one embodiment, the linking system 120 (e.g., via a source weighting module 425) may assign a weight (e.g., ranging between 1 and 10) to certain websites (e.g., top sites) or documents in accordance with the reach they have on the web. Sites with high or broad reach, such as Facebook and Twitter, may be assigned a weight of 10 or some large value. Lower reaching sites, such as Xing.com, may be assigned a 1 or some small value. In some embodiments, when a social click is identified or detected, the raw social score for a corresponding document is adjusted according to the appropriate, assigned weight. By way of example, a click from Facebook may be worth 10 times as much as a click from Xing, and correspondingly represented by their assigned weights.

The raw social score of a document may continue to increase in value as the document's link receives more clicks. In one illustrative embodiment, the raw score may be mapped to a number between 1 and 80, e.g., with the bottom 70 points mapped to lower raw score ranges, and the last 10 points mapped to higher raw score ranges. In some embodiments, the source weighting module 425 may receive source weight training data 427 to generate an initial social score, or to test the social scoring system. The source weight training data 427 may include weights to assign to certain sites, and these weights may be adjusted or updated as sites are ranked and re-ranked. In some embodiments, the source weight training data 427 may include clickstreams (e.g., simulated, historical, or received in real time) for evaluating source weighting and social scores.

In some embodiments, the relevance system 405 identifies users that triggered the clickstreams and includes a user weighting module 430 configured to weight the social score based on the identified users. The user weighting module 430 may assign specific weights to particular users, such as those identified as influencers (e.g., showing significant social networking reach in sharing content, etc) and/or power users (e.g., performing significant number of searches, which may influence search relevancy in a positive or negative way for other users). By way of example, the user weighting module 430 may measure the value of particular users (e.g., a leading social networker on shoe fashion trends) on specific keywords, search terms or search strings (e.g., "lace up boots", "tasseled leather pumps"), and may categorize such users as influencers. The user weighting module 430 may weight search results based on identifier influencers, for example boosting search results for content that is either encoded or decoded by influencers. In certain embodiments, the user weighting module 430 assigns weights to clicks associated with certain user data or characteristics (e.g., gender, age group, or users whose online history include visits to websites catering to specific subject matter).

In certain embodiments, the total number or count of social referrers represents the total number of unique referring domains for a certain document or content. These referring domains may be social websites or online social networks. The total number of other referrers may represent the total number of unique referring domains that are not social sites, for a certain document or content. In the above example, the total number of social referrers may be multiplied by three, and the result bounded between 0 and 10. The linking system 120 may divide the total number of other referrers by 2 (or some other number), and bound the result between 0 and 10. Either of these referrer counts may be adjusted by some other predetermined multiplication (or division) factor before contributing to the social score. In addition, either of these referrer counts may be capped or bounded by other ranges (e.g., 0-100) after adjustment.

Any of the above information may be used to determine the social score and/or to determine which documents get indexed within search lists. Once a document is indexed, the relevancy score for a document is determined by a relevance system of the linking system 120 using a combination of word relevancy and the document's social score. The social score may indicate that a document is relatively more important, or is more relevant to a search if the document has been accessed by users and/or from domains (e.g., via encoded links) that have a lot of influence or reach on the web. It may be expected that documents accessed from popular sites may be more popular and relevant to a user in a search. The linking system 120 may index each document identified in a clickstream. The linking system 120 may index or store the document in the database 230 with or against a corresponding social score. This social score of a document may be updated in real time, according to a schedule, or in response to a triggering event (e.g., a search).

In certain embodiments, the relevance system 405 and/or search system may access, compare and/or use the social score of a document during a search.

In some embodiments, the social score of a document is determined based on social clicks that access the document via encoded links. In other embodiments, the social score may incorporate one or more types of clicks, which may include non-social clicks. In some embodiments, social clicks include clicks on document links from identified top websites. In some of these embodiments, social clicks include clicks on links from top social sites. The linking system may identify, maintain or track a number of top sites, e.g., 1000 top sites, which may be provided by partners, market research providers (e.g., Doubleclick), analytics (e.g. BlueKai and Exelate) or search providers (e.g., Yahoo, Google and Bing). In some embodiments, the top sites may comprise, exclusively or non-exclusively, major social sites (e.g., Facebook, Twitter, Google+, LinkedIn, etc). The linking system 120 may determine that a click referred, redirected or consummated from one of these top sites or domains may be considered a social click. As an illustration of the relative importance or relevance of social clicks, consider the following: a linking system that focuses on social clicks from the top 1000 sites may be able to index less than 1% of the domains being clicked, but such clicks may account for over 38% of all online clicks. Thus, social clicks may be useful for determining social scores for online content. In certain embodiments, the linking system 120 may dynamically monitor click counts from domains and determine top sites based on the distribution of click counts. The linking system may dynamically identify top sites, e.g., in lieu of a static list of top sites provided by a third party.

In certain embodiments, the linking system may classify or group two or more clicks on a social site for the same document, occurring within a certain time period (e.g., 2 or 5 minutes), as a social click. In some embodiments, the linking system may group multiple clicks from other types of websites as a single social click. Documents identified by a social click may be included in a directory, database, search list, index or application programming interface to index the document for search. In some embodiments, such documents are placed in a publisher/subscriber (pubsub) index or stream that can be pulled during searches. A search engine may pull the social clicks pubsub stream and may continuously index global hashes within the pubsub. Documents that are popular may tend to be clicked over and over again. Such documents may get indexed again and again corresponding to the clicks. As documents' links are clicked, the linking system 120 may update the documents' social scores. As the documents get re-indexed, their corresponding social scores may be higher, resulting in higher rankings within search results.

In certain embodiments, the number of social clicks may contribute to a social score in a linear or non-linear fashion. For example, a social score of a document may be configured such that it is directly proportional to the number of social clicks detected. In some other embodiments, the first clicks (click number 1-80) from a social website may be weighted more than later clicks (click number 81 to 100) in determining a social score. In one embodiment, and by way of illustration, the number of social clicks may be represented as follows:

$$SC_{i,i} = \sum_{1,80} \frac{s(i)}{10} + \sum_{81,100} \frac{s(i)}{100}$$

In some embodiments, s(i) may represent the click count for term i within the respective click count ranges for document j. Additional clicks (e.g., beyond 100) may be weighted less or differently, or disregarded after a certain threshold (e.g., 100 clicks). In certain embodiments, the number of social clicks, $sc_{i,j}$, may be referred to as an engagement score. An engagement scorer 415 of the linking system may rank, score or rate content based on how many clicks are received. An engagement scorer 415 may include or execute any application, program, library, process, service, script, task or any type and form of executable instructions for generating and/or updating an engagement score. The engagement scorer 415 may apply the above function, or some other nonlinear function, such that initial clicks are weighted more than later clicks. The engagement scorer 415 may emphasize initial clicks so that new content may promoted over older content with the same frequency of clicks. The linking system 120 may, for example, promote new content by leveraging on a time decay function in conjunction with the engagement score. The linking system 120 may include or incorporate the engagement score in a social score.

As described, the linking system 120 may calculate the social score for each document, and may stored the social score in an index. The social score may be decayed, reduced or de-emphasized in time for use in searches, e.g., from the time the document is first indexed. A social score may decay down to half of its original score over a configured period of time, such as 72 or 168 hours. In some embodiments, a social score may be decayed as a function of $e^x$ (e.g., $f(e^x)$), where x represents time. The linking system 120 and/or search system may use the social score to determine a relevancy score. The linking system 120 may include a search relevance scorer 440 for determining and/or updating the relevancy score of a document. The search relevance scorer 440 may include and/or execute any application, program, library, process, service, script, task or any type and form of executable instructions for generating and updating the relevancy score of a document. The search relevance scorer 440 may communicate or interoperate with one or more modules (e.g., distribution scorer 410, engagement scorer 415, frequency normalizer 420, time decay function 435) in determining and/or updating a relevancy score. A relevancy score may sometimes be referred to as a search score or a relevance score. The social score may be one of several factors that determines the relevancy score of a document as pertains to search (e.g., interactive search).

In some embodiments, a relevancy score is based on one or more of weights, factors or components, for example: (i) Social score (e.g., how popular a document is), (ii) time decay (e.g., how long a document has been in the index), and (iii) normalized frequency (e.g., how relevant certain terms are to the text of a document). Other weights, factors or components may include (iv) a distribution score and (v) an engagement score. In certain embodiments, the social score for a document may incorporate one or more of the above components, e.g., time decay, distribution score and/or engagement score. For example, the social score may be subject to time decay prior to being used by the linking system 120 to determine a relevancy score. In other embodiments, the social score may be combined with other factors before being subject to time decay to establish the relevancy score. As discussed, time decay may incorporate an $e^x$ function with respect to time (x), or any log-linear time decay function. With the time decay function, new documents with links that are more recently clicked may have a higher social and/or relevancy score.

A distribution scorer of the relevance system may calculate or determine the distribution score or weight for a document. The distribution scorer 410 may include any application, program, library, process, service, script, task or any type and form of executable instructions for monitoring or tracking clicks arising from various websites. The distribution scorer 410 may determine that a document is ranked higher or more relevant in a search if clicks to access such a document arise from a broader set of source web sites. The distribution scorer 410 may determine the distribution of clicks (e.g., counts of social clicks or normal clicks) for the same document across a plurality of sites. In some embodiments, the distribution scorer 410 may determine the number of source sites (e.g., specific social sites) that referred clicks for a certain document. In certain embodiments, the distribution score may be referred as "social distribution". The distribution score may be calculated, expressed or represented in one embodiment by the following formula:

$$sd_{ij} = \max\left(\sum_k n, \text{Max\_SD}\right)$$

where $$\sum_k n$$

can represent the number or source sites that have been referring clicks for a document. In some embodiments, $$\sum_k n$$

represents the summation or website counts, e.g., over k categories of clicks or k types of websites. Max_SD may be an upper bound or cap for the distribution score (e.g., 100 websites). In some embodiments, Max_SD is optional, and may be set to 0. Where Max_SD is specified, the distribution score may take the larger of Max_SD or the number of source sites referring clicks for the document.

In some embodiments, the linking system 120 includes a frequency normalizer 420. A frequency normalizer 420 may include any application, program, library, process, service, script, task or any type and form of executable instructions for processing a term or word's frequency of occurrence in a document. Once enough traffic has been monitored for clickstream activity, the linking system 120 may retrieve a document identified in the clickstream, using the corresponding long URL. The linking system may extract content that is appropriate for text-based, keyword search. The frequency normalizer 420 may extract key words from the extracted content, and may normalize some of these keywords. In some embodiments, the frequency normalizer 420 may insert or store the keywords and their normalization values into the database 230.

In some embodiments, the frequency normalizer 420 uses a term frequency—inverse document frequency (tf/idf) ratio or metric to obtain the normalization values. This metric may be used as a statistical measure to evaluate the importance of a term or word within a document. The importance of a term may increase proportionally to the number of times the term appears in the document. The importance of the term may be offset by the frequency of the word within a superset of documents (e.g., corpus) comprising the document. The linking system may use the tf/idf metric to score or rank a document's relevance in a given search query. The linking system may use the tf/idf metric to normalize or diminish the weight of terms (e.g., "the", "of") that occur very frequently in the corpus and increase or normalize the weight of terms (e.g., "hibernation", "omnibus") that occur rarely.

In some embodiments, the tf/idf metric comprises a term frequency (tf) and the inverse document frequency (idf) components. The tf component may represent the occurrence count of a term in a document. The tf component may be determined from the number of times a given term appears in that document, normalized to prevent a bias towards longer documents to give a measure of the importance of the term i within the particular document j. For example, in a document containing 100 words wherein the word brown appears 3 times, the tf value for brown may be determined as (3/100)=0.03. In some embodiments, the tf value is expressed in logarithmic form, e.g., log(0.03). One embodiment of the tf value is presented as follows:

$$tf_{ij} = \frac{n_{i,j}}{n_{k,i}},$$

where k may represent the number of distinct terms in the document.

In some embodiments, the idf component is a measure of the general importance of a term. It may be obtained by dividing the total number of documents by the number of documents containing the term, and then taking the logarithm of that quotient. One embodiment of the idf may be represented as follows:

$$idf_{i,j} = \log\left(\frac{|D|}{|\{j : t_i \in d_j\}|}\right),$$

where D may represent the corpus or set of all documents, |D| may represent the cardinality of D, or the total number of documents in the corpus. |{j: $t_i \in d_j$}| may represent the number of documents where the term $t_i$ appears. By way of example, if there are 10 million documents and the term brown appears in one thousand of these, the inverse document frequency may be calculated as log(10,000,000/1,000) =4.

The normalization frequency of a document term may be determined as the ratio of tf to idf, e.g., tf/idf. In one embodiment, this is represented as:

$$(tf/idf)_{i,j} = \frac{tf_{i,j}}{idf_{i,j}} = \frac{\frac{n_{i,j}}{\sum_k n_{k,j}}}{\log\frac{|D|}{|\{j:t_i \in d_j\}|}}$$

In some embodiments, the search relevance scorer 440 may use the tf/idf normalization frequency to determine the relevancy score. However, in some other embodiments, the search relevance scorer 440 may use a different document frequency or a variant of the tf/idf normalization frequency. For example and in one embodiment, the search relevance scorer 440 may use a td.idf weight, which may be represented as:

$$(tf \cdot idf)_{i,j} = tf_{i,j} \times idf_{i,j} = \frac{n_{i,j}}{\sum_k n_{k,j}} \times \log \frac{|D|}{|\{j : t_i \in d_j\}|}$$

In certain embodiments, the frequency normalizer 420 may compute or determine a td-idf value using Lucene scoring methods. A Lucene score, may, for example, be expressed in the following embodiment:

$$\text{score} = td - idf \text{ value} = cord \cdot queryNorm \cdot \sum_{i \text{ in } q} \left(td \cdot idf^2 \cdot \text{Boost} \cdot norm\right)$$

where coord may be a score factor based on how many of the query terms are found in the specified document. A document that contains more of the query's terms may receive a higher score than another document with fewer query terms. queryNorm may be a normalizing factor for making scores between queries comparable. Boost may represent a search time boost of one or more terms in the query as specified in the query text. Boost may be used to access a boost of one or more terms in a multi term query. norm may include one or more boost and length factors, such as boost factors for specific documents, fields in a document, field length, etc.

In various embodiments, the relevancy scorer 440 may apply different variants of Lucene scoring and the td-idf value in determining the relevancy score. In certain embodiments, for example, different fields in a document may carry different weights. The relevancy scorer 440 may configure these weights as custom properties for a search, a document index, the relevancy scorer 440 and/or frequency normalizer 420 for example. In one embodiment, the relevancy scorer 440 may confer weights or boosts to the following content fields: title=5, meta keywords=3, meta description=4, meta site=4, domain=4, url=3, page=1, globalhash=5, h1=7, h2=5, h3=3, h4=2, cities=3. These may be configured by an administrator and/or determined based on search activity. In some embodiments, arbitrary weights may be assigned and updated based on search activity. By way of illustration, the following is a listing of configured document field boosts:

<entry key="boosts.site">4.0</entry>
<entry key="boosts.domain">4.0</entry>
<entry key="boosts.url">3.0</entry>
<entry key="boosts.globalhash">5.0</entry>
<entry key="boosts.phrase">5.0</entry>
<entry key="boosts.title">5.0</entry>
<entry key="boosts.description">4.0</entry>
<entry key="boosts.keywords">3.0</entry>
<entry key="boosts.lang">2.0</entry>
<entry key="boosts.h1">7.0</entry>
<entry key="boosts.h2">5.0</entry>
<entry key="boosts.h3">3.0</entry>
<entry key="boosts.h4">2.0</entry>
<entry key="boosts.cities">3.0</entry>

Certain variants of Lucene scoring may incorporate boosts values for each document field. For example, Lucene scoring may apply a configuration in which text in h1 tags are more important than those in h2 tags and the title field, which may be more important than the domain field, etc. A document or content may be configured for a relative boost. In certain embodiments, a document or content may not be configured for a boost, although it may incorporate a score or weight in the Lucene scoring method based on the length of text, number of terms in the document and other factors, for example.

In some embodiments, the search relevancy scorer 440 determines the relevancy or search score with the following computation: time-decayed social score*tf-idf value. In another embodiment, the search relevancy scorer 440 may determine the relevancy score using the following formula:

$$\Sigma(\text{decay time } \Pi\text{td–idf social distribution score social score}),$$

where $\Pi$ may represent a direct or Cartesian product of td-idf values. Yet other embodiments may incorporate any of the components described, e.g., engagement score, user weighting, source weighting, etc. The relevancy scorer may rank or index documents based on any variant or combination of relevancy scores, and the highest scoring documents may be returned first in a search.

By way of illustration, a retrieval mechanism may be used to query the database, apply the relevancy score (or a combination of scores described above), and provide a set of search results 450 ordered by how relevant they are in the clickstream. The relevance system 405 may receive keywords or search terms 447 from a search and may process these into a search relevance query 445. Search terms may include one or more parameters that identify or define audience or user segments. These one or more parameters may break down, identify or define users into sub-groups, such as by demographics, communication behavior and media use. In some embodiments, a search term may identify a geography scope or limitation, such as limiting the search to users who live in Italy. In some embodiments, a search term may identify a language scope or limitation, such as limiting the search to users who read content in Italian or interacted or clicked on content in Italian. In some embodiments, a search term may identify an influence rating.

The search relevance query 445 may for example, comprise scores for keywords, indexes into specific groups of documents and/or information about the user. The relevance system 405 may apply the search relevance query 445 against the indexed documents, which are ranked by their relevance scores. By matching document relevance against the query 445, the relevance system 405 may return one or more documents in the search results. The system 405 may return search results limited to or based on any of the audience or user segmentation terms. For example, if a geography term of Italy and a language term of English, the system may return search results based on English based content interacted with, encoded or clicked on by users locating in Italy.

Although some components or factors may be generally referred to or described herein as scores or scoring, these components or factors may be considered weights to be applied to the relevancy calculation or algorithm. For example, a social score, a distribution score, an engagement score, a frequency normalization and/or a time decay function may be considered weights or weighting factors for the relevancy system and may be applied to weight the relevancy score or provide a weight to other components or inputs of the relevancy system.

Figure 4B:
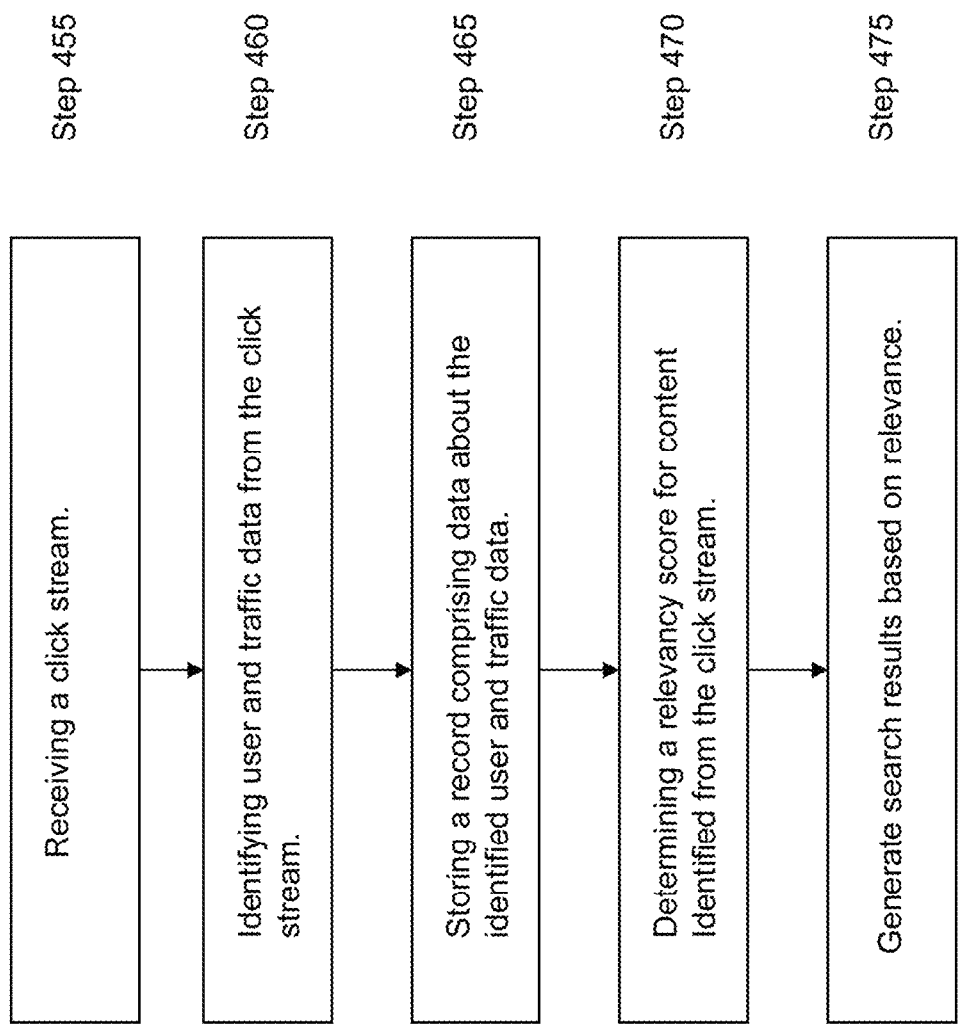
FIG. 4B is a flow diagram of an embodiment of a method for providing search results based on user interaction with content.

Referring to FIG. 4B, one embodiment of a method for providing search results based on user interaction with content is depicted. In brief overview, the method includes receiving, by a server, identification of a plurality of clicks of encoded uniform resource locator (URL) links (455). The server may identify, for each of the plurality of clicks, data about a user who clicked an encoded URL link and traffic data associated with a device from which the user clicked the encoded URL link (460). The server may store a record for each click of the plurality of clicks, the record comprising data about the user and traffic data associated with each click (465). The server may determine, based on the records, a relevancy score for each content identified from decoding the encoded URL links (470). The server may communicate, responsive to receiving a request to search content based on a keyword, a set of search results based on the keyword and the relevancy score (475).

Referring now to (455), a server may receive an identification of a plurality of clicks of encoded uniform resource locator (URL) links. The server may comprise any embodiment of the linking system 120 described above in connection with FIGS. 2, 3A and 4A. The server may decode each of the encoded URL links, for example, as described above in connection with FIG. 2. The server may decode an encoded URL link in real time. The server may redirect the click to access a document from another URL.

In further details of (460), the server may identify, for each of the plurality of clicks, data about a user who clicked an encoded URL link and traffic data associated with a device from which the user clicked the encoded URL link. In some embodiments, the server may identify data about the user from a cookie communicated via a click by the user on the encoded URL link. The server may identify, for example, traffic data comprising one or more of a browser type, a referring web site, a source internet protocol address, a destination internet protocol address, a time instance of a click, a document accessed.

The server may identify any other data about the user and/or traffic data as described above in connection with FIGS. 2 and 4A. For example, the server may determine if a user is an influencer or meets certain criteria for increased weighting. The server may assign an appropriate weight to this user's social clicks, e.g., in determining a document's social score. In some embodiments, the server may determine, based on traffic data, if a number of clicks are social clicks that may contribute to a social score, or if a click is triggered from a website identified as a top site and/or a social website. The server may assign a greater weight to social clicks arising from a top site and/or a social website. In certain embodiments, the server may track the number of corresponding clicks from a document, and the distribution of source websites that triggered the clicks.

Referring now to (465), the server may store a record for each click of the plurality of clicks. The server may store the record in any embodiment of the database 230 described above in connection with FIGS. 2 and 4A. The record may comprise any form of data structure such as a database or hash entry, a table item, or any collection of data associated with a click, document/content, user and/or source website. The record may comprise data about the user and traffic data associated with each click. In some embodiments, the server may store an index of a document identified by a click or clickstream. The server may store, maintain and update an index of documents to facilitate searches for content. The server may, in some embodiments, retrieve and store a document identified via a clickstream in the database 230. In certain embodiments, the server may determine, rank and store a list of top websites based on where the clickstreams arose. The record may include fields or memory space for storing one or more scores, such a social score and/or a relevancy score for a document.

Referring now to (470), the server may determine, based on the records, a relevancy score for each content identified from decoding the encoded URL links. The server may determine the relevancy score via one or more modules, for example, a search relevancy scorer 440, a frequency normalizer 420, a distribution scorer 410 and an engagement scorer 415. In some embodiments, a distribution scorer 410 of the server may determine a distribution score for each content based on a number of clicks from different sources via one or more encoded URL links to the content. The distribution scorer 410 may determine that a document has a higher distribution score, or is more relevant to a search if clicks to access such a document arise from a broader set of source web sites. The distribution scorer 410 may determine the distribution of clicks for the same document across a plurality of sites. The distribution scorer 410 may track or evaluate the number of source sites that referred clicks for a certain document.

In certain embodiments, the server may determine, via an engagement scorer 415, an engagement score for each content based on a number of clicks received via one or more encoded URL links to the content. Each of the number of clicks may be weighted based on when the click was received. The engagement scorer 415 may determine the engagement score of a document based on the number of social clicks made to access the document. The engagement scorer 415 may rank content based on how many corresponding clicks are received. In certain embodiments, the engagement scorer 415 applies a nonlinear function to click counts such that initial clicks are weighted more than later clicks.

In some embodiments, the server may determine, via a frequency normalizer 420, a frequency normalization value for each content. The frequency normalizer 420 may extract keywords from the content, normalize the keyword counts and may store the keywords and corresponding normalization values into a database (e.g., database 230). The frequency normalizer 420 may extract content from a document, such as text-based content, suitable for text-based keyword searches. The frequency normalizer 420 may determine each term or word's frequency of occurrence in the extracted content. The frequency normalizer 420 may normalize the counts of these terms or words. In some embodiments, the frequency normalizer 420 may use td-idf normalization, such as Lucene scoring, to perform the keyword normalization. The frequency normalizer 420 may provide a td-idf value for each document, to determine the relevancy score of the document.

In certain embodiments, the server may apply a time decay function to the relevancy score based on the length of time a content has been stored in a record after being identified from decoding the encoded URL links. In some embodiments, the time decay function is incorporated into the calculation or formula for determining the social score or the relevancy score, for example, as described above in connection with FIG. 4A. The time decay function may incorporate a log-linear time function in certain embodiments. The time decay function may enable a document with links that are more recently clicked to have a higher social and/or relevancy score.

The server may determine, via a search relevance scorer, the relevancy score of a document by a combination of two or more of a social score, a distribution score, an engagement score, a frequency normalization value, a time decay function, a source weighting component and a user weighting component. The search relevancy scorer may rank or index documents based on any one or a combination of these scores or values. For example, the search relevancy scorer may use relevancy scores to return the highest scoring documents in a search, e.g., based on the closest matching keywords.

In further details of (475), the server may communicate, responsive to receiving a request to search content based on a keyword, a set of search results based the keyword and the relevancy score. The server may receive one or more keywords or search terms from a user or application based on a search. In some embodiments, the server The server may process the one or more keywords or search terms into a search relevance query 445, which may include a processed set of terms and/or priority applied to each of the processes terms. The search relevance query 445 may comprise scores for keywords, indexes into specific groups of documents and/or information about the user. In some embodiments, the server may receive the search relevance query 445 from a search engine or an application. The server may apply or match one or a combination of keywords or terms against a listing, database or index of documents. The listing, database or index of documents may be ordered, ranked or indexed based on the documents' relevancy scores and/or document terms. The server may return a set of search results or documents based on the relevancy scores and/or closest matching terms of the documents. In some embodiments, the server may order the set of search results based on relevancy score of the documents.

In certain embodiments, the server may match a plurality of documents against one or a combination of keywords or terms without using the relevancy scores. The server may identify a subset of documents that most closely matches the one or a combination of keywords or terms.

The server may rank this subset of documents based on the how closely the documents matches the one or a combination of keywords or terms. In some embodiments, the server combines this ranking with the relevancy score of these documents, to order the set of search results. The server may, for example, reorder the set of search results based on the relevancy scores or by applying a weighted preference based on the relevancy scores. Using embodiments of the above processes, the server may generate and/or order search results based on the relevance of the documents, e.g., as determined by user interaction, user feedback, and/or based on the popularity of particular content in connection with social media.

E. Systems and Methods for Identifying Trends in Phrases of Content

Figure 5A:
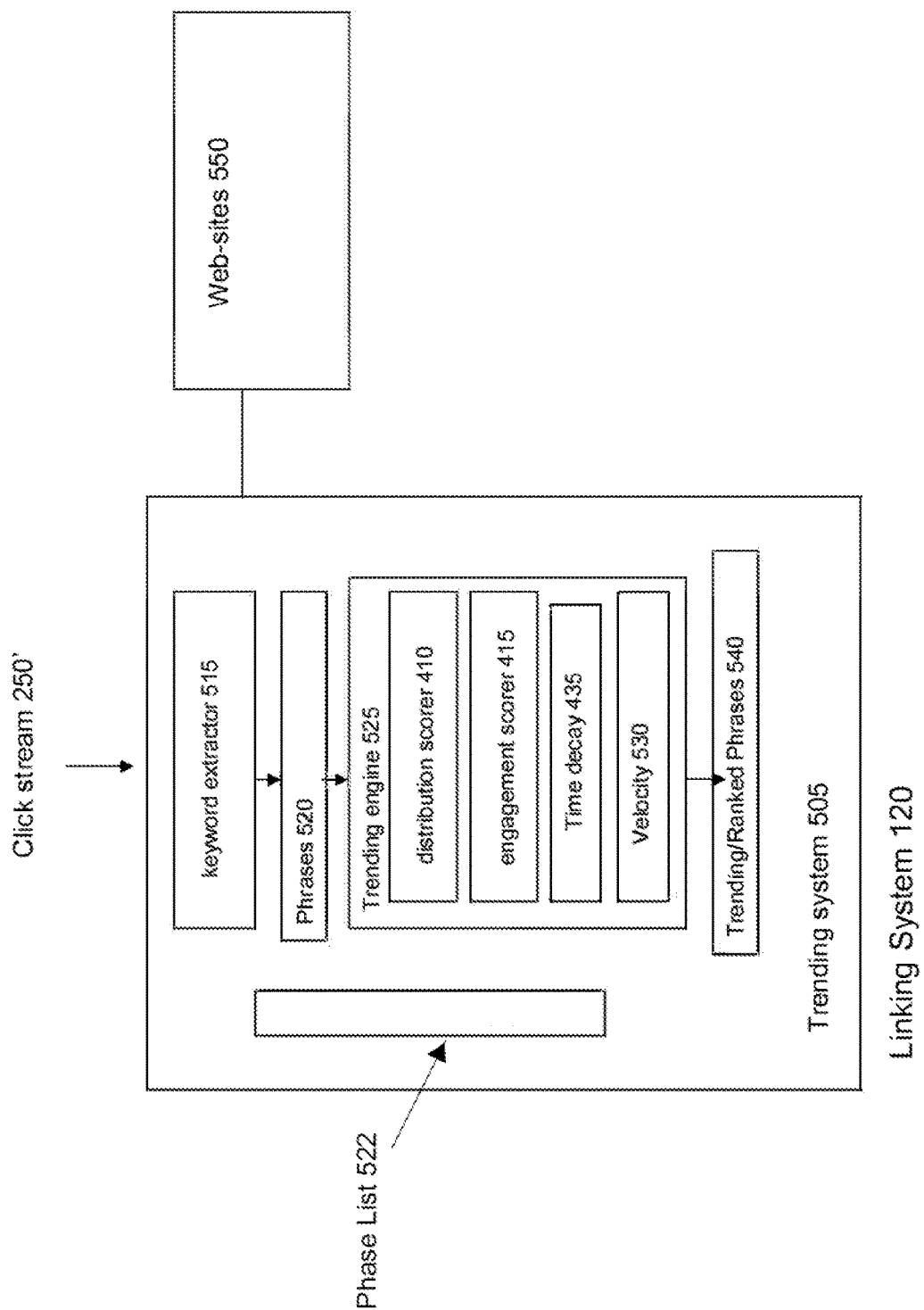
FIG. 5A is a block diagram of an embodiment of a system for identifying trends in phrases of content.
Figure 5B:
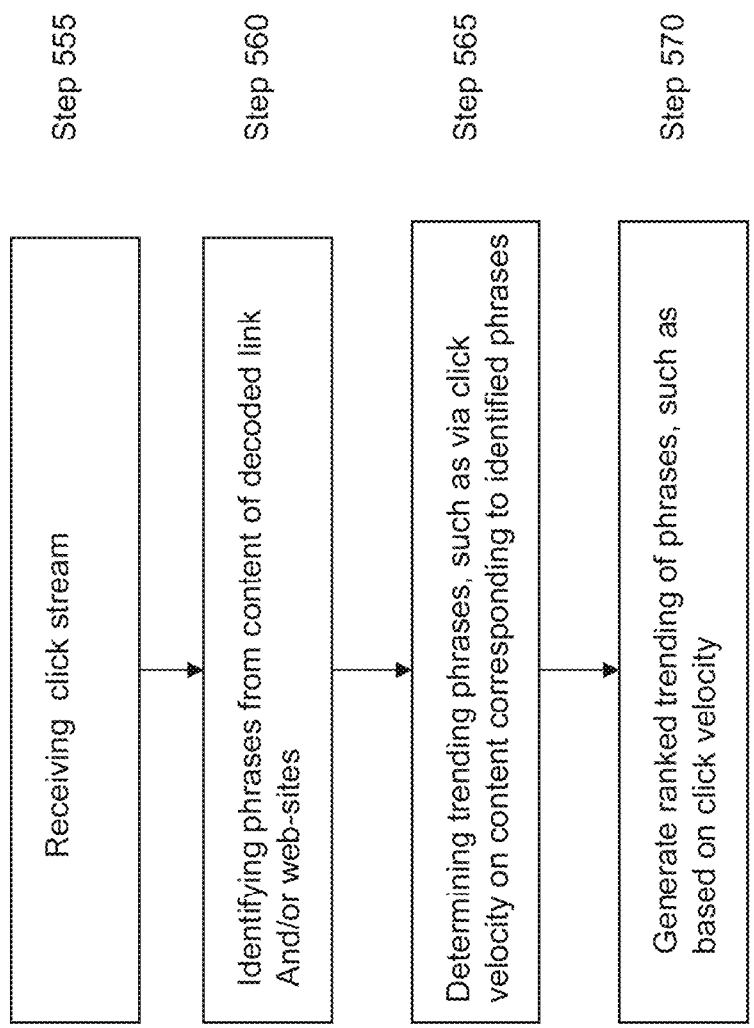
FIG. 5B is a flow diagram of an embodiment of a method for identifying trends in phrases of content.

Referring now to FIGS. 5A and 5B, systems and methods for identifying trends in phrases in content is depicted. These systems and methods may determine trending or popular phrases from user interactions with web content containing, related to or associate with such phrases. These systems and methods identify trending or temporally popular phrases based on aggregating multiple users' interactions with an aggregate of content. Using click stream data and any list of phrases, ontology, or dictionary, systems and methods of the present solution can score web content based on users level of engagement with such content, and deduce the most popular phrases being viewed across a large set of content. These systems and methods may be applied in real-time or statically. These systems and methods may generate or provide a list of phrases or topics that are trending upwards and/or downwards.

Referring now to FIG. 5A, an embodiment of a trending system 505 for identifying trends in phrases related to, contained in, describing or otherwise associated with content for which users interact with or click on is depicted. In brief overview, the system 505 includes a keyword extractor 515 that identifies phrases 520 from content identified via a click stream 250'. The keyword extractor may also identify phrases 520 from a predetermined set of web-sites 550. The keyword extractor may operate responsive a predetermined phrases list 522 by matching phrases found in content to this list. A trending engine 525 may receive these phrases 520 as input and determine which phrases are trending up and/or down or which phrases or topics are most popular. The trending engine may include a velocity engine or component 530. The velocity engine may determine a number of clicks over a predetermined period of time for any one or more phrases across any one or more sites. The trending engine may generate an enumeration or list of phrases 540 that are trending upwards and/or downwards. The list of phrases may be ranked according to the change in trending, popularity or other criteria.

In further detail, the keyword extractor 515 may comprise an application, program, library, process, service, script, task or any type and form of executable instructions for identifying, extracting, or determines keywords and/or phrases from, in, related to, describing or associated with content, such as content the user clicked on an encoded URL link. The keyword extractor 515 may comprise any embodiments of the content extractor 315 described above in connection with FIG. 3A. The keyword extractor 515 may operate responsive to a phrases list 522. In some embodiments, the keyword extractor may be configured with the phrases list. In some embodiments, the keyword extractor may read or process the phrases list from a file, data object or table of a database. The keyword extractor may be designed and constructed to identify or detect keywords and/or phrases from the phrases list in content from or of a digital resource, such as a web page identified by a URL.

The phrases list 522 may comprise any data and information identifying a predetermined set of phrases and/or keywords. The phrases list may comprise a dictionary. The phrases list may comprise an ontology. The phrases list may comprise an enumerated list of phrases and/or keywords. The phrases list may comprise an enumerated list of phrases and/or keywords ranked in order of priority or otherwise having an identified priority. The phrases list may comprise an enumerated list of phrases and/or keywords ordered based on ranking or otherwise having an identified ranking. The phrases list may comprise an enumerated list of phrases and/or keywords with assigned weights or weighting. The phrases list may identify a predetermined list of topics, interests or subject matter. The phrases list may identify a predetermined set of keywords related to or making up a topics, interests or subject matter. The phrases list may be generated from a third-party source, such as a web-site or URL. The phrases list may be generated by the trending engine based on a count of phrases and/or keywords identified in the predetermined list of web-sites. The phrases list may be generated from previous versions of the phrases list. The phrases list may be generated based on learning or intelligence of the trending engine.

The keyword extractor may identify keywords responsive to one or more click streams 250'. In some embodiments, the keyword extractor operates responsive to receipt of a click stream or click action. In some embodiments, the keyword extractor operates in real-time as a click-stream or portions thereof are received by the system 120. In some embodiments, the keyword extractor operates responsive to receipt of a batch of click streams or click actions. In some embodiments, the keyword extractor operates responsive to a predetermined frequency, which may be configurable. In some embodiments, the keyword extractor operates independently from the click stream and identifies keywords from a predetermined set or list of web-sites 550. In some embodiments, the keyword extractor identifies keywords from a predetermined set or list of web-sites 550 on a predetermined frequency. In some embodiments, the keyword extractor identifies keywords from a predetermined set or list of web-sites 550 responsive to an event, such as a user request. In some embodiments, the keyword extractor operates responsive to a click-stream while identifying keywords from a predetermined set or list of web-sites 550.

The list or set of web-sites 550 may include an enumeration or configuration of a predetermined set or list of URLs, web-sites or digital resources. The list or set of web-sites 550 may include a list of the most popular web-sites or URLs. The list or set of web-sites 550 may include a list of the most visited web-sites or URLs. The list or set of web-sites 550 may include a list of the frequently visited web-sites or URLs. The list or set of web-sites 550 may include a list of the highest ranked web-sites or URLs. The list or set of web-sites 550 may include a list of the most searched web-sites or URLs. The list or set of web-sites 550 may include a list of web-sites or URLs selected by a user. The list or set of web-sites 550 may change based on changes in the ranking of any of these web-sites or URLs. The keyword extractor may be configured with the predetermined set or list of web-sites. The keyword extractor may be designed and constructed to read or process a data file, object or table of a database with the predetermined set or list of web-sites. In some embodiments, the list of web-sites 550 comprise a list of N (e.g. 1000) top sites on the internet by reach. This may be identified or pulled from Doubleclick's Top Sites and may include all of the major social sites such as Facebook, Twitter, etc.

The keyword extractor may be designed and constructed to inspect, read or otherwise process any portion of content and match such portions to the phrases list. The keyword extractor may strip images and/or other non-textual elements from the content. The keyword extractor may subtract common words from the textual portions of the content. The keyword extractor may be designed and constructed to inspect, read or otherwise process any text of content and match such text to the phrases list. The keyword extractor may be designed and constructed to inspect, read or otherwise process any meta-data of content and match any strings or text such meta-data to the phrases list. The keyword extractor may be designed and constructed to inspect, read or otherwise process any tags, scripts or mark-up language of content and match any strings or text of such tags, scripts or mark-up language to the phrases list. The keyword extract may be designed and constructed to identify which phrases deviate from a norm relative to other phrases in the content.

The keyword extractor may be designed and constructed to generate, output or provide a set of phrases 520. The keyword extractor may be designed and constructed to interface to or communicate with the trending engine 525. The keyword extractor may enumerate a set of phrases and/or keywords based on a number of instances of the phrase and/or keyword. The keyword extractor may enumerate a set of phrases and/or keywords based on a number of instances of the phrase and/or keyword in the click stream. The keyword extractor may enumerate a set of phrases and/or keywords based on a number of clicks related to the phrase and/or keyword in the click stream. The keyword extractor may enumerate a set of phrases and/or keywords based on a velocity of clicks related to the phrase and/or keyword in the click stream. The keyword extractor may enumerate a set of phrases and/or keywords based on a number of instances of the phrase and/or keyword in the web-sites 550. The keyword extractor may enumerate a set of phrases and/or keywords based on a number of instances of the phrase and/or keyword in both the click stream and in the web-sites. The keyword extractor may enumerate a set of phrases and/or keywords based on an order or ranking from the phrases list 522. The keyword extractor may enumerate a set of phrases and/or keywords based on a corresponding weighting from the phrases list 522. The keyword extractor may enumerate a set of phrases and/or keywords based on temporal information. The keyword extractor may enumerate a set of phrases and/or keywords on a real-time basis as they are generated. The keyword extractor may enumerate a set of phrases and/or keywords on a predetermined basis, such as on a predetermined schedule or at a predetermined frequency.

The keyword extractor may filter the list of phrases based on ranking, priority or weighting, such as may be specified by the phrases list. The keyword extractor may filter the list of phrases based on a predetermined threshold, such as a number of instances of identification of the phrase across content. The keyword extractor may filter the list of phrases based on temporal information and thresholds, such as a number of instances of identification of the phrase across content over a predetermined time period. The keyword extractor may filter the list of phrases based on geography. The keyword extractor may filter the list of phrases based on user profiles. The keyword extractor may filter the list of phrases based on source, such as via click streams or via the predetermined web-sites.

The trending engine 525 may comprise an application, program, library, process, service, script, task or any type and form of executable instructions. The trending engine may comprise functions, operations or logic to identify trends in phrases and/or keywords across digital resources interacted with by users, such as via clicking on encoded links to content related to, described by or containing the phrases and/or keywords. The trending engine may be designed and constructed to process the phrases 520 from the keyword extractor and to determine which of those phrases are trending up and/or down based on user interactions, such as clicking, with digital resources associated with, connected to or comprising those phrases. The trending engine may be designed and constructed to identify which phrases deviate from a norm. The trending engine may be designed and constructed to process the phrases 520 from the keyword extractor and to determine which of those phrases are most popular. The trending engine may be designed and constructed to process the phrases 520 from the keyword extractor and to determine which phrases a user or set of users interact with the most and/or the least. The trending engine may be designed and constructed to process the phrases 520 from the keyword extractor and to determine which of those phrases are from content of an encoded URL that users have clicked on the most and/or the least. The trending engine may be designed and constructed to process the phrases 520 from the keyword extractor and to determine which of those phrases are from content of an encoded URL that users have shared the most and/or the least. The trending engine may be designed and constructed to process the phrases 520 from the keyword extractor and to determine which of those phrases are from content of a URL or web page that has been visited or served the most and/or the least.

The trending engine may comprise any embodiments of the relevance system 405 described in connection with FIGS. 4A and 4B. For example, the trending engine may comprise any embodiments of the distribution scorer 410, engagement scorer 415 and/or time decay function 435 described in connection with FIGS. 4A and 4B. Any embodiments of distribution scorer 410, engagement scorer 415 and/or time decay function 435 may applied to content associated with or comprising the phrases and based on the results the trending engine determines the trending phrases. For example, in some embodiments, the trending engine determines those phrases from or associated with content with the highest raw social score. In some embodiments, the trending engine determines those phrases from or associated with content with the a raw social score greater than a threshold. In some embodiments, the trending engine determines those phrases from or associated with content with the a mapped social score greater than a threshold. In some embodiments, the trending engine determines those phrases from or associated with content with the a total social score greater than a threshold. In some embodiments, the trending engine determines those phrases from or associated with content with the highest number of social referrers or a total number of social referrers greater than a threshold. In some embodiments, the trending engine determines those phrases from or associated with content with the highest number of mapped social referrers or a total number of mapped social referrers greater than a threshold. Any of the scores from the trending engine, such as via the distribution and/or social scorer, may be decayed via the time decay function and the resulting score of content used to identify the trending phrases accordingly.

The trending engine may be designed and constructed to determine a velocity of interaction with content associated with, related to or containing the phrases. The trending engine may determine such velocity via a velocity engine or component. A velocity engine 530 may comprise an application, program, library, process, service, script, task or any type and form of executable instructions. The trending engine may include the velocity engine. In some embodiments, the velocity engine is separate from the trending engine and the trending engine may communicate with or interface to the velocity engine. The velocity engine may be designed and constructed to determine any change in the rate of interaction over time with content associated with, related to or contains with one or more phrases. The velocity engine may be designed and constructed to determine and/or track a number of clicks on an encoded URL over a predetermined time period in which the content from or of the encoded URL is associated with, related to or contains the phrase. The velocity engine may be designed and constructed to determine and/or track a number of clicks on a plurality of encoded URLs over a predetermined time period in which content from the plurality of encoded URLs is associated with, related to or contains the phrase. The velocity engine may be designed and constructed to determine and/or track the velocity of upward or downward trends of a phrase. The velocity engine may be designed and constructed to determine and/or track the velocity of popularity of a phrase. The velocity engine may be designed and constructed to determine and/or track the velocity of serving or visiting content comprising a phrase.

The trending engine may generate, output, communicate or otherwise provide a list or set of one or more trending phrases 540. The output 540 may be an enumerated list or ordered list. The output may be a report. The output may be a file. The output may be data stored in a database. The output may be a web page comprising the trending phrases. The output may be any digital resource comprising or identifying the trending phrases. The trending engine may output the set of trending phrases via an API call, event or function to an application, program or system. For example, the trending engine may output the set of trending phrases via XML. The trending engine may output the set of trending phrases via a web service call or response to a web service call. The trending engine may output the set of trending phrases via raising an event or calling a function.

The output may be an encoded URL identifying a digital resource comprising or identifying the trending phrases. In some embodiments, the trending phrases or output 540 comprises a list of phrases that are trending upwards. In some embodiments, the trending phrases or output 540 comprises a list of phrases that are trending upwards above, below or within a predetermined threshold. In some embodiments, the trending phrases or output 540 comprises a list of phrases that are trending downwards. In some embodiments, the trending phrases or output 540 comprises a list of phrases that are trending downwards above, below or within a predetermined threshold. The trending phrases or output 540 may be in ascending or descending order.

In the output 540, the trending engine may identify for each or some of the phrases in the phrases list a ranking or placement in the ranking. For each of the phrases from the phrases 520 and/or phrases list, the trending engine may determine a change in the ranking or the placement of the phrase from a previous instance of producing output 540 by the trending engine. In the output, for each of the phrases from the phrases 520 and/or phrases list, the trending engine may determine a change in the ranking or the placement of the phrase during a predetermined time period. For each of the phrases from the phrases 520 and/or phrases list, the trending engine may determine a percentage or degree change in the ranking or the placement of the phrase from a previous instance of producing output 540 by the trending engine. For each of the phrases from the phrases 520 and/or phrases list, the trending engine may determine a percentage or degree change in the ranking or the placement of the phrase over a predetermined time period.

Referring now to FIG. 5B, an embodiment of a method for identifying trends in phrases based on an aggregate of users interactions with an aggregate of content is depicted. In brief overview, the method, at step 555, a server, such as via linking system 120, receives a click stream. At step 560, the server identifies phrases from content of decoded links from the click stream. The server may also identify phrases from content of a predetermined list of web-sites. At step 565, the trending engine determined trending phrases, such as based on click velocity. At step 570, the trending engine generates a set of trending phases, such as responsive to determined click velocity.

At step 555, a server or system, such as linking system 120, receives one or more click streams. The server may receive user actions via click streams 250'. The server may a click stream via or comprising a user interacting, user or accessing a digital resource. The server may receive a click stream from the digital resource. The server may receive a click stream via a user requesting to encode an URL. The server may receive a click stream via a user clicking on an encoded URL. The server may receive a click stream via a request to decode an encoded URL. The server may receive a clicks stream via a client linking system API or application 225. The server may receive a click stream via a log file or activity log from an application, system, device or server. The server may decode any encoded URLs of the received click streams to identify associated content or content of the URL. The server may decode any encoded URLs upon receipt of the click stream.

At step 560, the server or system, such as via the keyword extractor, identifies phrases from, associated with, describing or related to content that users are interacting with or clicking on. The keyword extractor may identify phrases corresponding to a list of phrases 522 from content identified via decoding of encoded URLs. The keyword extractor may operate responsive to receipt of a user action or a click stream. The keyword extractor may identify phrases corresponding to a list of phrases 522 from content of a predetermined set or list of web-sites or URLs. The keyword extractor may identify phrases corresponding to a list of phrases 522 from content of a predetermined set or list of digital resources. The keyword extractor may operate responsive to a predetermined schedule for extracting or identifying keywords from these web-sites, URLs or digital resources. The keyword extractor may operate responsive to a change in the list of web-sites, URLs or digital resources. The keyword extractor may filter the phrase list according to ranking, priority, weighting, geography or temporal information. The keyword extractor may filter the list of phrases based on a threshold.

At step 565, the trending engine determines trends in the phrases, such as the phrases provided or generated by the keyword extractor. The trending engine may determine trends responsive to receipt of phrases from the keyword extractor. The trending engine may determine trends responsive to a predetermined schedule. The trending engine may determine trends on demand, such as responsive to a user request. The trending engine may determine trends responsive to any combination of the distribution scorer, engagement scorer and time decay functions. The trending engine may determine trending phrases from content with the highest or higher scores from the distribution scorer, engagement scorer and/or time decay functions. The trending engine may determine the number of instances of user action with a digital resource associated with or comprising one or more phrases. The trending engine may determine the number of instances over a predetermined time period of user action with a digital resource associated with or comprising one or more phrases. The trending engine, such as via the velocity engine, may determine a velocity of interaction by users with digital resources, such as content, associated with, related to or containing the phrases. The trending engine, such as via the velocity engine, may determine a velocity of interaction by users with content associated with, related to or containing the phrases. The trending engine may determine a velocity of user actions on with content associated with, related to or containing the phrases. The trending engine may determine a velocity of click actions to content associated with, related to or containing the phrases.

At step 570, the trending engine produces or generates a set of trending phrases responsive to determining the trends in the phrases. The trending engine may output the set of trending phrases responsive to the determination(s) of step 565. The trending engine may output the set of trending phrases responsive to a predetermined schedule. The trending engine may output the set of trending phrases on demand, such as responsive to a user request. The trending engine may output the set of trending phrases via an API call, event or function to an application, program or system. The trending engine may output a ranking of trending phrases, such as top N most upward trending phrases or top N most downward trending phrase. The trending engine may output a ranking of trending phrases, such as top N most popular phrases or top N least popular phrases. The trending engine may output an ordered list of trending phrases in increasing or decreasing velocity. The trending engine may output an ordered list of trending phrases with greatest change in velocity. The trending engine may output an ordered list of trending phrases with slowing or least amount of change in velocity.

Although the systems and methods may be generally described herein in reference to phrases, the systems and methods may be designed and constructed to determine a trending topic corresponding to a set or group of phrases. For example, the trending engine may be designed and constructed to organize or arrange a group of phrases into a topic. The trending engine may be designed and constructed to associate or identify that a group of phrases correspond to or describe a topic. In some embodiments, the phrases list may be constructed or organized to associate phrases with topics and the keyword extractor and trending engine operate responsive to this embodiment of the phrases list. Any of the systems and methods described herein may operate or be responsive to a group of phrases and produce a set of trending topics in accordance with the embodiments described herein.

F. Systems and Methods for Identifying Trends and Relevance of Phrases for a User Referring now to FIGS. 6A and 6B, systems and methods for identifying phrases that are relevant to specific user from the phrases that are trending among an aggregate of users interactions with an aggregate of content relevance is depicted. The embodiments of the systems and methods described in connection with FIGS. 3A and 3B for relevance scoring may be combined with embodiments of the systems and methods described in connection with FIGS. 5A and 5B for trending to provide systems and methods for identifying trends in phrases across multiple users and the relevance of such phrases for a particular user. By combining trending phrases with relevance scoring, the systems and methods of embodiments of the present solution can determine which content or phrases is most relevant to a specific user based on trending phrases from an aggregate set of users.

Figure 6A:
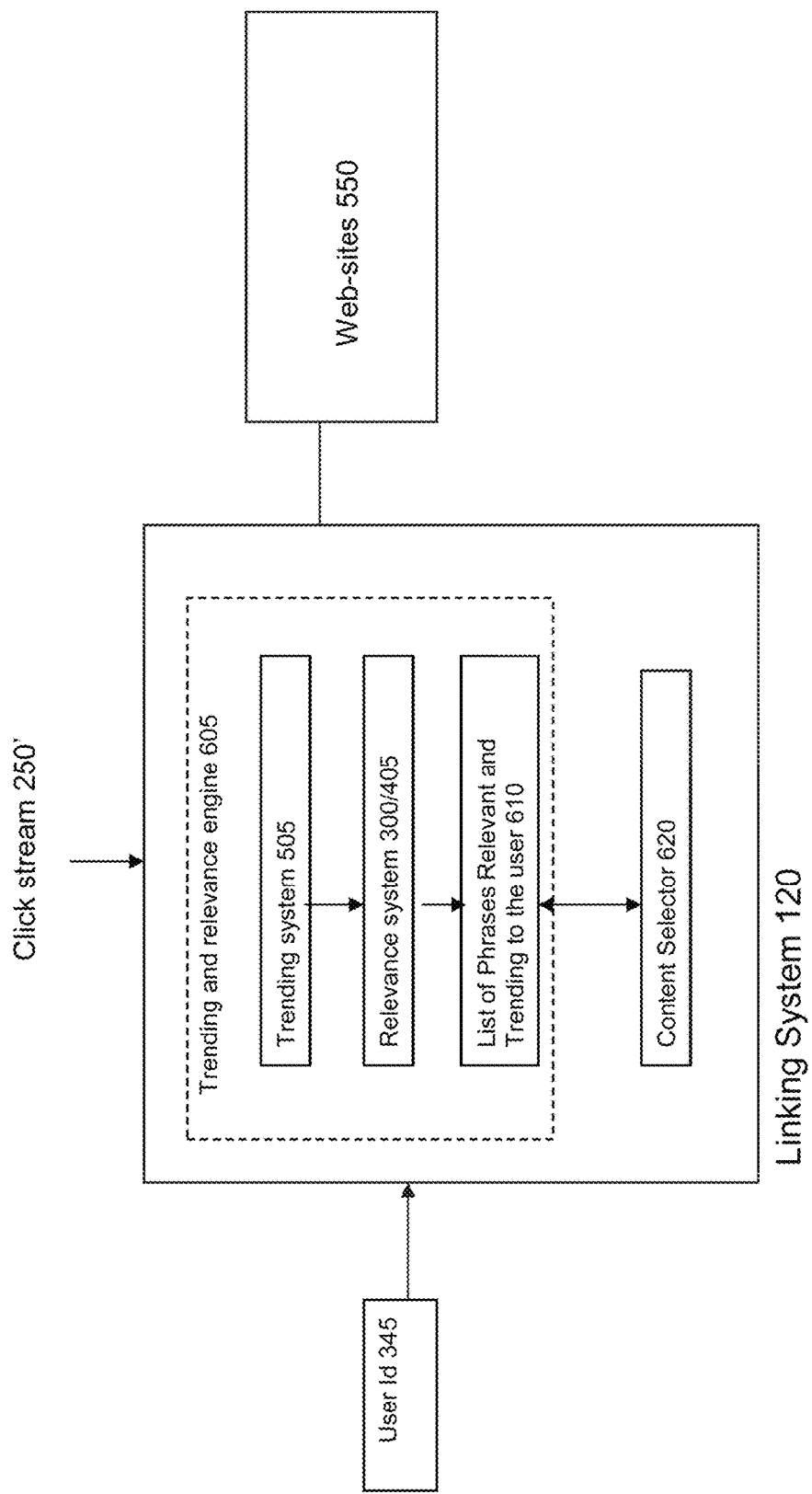
FIG. 6A is a block diagram of an embodiment of a system for identifying trending and relevance of phrases.
Figure 6B:
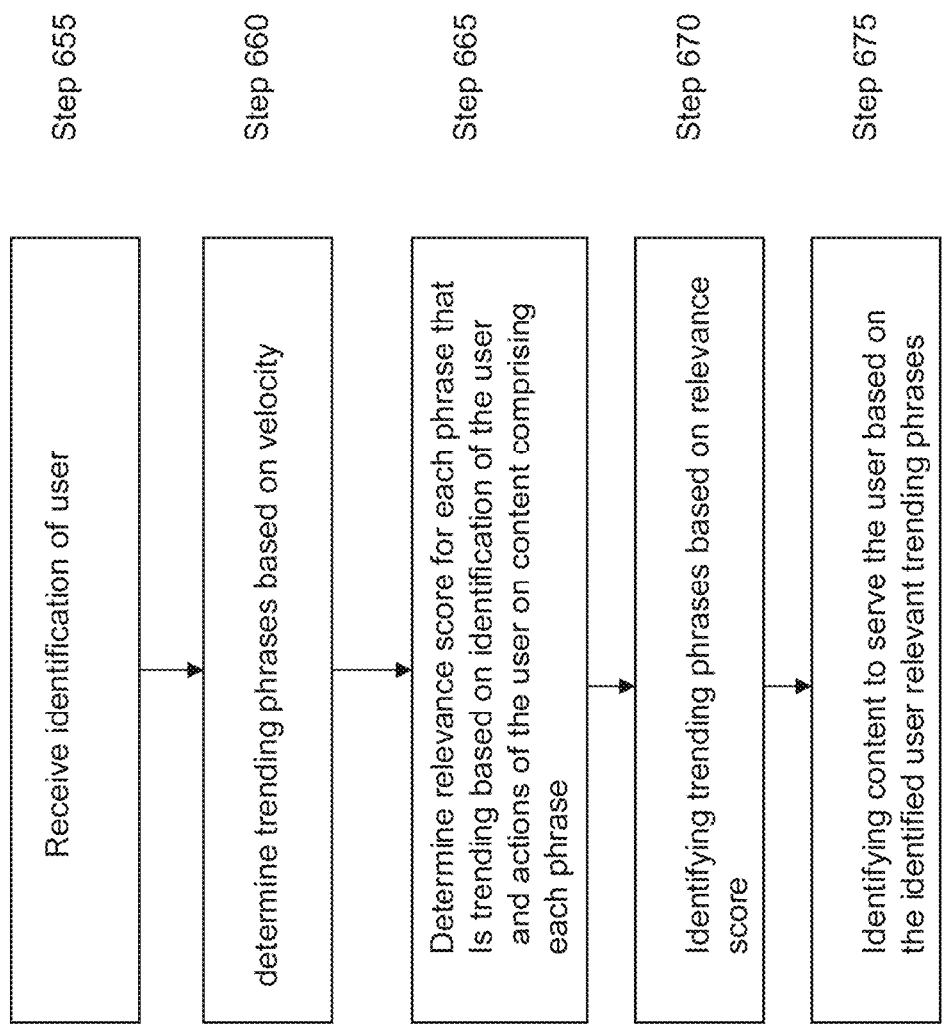
FIG. 6B is a flow diagram of an embodiment of a method for identifying trending and relevance of phrases.

Referring now to FIG. 6A, a system for identifying those phrases trending for an aggregate set of users which is relevant to a specific user is depicted. In brief overview, the system includes a trending and relevance engine 605 which may include a trending system 505 and a relevance system 300. The system may receive identification of a user via user id 345. The system identifies via the trending system those phrases that are trending, such as across an aggregate set of users interactions (e.g., clicks) with an aggregate of content. Further responsive to the user id, the system identifies those trending phrases from the aggregate set of user interactions that have the most relevant score to the user via the relevance system. The system outputs a list of phrases relevant and trending to the user 610. A content selector 620 may use this list to identify the most relevant content to provide or server the user.

The system may include any embodiments of the trending system 505 described in connection with FIGS. 5A and 5B. The system may include any embodiments of the relevance system 300 described in connection with FIGS. 3A and 3B. The system may include any embodiments of the relevance search system 405 described in connection with FIGS. 4A and 4B. The trending system may be designed and constructed to interface to, communicate to or integrate with the relevance system. The trending system may provide a list of phrases 540 to the relevance system. The relevance system may be designed and constructed to interface to, communicate to or integrate with the trending system. The relevance system may provide a list of digital resources and relevance scores 330 to the trending system. The trending system and relevance system may be designed and constructed to work in cooperation or in conjunction with each other. In some embodiments, the trending system and relevance system are combined or constructed into a single application, component, module or system. Any of the above embodiments may be generally referred to as the trending and relevance engine 605 or the relevance and trending engine 605. The system may apply any of the scoring and weighting functions of any embodiments of the relevance system 300/405 described herein in combination with or otherwise to trending phrases.

The trending and relevance engine may comprise any functionality, operations and/or logic to identify phrases that are trending for the user identified by the user id. The trending and relevance engine may comprise any functionality, operations and/or logic to identify digital resources that are most relevant to the user. The trending and relevance engine may comprise any functionality, operations and/or logic to identify phrases that are trending upwards and/or downwards in digital resources interacted with by an aggregate of users and that are most or more relevant to the user. The trending and relevance engine may comprise any functionality, operations and/or logic to identify phrases that are trending upwards and/or downwards in digital resources interacted with by an aggregate of users and that are least or less relevant to the user.

The trending and relevance engine may identify phrases that are trending in digital resources that the user is interacting with. The trending and relevance engine may identify phrases that are trending (upwards or downwards) in digital resources interacted with by an aggregate of users and having a relevance score for the user greater than a predetermined threshold. The trending and relevance engine may identify phrases that are trending (upwards or downwards) in digital resources interacted with by an aggregate of users and having a relevance score for the user less than a predetermined threshold. The trending and relevance engine may identify phrases that are trending (upwards or downwards) in digital resources interacted with by an aggregate of users and having a relevance score for the user and velocity greater than a predetermined threshold.

The trending and relevance engine may generate or calculate a relevance score for content that the user interacted with and for which includes one or more phrases corresponding to the list of phrases 522. In some embodiments, while the trending and relevance engine determines trending phrases in content for which users have interacted with, the trending and relevance engine may also determine a relevance score of how relevant that content is to the user. In some embodiments, the trending portion of the trending and relevance engine identifies the trending phrases content corresponding to the trending phrases. The relevance portion of the trending and relevance engine may provide a relevance score for the trending phrase or the content corresponding to each of the trending phrases. In some embodiments, the relevance portion of the trending and relevance engine identifies from the trending phrase or corresponding content, those trending phrases or content most relevant to the user.

In some embodiments, the trending and relevance engine performs relevance scoring on each content of a plurality of content corresponding to a phrase and takes an average, weighted average or other function of these scores to provide a relevance score for all content associated with a phrase.

The trending and relevance engine may identify trending or temporally popular phrases based on aggregating multiple users' interactions with an aggregate of content and comparing such phrases to a list of phrases of a particular user via the user's click history and/or user profile. The trending and relevance engine may match phrases between the aggregate user's trending phrases and the phrases from the user's history or profile to provide a set of trending phrases for the user. In some embodiments, the match of phrases from the trending phrases of the aggregate users to the phrases of the user may be referred to as trending phrases of or for the user. The trending and relevance engine may perform a relevance score for such matching or trending phrases of the user, or for any content associated with such phrases.

As a result of operation, the trending and relevance engine identifies phrases that are trending (upwards and/or downwards) in content that an aggregate of users is interacting with/clicking on and which is most or more relevant (and/or less or least relevant) to the user based on the relevance score. The relevance and trending engine may generate, output, communicate or otherwise provide a list or set of one or more user specific relevant trending phrases 610. The output 610 may be an enumerated list or ordered list. The output may be a report. The output may be a file. The output may be data stored in a database. The output may be a web page comprising the user relevant trending phrases. The output may be any digital resource comprising or identifying the user relevant trending phrases. The trending engine may output the set of relevant trending phrases via an API call, event or function to an application, program or system. For example, the trending and relevance engine may output the set of user relevant trending phrases via XML. The trending engine may output the set of relevant trending phrases via a web service call or response to a web service call. The trending and relevance engine may output the set of user relevant rending phrases via raising an event or calling a function.

The output 610 may be an encoded URL identifying a digital resource comprising or identifying the user relevant trending phrases. In some embodiments, the user relevant trending phrases or output 610 comprises a list of phrases that are trending upwards in content most relevant to the user. In some embodiments, the user relevant trending phrases or output 610 comprises a list of phrases that are trending upwards in content least relevant or becoming less relevant to the user. In some embodiments, the user relevant trending phrases or output 610 comprises a list of phrases that are trending upwards above, below or within a predetermined threshold are most relevant and/or least relevant to the user. In some embodiments, the user relevant trending phrases or output 610 comprises a list of phrases that are trending downwards and are most and/or least relevant to the user. In some embodiments, the user relevant trending phrases or output 610 comprises a list of phrases that are trending downwards in content becoming less relevant or least relevant to the user. In some embodiments, the user relevant trending phrases or output 610 comprises a list of phrases that are trending downwards above, below or within a predetermined threshold in content most and/or least relevant to the user.

In the output 610, the relevance and trending engine may identify for each of the phrases for the user a ranking or placement in the ranking. The relevance and trending engine may determine a change in the ranking or the placement of the phrase from a previous instance of producing output 610 by the relevance and trending engine. In the output, the relevance and trending engine may identify a change in the ranking or the placement of the phrase during a predetermined time period. The relevance and trending engine may determine a percentage or degree change in the ranking or the placement of the phrase from a previous instance of producing output 540 by the relevance and trending engine. In the output, the relevance and trending engine may identify a percentage or degree change in the ranking or the placement of the phrase over a predetermined time period. In the output, the relevance and trending engine may identify a relevance score for each of the trending phrases. In the output, the relevance and trending engine may identify a relevance score and a trending indicator for each of the trending phrases for the user.

A content selector 620 may select or identify content to serve a user based on the output 610 from the trending and relevance engine 605. The content selector 620 may comprise an application, program, library, process, service, script, task or any type and form of executable instructions. The content selector may operate responsive to trending and relevance engine. The content selector may select content to server a user based on or using any information provided in any embodiments of the list of user relevant trending phrases 610. In some embodiments, the content selector 620 operates or executes on a system, server, or application in communication over a network to the trending and relevance engine. In some embodiments, the content selector may be embedded or included in a web page or other content served by the system, server or application. A content selector may identify from a plurality of content from one or more web-sites the user is visiting, the content that has highest trending phrases and is most relevant to user. Responsive to identifying such content, the system, server, or application may serve or provide the content to the user.

Referring now to FIG. 6A, an embodiment of a method for identifying trending or temporally popular phrases based on aggregating multiple users' interactions with an aggregate of content and that are relevant to a specific user is depicted. In brief overview, at step 655, the system receives identification of the user. At step 660, the system determines trending phrases for the user. At step 665, the system determines relevance score of content associated with or comprising the trending phrases. At step 670, the system identifies user relevant trending phrases. At step 675, content to serve the user is selected based on the user relevant trending phrases.

In further details, at step 655, the trending and relevance engine receives identification of a user via any type and form of user id. The trending and relevance engine may receive a request to provide a list of user relevant trending phrases for a user identified by the user identifier. In some embodiments, the trending and relevance engine receives the user id via a cookie. The trending and relevance engine may receive a user identifier or a request from any application, system or server. In some embodiments, a third party web site serving content may transmit the request and a user identifier to the trending and relevance engine. In some embodiments, an ad server serving advertisement or matching content to impression opportunities may transmit the request and/or a user identifier to the trending and relevance engine scorer. In some embodiments, a client application may transmit the request and/or a user identifier to the trending and relevance engine.

At step 660, the trending and relevance engine determines phrases that are trending based on the aggregate of multiple users' interactions with an aggregate of content and which are relevant, such based on a relevance score, to the user identified by the user id. The trending and relevance engine may determine trending phrases based on any embodiments of the systems and methods described in connection with FIGS. 5A and 5B. For example, the trending and relevance engine may determine which phrases are trending for the aggregate of users and compare those phrases with a click history or user profile of the user specified by the user id. The trending and relevance engine may perform or provide a relevance score for those matching phrases.

In another example, the trending and relevance engine may determine trending phrases for the user based on the number of instances of user action by the user with a digital resource associated with, related to or containing one or more phrases. The trending and relevance engine may determine trending phrases by the user based on the number of instances over a predetermined time period of user action by the user with a digital resource associated with, related to or containing one or more phrases. The trending and relevance engine, such as via the velocity engine, may determine trending phrases for the user based on a velocity of interaction by the user with digital resources, such as content, associated with, related to or containing the phrases. The trending and relevance engine, such as via the velocity engine, may determine trending phrases for the user based on a velocity of interaction by the user with content associated with, related to or containing the phrases. The trending and relevance engine may determine trending phrases for the user based on a velocity of user actions by the user with content associated with, related to or containing the phrases. The trending and relevance engine may determine trending phrases for the user based on a velocity of click actions by the user to content containing, related to or otherwise associated with the phrases.

At step 665, the trending and relevance engine determines for the user identified by the user id the relevance of the phrases from the trending phrases. In some embodiments, step 665 is performed in conjunction with, during or as part of step 660. For the content containing, related to or associated with the trending phrases, the trending and relevance engine determines a relevance score for the user for such phrases or content. In some embodiments, the trending and relevance engine determines a relevance score for phrases or content associated with phrases trending upwards for the user. In some embodiments, the trending and relevance engine determines a relevance score for phrases or content trending downwards for the user. In some embodiments, the trending and relevance engine determines a relevance score for phrases or content associated with phrases trending upwards and/or downwards for the user within a predetermined threshold. In some embodiments, the trending and relevance engine determines a relevance score for phrases or content associated with phrases trending upwards and/or downwards for the user within a predetermined time period. In some embodiments, the trending and relevance engine determines a relevance score for phrases or content associated with phrases trending upwards and/or downwards for the user with or within a predetermined velocity. In some embodiments, the trending and relevance engine determines a relevance score for phrases or content associated with a top number of trending phrases.

At step 670, the trending and relevance engine generates or provides a list of user relevant trending phrases 610. The trending and relevance engine may generate or provide a list of user relevant trending phrases 610 responsive to steps 655, 660 and/or 665. The trending and relevance engine may enumerate the list of user relevant trending phrases 610 in ascending or descending order. The trending and relevance engine may enumerate the list of user relevant trending phrases 610 based on relevance. The trending and relevance engine may enumerate the list of user relevant trending phrases 610 based on trend velocity. The trending and relevance engine may enumerate the list of user relevant trending phrases 610 based on relevance and trend velocity. The trending and relevance engine may enumerate the list of user relevant trending phrases 610 based on a function of relevance and trend velocity. The trending and relevance engine communicates or provides a list of user relevant trending phrases 610 to a requestor, such as a user, application, server or system. The trending and relevance engine communicates or provides a list of user relevant trending phrases 610 to the content selector.

At 675, a content selector may select content to serve the user responsive to the trending and relevance engine. The content selector may select content from a plurality of possible content to serve the user based on the user relevant trending phrases. The content selector may select content from a plurality of possible content to serve the user based on the highest trending phrase in the user relevant trending phrases. The content selector may select content from a plurality of possible content to serve the user based on the most relevant phrase in the user relevant trending phrases. The content selector may select content from a plurality of possible content to serve the user based on the most relevant and highest trending phrase in the user relevant trending phrases. In some embodiments, the content selector provides a digital resource id and user id to the trending and relevance engine to determine what content to select and serve to the user.

G. Systems and Methods for Tracking Influence of a User on Content Shared Via Encoded Uniform Resource Locator (URL) Link Referring now to FIGS. 7A and 7B, systems and methods for tracking influence of a user on content shared via encoded URLs is depicted. Influence of a user, generally referred to as influence, may identify what level of engagement by other users does a particular user drive to content when the user shares content. For example, a high influencer may be a user who drives a high level of engagement with content when the user shares content. A low influencer may be a user who does not drives a high level of engagement, or otherwise drivers a low level of engagement with content when the user shares content. To measure or rate influence, embodiments of the systems and methods of the present solution may correlate who encoded a link, how important or how much traffic does the encoded link generate, who clicked on the encoded link and the topics or phrases associated with the links. From this correlation, these systems and methods may determines a ranking or rating of the influence of a user which may stored in the user's profile. The influence rating of the user may be used by a relevance system to provide user weighting to relevance and trending scoring systems, such as any embodiments of such systems herein.

Figure 7A:
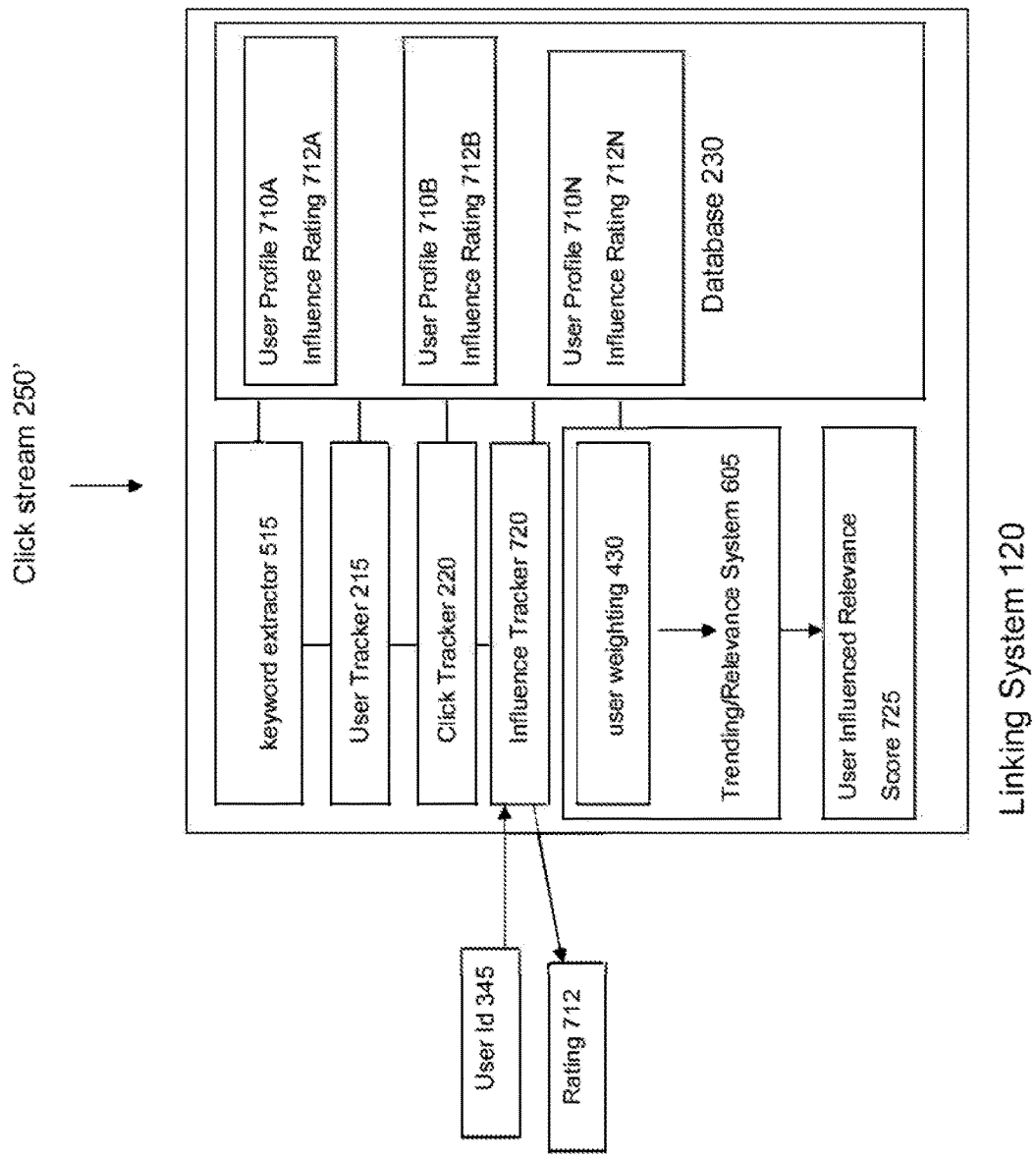
FIG. 7A is a block diagram of an embodiment of a system for tracking influence of a user on content shared via encoded uniform resource locator (URL) links.

Referring now to FIG. 7A, a system for tracking influence of a user is depicted. In brief overview, the system may include a keyword extractor 515, user tracker 215 and click tracker 220 as previously described herein. The system may include an influence tracker 720 that correlates information from the keyword extractor 515, user tracker 215 and click tracker 220 to determine an influence rating 712A-712N (generally referred to as influence rating 712) for each of a plurality of users, which may be stored in the user's profile 710A-710N (generally referred to as user profile 710). Based on the influence rating of a user, a relevance system 605 may provide user weighting 430 to a relevance score to up weight or down weight the score to result in a user influence relevance score 725. A user's influence rating 712 may be queried or obtained by request using a user identifier 345.

The trending and relevance system 605 may comprise any embodiments of the trending and relevance system 605 described herein. In some embodiments, the trending and relevance system 605 comprises the trending system 405. In some embodiments, the trending and relevance system 605 comprises the trending system 505. In some embodiments, the trending and relevance system 605 comprises the relevance system 300. In some embodiments, the trending and relevance system 605 comprises the relevance system 300. In some embodiments, the trending and relevance system 605 comprises the relevance system 405. Any of these embodiments may be referred to as a relevance based system.

Each of the keyword extractor 515, user tracker 215 and click tracker 220 may comprise any embodiments of keyword extractor 515, user tracker 215 and click tracker 220 described herein. The keyword extractor, user tracker and click tracker may be designed and constructed to interface to, communicate with or integrate to the influence tracker. The influence tracker may be designed and constructed to interface to, communicate with or integrate to keyword extractor, user tracker and/or click tracker. The keyword extractor, user tracker and click tracker may be designed and constructed to work in cooperation or in conjunction with the influence tracker. In some embodiments, the keyword extractor, user tracker, click tracker and influence tracker 720 are combined or constructed into a single application, component, module or system. Any of the above embodiments may be generally referred to as an influence system or the influence tracker 720.

In further details, the influence tracker 720 may comprise an application, program, library, process, service, script, task or any type and form of executable instructions. The influence tracker may comprise functions, operations and logic to determine the influence of a user based on information tracked by the linking system relative to, associated with or in connection with a specific user. In some embodiments, the influence tracker may operate responsive to the link encoder and/or link decoder. In some embodiments, the influence tracker may operate responsive to the user tracker. In some embodiments, the influence tracker may operate responsive to the click tracker and/or click analyzer 235.

The influence tracker may identify, track and correlate information on what links the user encoded, the traffic generated by the user's encoded links, who clicked on the user's encoded links and topics or phrases associated with the content from the user's encoded links. In some embodiments, the influence tracker identifies and tracks the URLs encoded by a user. In some embodiments, the influence tracker identifies and tracks the number of URLs encoded by a user, such as via the link encoder and user tracker. In some embodiments, the influence tracker identifies and tracks the content from the URL encoded by the user. In some embodiments, the influence tracker identifies and tracks keywords and/or phrases of the content from the URL encoded by the user. In some embodiments, the influence tracker identifies and tracks topics or subject matter of the content from the URL encoded by the user. In some embodiments, the influence tracker identifies and tracks trending phrases of the content from the URL encoded by the user. In some embodiments, the influence tracker identifies and tracks the number of clicks and/or number of other users who clicked on the encoded URL encoded by the user. In some embodiments, the influence tracker identifies and tracks the sources or sites from which of other users clicked on the encoded URL encoded by the user.

The influence tracker may store any of the identified and tracked information associated with the user to a user profile 710. The user profile may comprise a data structure, data object, file or one or more tables, such as data, objects or tables stored in a database. The user profile may store an aggregation of the information identified and tracked by the influence tracker. The user profile may store any statistics or metrics of the information identified and tracked by the influence tracker. The user profile may store a history of any of the information identified and tracked by the influence tracker. The user profile may store influence rating of the user. The user profile may store a history of influence ratings of the user, such as changes and updated to the influence rating of the user.

The influence tracker may process, analyze and correlate any of the information tracked by the system of the user, such as any information tracked via the above described embodiments or stored in the user profile, to determine, generate or otherwise provide an influence rating or score 712 for the user. The influence rating or score of a user identifies a level of engagement by other users that a particular user drives or causes when sharing content (e.g. how much influence as user has for others to interact or engage with content when the user shares content). An influential user is someone who drives or causes a higher or high level of engagement or interaction with content when the user shares content such as via forwarding or distributing encoded links. The influence rating may identify a number of clicks from other users that a particular user drives when sharing content. In some embodiments, the influence tracker generates the influence rating 712 based on applying a function or algorithm to any combination of number of encoded URLs encoded by the user, how much traffic (e.g., number of clicks) generated by encoded URLs encoded by the user, who clicked on the encoded URLs encoded by the user and the topics associated with the encoded URLs encoded by the user. In some embodiments, the influence tracker in generating or computing the influence rating may weight any of the components or factors making up the influence rating in any manner. In some embodiments, the influence tracker uses a time decay function 435 to modify, change or affect the influence rating based on temporal information related to user and any of the components or factors making up the influence rating.

For example, in some embodiments, the influence tracker may compute the influence rating as function of a number of URLs encoded by the user and the number of clicks on the encoded URLs encoded by the user. In another example, the influence tracker may compute the influence rating as function of a number of URLs encoded by the user and/or the number of clicks on the encoded URLs encoded by the user and the influence rating of users who clicked on the encoded URL of the user. In another example, the influence tracker may compute the influence rating as function of a number of URLs encoded by the user and/or the number of clicks on the encoded URLs encoded by the user and the popularity or ranking of the web-sites from which users clicked on the encoded URL of the user. In another example, the influence tracker may compute the influence rating as function of a number of URLs encoded by the user and/or the number of clicks on the encoded URLs encoded by the user and the popularity or ranking of the phrases, keywords or topics of the content from or associated with the encoded URL of the user. In another example, the influence tracker may compute the influence rating as function of a number of URLs encoded by the user and/or the number of clicks on the encoded URLs encoded by the user and the trending of phrases, keywords or topics of the content from or associated with the encoded URL of the user. In another example, the influence tracker may compute the influence rating as a function of a relevance score for content of encoded URLs of the user. In another example, the influence tracker may compute the influence rating as a function of an engagement score and/or distribution score for content of encoded URLs of the user. In another example, the influence tracker may compute the influence rating as a function of geography of the user and/or the users clicking on the user's encoded URL.

In another example, the influence tracker may compute the influence rating as a function of any combination of a relevance score, engagement score, distribution score, social score, geography, search relevance score, a number of URLs encoded by the user and/or the number of clicks on the encoded URLs encoded by the user, popularity or ranking of web-sites from which users clicked the encoded URL of the user, popularity or ranking of the phrases, keywords or topics of the content from or associated with the encoded URL of the user and/or the trending of phrases, keywords or topics of the content from or associated with the encoded URL of the user The influence rating 712 may comprise a value that provides an indication of or otherwise identifies how influential a user, such as the influence of a user when sharing encoded URLs. The influence rating may be generated for or on an absolute or relative scale. The influence rating may be generated for or normalized to a predetermined influence rating range, such as for example −100 to 100, 0 to 100 or X to Y. The influence tracker may store the influence rating to the user's profile. The influence tracker may update the influence rating in the user's profile.

As click streams are received over time by the system 120, the influence tracker may regenerate, re-compute or re-determine the influence rating of a user. In some embodiments, the influence tracker determines the influence rating dynamically in real-time. As a click stream is received that impacts or affects the user's influence, the influence tracker may update the user's profile with tracked information and regenerate the user's influence rating. In some embodiments, the influence tracker determines the influence rating on a predetermined basis, such as once a day at a certain time. In some embodiments, the influence tracker determines the influence rating on an adhoc or on-demand basis, such as responsive to a request for the user's influence rating. In some the influence tracker determines the influence rating on an event basis, such as when the user encodes a URL or the system receives a user action from a click of the encoded URL encoded by the particular user.

The influence rating 712 and/or user profile may provide for or impact the user weighting 430 applied during any trending and/or relevance scoring system 605 described herein. In some embodiments, the influence rating is the user weighting. In some embodiments, the user weighting is a function of the influence rating. In some embodiments, the system 605 may convert the influence rating using any type and form of scaling or conversion factor to the user weighting 430. In some embodiments, the system 605 queries the influence tracker for the influence rating of a user identified by the user id 345. In some embodiments, the system 120 uses the influence rating 712 to up weight or down weight any relevance score and/or trending indicator. In some embodiments, the system 120 uses information in user profile(s) to up weight or down weight any relevance score and/or trending indicator.

Based on applying the influence rating and/or user weighting and/or the user profile, the system 605 provides a user influenced relevance score 725. In some embodiments, the relevance scores 325 described in FIG. 3A may use the influence rating 712 and/or user weighting 430 to determine or generate a relevance score 330 that is a user influenced relevance score 725. In some embodiments, the user influenced relevance score may comprises the relevance score(s) for content in the relevance search results 450 as described in FIG. 4A with the user weighting 430 based on the influence rating 712 of a specified user. In some embodiments, the trending/ranked phrases 540 described in FIG. 5A may use the influence rating 712 and/or user weighting 430 to determine or generate a user influenced relevance score 725 for such trending/ranked phrases. In some embodiments, the relevant trending phrases 610 described in FIG. 6A may use the influence rating 712 and/or user weighting 430 to determine or generate a user influenced relevance score 725 for such relevant trending phrases 610.

Figure 7B:
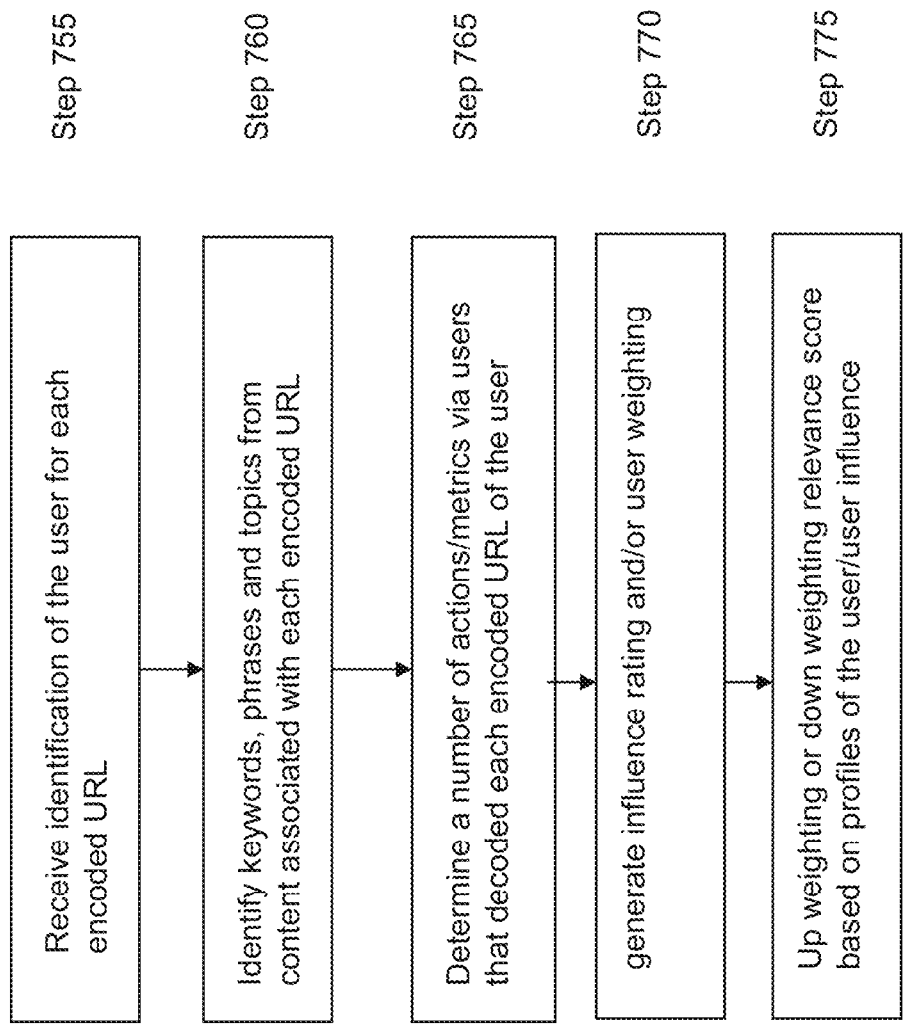
FIG. 7B is a flow diagram of an embodiment of a method for tracking influence of a user on content shared via encoded uniform resource locator (URL) links.

Referring now to FIG. 7B, a method for tracking influence of a user is depicted. In brief overview of the method at step 755, the system receives identification of the user for each encoded URL. At step 760, the system identifies keywords, phrases and topics from content associated with each encoded URL. At step 765, the system determines a number actions and other metrics via user uses the decoded each encoded URL of the user. At step 770, the system generates an influence rating and/or user weighting. At step 775, the system may up weight or down weight a relevance score based on a profile of the user, such as the user's influence rating.

In further details, at step 755, the system identifies the user encoding the URL. In some embodiments, the system identifies the user via a user id 345. In some embodiments, the system identifies the user via an account or login of the linking system 120. In some embodiments, the system identifies the user via a cookie 255. The system such as via the link encoder and user tracker may track each instance of the user encoding a link and store that information to the database 230 and/or to the user's profile 710. The system may track when the user encoded the link, what link was encoded and identification of the encoded link and store this information to the user's user profile.

At step 760, the system may identify keywords, phrases and/or topics from the content associated with, identified by or included in the URL or link encoded by the user. Each time the user encoded a link/URL, the system may identify keywords, phrases and topics for the encoded URL using any embodiments of the content extractor 315 and/or keyword extractor 515 described herein. In some embodiments, the content extractor 315 and/or keyword extractor may identify keywords, phrases and topics for content of or associated with the encoded URL. In some embodiments, the content extractor 315 and/or keyword extractor may identify keywords, phrases and topics upon the request to encode the URL or upon encoding the URL. The system may track when the keywords, phrases and/or topics of content of or from URLs that the user requests to encode and stores this information to the user user's user profile. The system may store this information in correlation with or association with the when the user encoded the link, what link was encoded and identification of the encoded link stored as part of step 760.

At step 765, the system may receive a plurality of click streams that identify user actions 250 with the encoded URL encoded by the user. The system, such as via the click tracker, may identify in the click streams requests to decode the encoded URL encoded by the user. The system, such as via the link decoder, may identify and track each time the encoded URL of the user is decoded. The system, such as via the click tracker, may identify the source of the user action to decode the encoded URL. For example, the system may identify the source IP address of the network traffic carrying the user action to decode the encoded URL. The system may identify the web-site, such as the social networking site, from which the network traffic carrying the user action to decode the encoded URL originated. The system may identify the web-site, such as the social networking site, from which user clicked on the encoded URL. The system may track the number of times the encoded URL of the user has been clicked. The system may track the number of different users that have clicked the encoded URL of the user. The system may track the number of different sources (e.g., web-sites) from which the encoded URL of the user was clicked. The system may track the number of different geographic locations from which the encoded URL of the user was clicked. The system may compute any metrics on the information such as averages, peaks, trends, minimums, maximums, etc. The system may store any of the identified or tracked information and any metrics thereof in the user's user profile.

The system may store any of the identified or tracked information and any metrics thereof in the user's user profile in correlation with or association with any of the information stored in the user's user profile via steps 760 and/or 765.

At step 770, the influence tracker may determine, generate or otherwise provide an influence rating for the user based on the information identified and tracked via steps 755, 760 and/or 765. The influence tracker may use the information stored in the user's profile to generate the influence rating. The influence tracker may receive the information from any one or more of the keyword extractor, click tracker and user tracker to generate the influence rating.

The influence tracker may generate the influence rating for the user as each click stream for an encoded URL of the user is received and analyzed. The influence tracker may generate the influence rating for any one or more users on a predetermined frequency, such as once per day. The influence tracker may generate the influence rating for a user on a per demand basis, such as upon receiving a request for the influence rating of a user specified by a user id. The influence tracker may store the generated influence rating in the user's user profile and update the influenced rating each time the influence tracker regenerates the influence rating.

At step 775, the influence rating of the user may influence or affect any relevance scores generated by any embodiments of the systems described herein. In some embodiments, a relevance based system queries the influence tracker to determine the influence rating of a user, such as via a request and response mechanism. In some embodiments, a relevance based system queries the user profile of a user to determine the influence rating of the user. In some embodiments, the relevance based system uses or applies the influence rating as a user weighting in determining a relevance score. In some embodiments, the relevance based system coverts or transforms the influence rating to a user weighting in determining a relevance score. In some embodiments, the relevance based system uses the influence rating to up weight or down weight a relevance score.

H. Systems and Methods for Providing a Recommended List of URLs Responsive to a URL Referring now to FIGS. 8A and 8B, systems and methods of embodiments of the present solution for providing a recommendation list of URLs or links given an input or URL link is depicted. Given an input of a link or URL (e.g., an input link), the present solution may provide an output of a list of recommended content in ranked order. In some embodiments, the present solution performs these systems and methods without any personal or other information about the user—the only input is a URL and the output is a list of URLs and in some embodiments, also a matching or recommendation score. The present solution maintains a click co-occurrence map, sometimes also referred to as click coherency map, to correlate all the users that clicked on the input link to the other links which have been clicked on by the users who also clicked on the input link. The click co-occurrence map may identify the largest number of those other links to which the users clicked and also clicked on the input link. The output may be filtered to be domain or content-site specific. In other embodiments, raw or unfiltered output may be useful to aggregators who may provide recommended content from a wider ser of content resources.

Figure 8A:
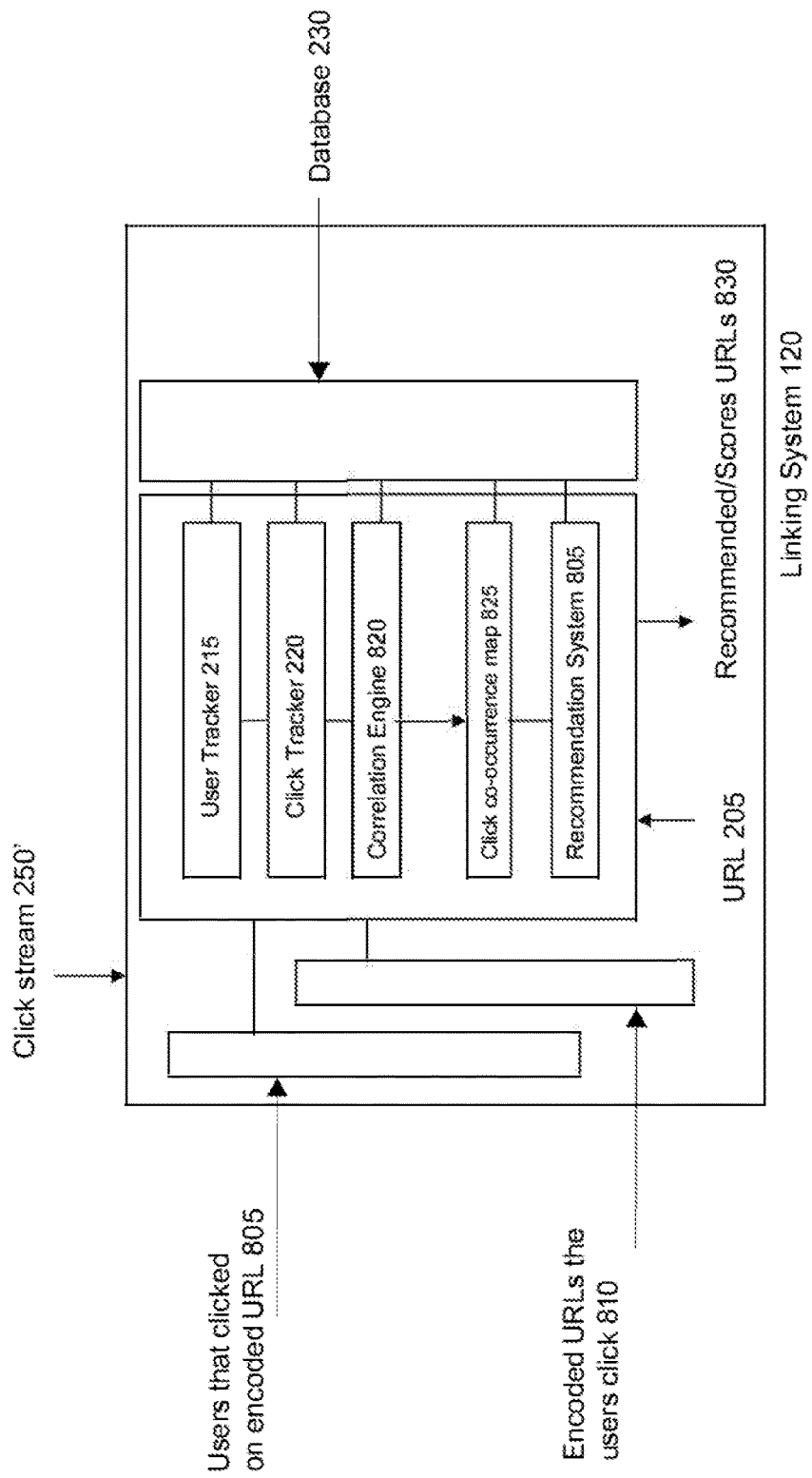
FIG. 8A is a block diagram of an embodiment of a system for providing a recommended list of uniform resource locators (URLs) responsive to a uniform resource locator (URL)

Referring now to FIG. 8A, an embodiment of a system for providing a recommendation list of URLs or links given an input or URL link is depicted. In brief overview, the system may include a user tracker 215, click tracker 220 and recommendation system 805. The system may also include a correlation engine 820 that maintains a click co-occurrence map 825 from click streams 250. The correlation engine may correlate via the click co-occurrence map users that clicked on an encoded URL 805 to other encoded URLS those users clicked on 810. The user tracker 215 may identify those who users clicked on the encoded URL 805 and who also clicked on other encoded URLs. The click tracker may identify the number of clicks on the encoded URL 805 and for each of the other encoded URLs the users clicked. The correlation engine may store the click co-occurrence map into a database 230. The recommendation system 805 may receive a URL 205 as input and output a set of URLs based on the click co-occurrence map 825.

The user tracker may comprise any embodiments of the user tracker 215 previously described herein. For any click stream 250' received by the system 120, the user tracker may identify the user who encoded the encoded URL and each of the other users who clicked on the encoded URL of the user. The click tracker may comprise any embodiments of the user tracker 215 previously described herein. For any click stream 250' received by the system 120, the user tracker may identify the number of users who encoded the same URL. For any click stream 250' received by the system 120, the click tracker may identify the number of users who clicked on the encoded URL of a user. The click tracker may identify for each user the number of encoded URLs that user clicked.

Via the user tracker and/or click tracker, the system identifies and tracks the users that clicked on an encoded URL 805. For each user tracked or managed by the system, the system may identify the other encoded URLs 810 that the same users who clicked the encoded URL 805 also clicked. The encoded URL 805 and the other encoded URLs 810 may be encoded URLs of any user. The encoded URL 805 and the other encoded URLs 810 may be encoded URLs of the system. The encoded URL 805 and the other encoded URLs 810 may identify or be associated with any content from any source. For each encoded URL 805, 810 tracked or managed by the system, the system may identify each of the users the clicked on each encoded URL. The system may identify each user via one or cookies. The system may identify each user via information sent with requests to decode the encoded URL. The system may identify each user via the user's account information for the system. In some embodiments, the system tracks the user id of the user who clicked on the encoded URL without tracking other user information. In some embodiments, the system may identify the source (e.g., web-site, social networking site, device, etc) from which the user clicked on the encoded URL, the time and/or geography from which the user clicked on the encoded URL. The system, such as via user tracker and click tracker, may store the users and number of clicks for the encoded URLs 805, 810 to the database 230.

The correlation engine 820 may comprise an application, program, library, service, script, process, task or any type and form of executable instructions executing or executable on a device. The correlation engine may comprise logic, function or operations to correlate any URL to a plurality of other URLs. The correlation engine may comprise logic, function or operations to correlate an encoded URL to a plurality of other encoded URLs. The correlation engine may comprise logic, function or operations to correlate the users the clicked on encoded URLs 805 to the encoded URLs 810 that the same users also clicked. The correlation engine may correlate URLs/encoded URLs to other URLs/encoded URLs based on the number of clicks. In some embodiments, the correlation engine may correlate URLs/encoded URLs to other URLs/encoded URL also based on the source of the clicks, the time of the clicks and/or the influence of the users or who performed the clicks.

The correlation engine 820 may be designed and constructed to generate and/or maintain a click co-occurrence map 825, sometimes referred to as a map. The click co-occurrence map may comprise any type and form of data structure, object, file, table(s) and/or arrangement of data stored in a database. The click co-occurrence map may identify or specify the correlation between URLs/encoded URLs to other URLs/encoded URLs. The click co-occurrence map may identify or specify the encoded URLs 810 for which the users who clicked on the encoded URL 805 also clicked. For each encoded URL 810, the click co-occurrence map may identify or track the number of such users who clicked both the encoded URL 805 and each encoded URL 810. For each of the other encoded URLs, the correlation engine may correlate the users and numbers of clicks on these encoded URLS and further encoded URLs those same users also clicked. In some embodiments, the correlation engine may maintain a click co-occurrence map for a plurality of depths or levels.

In some embodiments, a click co-occurrence map comprises a table, or any programmatic representation thereof, that identifies along one axis, such as the vertical axis, a list of the content the tracked users interacted with and along another axis, such as horizontal axis, each user. The table may identify or indicate for each user in the horizontal axis which content in the list of content in the vertical axis that the user has interacted with (e.g. clicked on). From such a table, the system can identify users who have interacted with the same content (e.g., similar interests). The system can also identify for users with similar interests what content one user may have interacted with or have interest in that the other user has not yet seen or interacted with. By the system performing comparison of similarities and differences between users in the map, the system may make recommendations of content for a particular user.

For each encoded URL 810, the click co-occurrence map may use any number of thresholds to determine whether or not the other encoded URLs has been clicked enough times or by enough users to be put or maintained within the map. For each encoded URL 810, the click co-occurrence map may use any temporal thresholds to determine whether or not the other encoded URLs 810 are put or maintained within the map. For each encoded URL 810, the click co-occurrence map may use any user influence or user weighting to determine whether or not the other encoded URLs 810 are put or maintained within the map. For each encoded URL 810, the click co-occurrence map may use any content relevancy score to determine whether or not the other encoded URLs 810 are put or maintained within the map. For each encoded URL 810, the click co-occurrence map may use any trending score to determine whether or not the other encoded URLs 810 are put or maintained within the map.

The correlation engine may generate and/or maintain a plurality of click co-occurrence maps. The correlation engine may generate and/or maintain a click co-occurrence map corresponding to each encoded URL 805. The correlation engine may generate and/or maintain a click co-occurrence map for a set of encoded URLs 805. The index to a click co-occurrence map may be an URL or encoded URL. The correlation engine may generate and/or maintain a single click co-occurrence map for all the encoded URLs.

The recommendation system 805 may comprise an application, program, library, service, script, process, task or any type and form of executable instructions executing or executable on a device. The recommendation engine may comprise logic, function or operations to provide a recommendation of one of more other URLs given a URL as input. The recommendation engine may comprise logic, function or operations to analyze the click co-occurrence map to determine similarities and/or difference between users in what content users have interacted with or co-clicked and what content users may not have not co-clicked. The recommendation system 805 may comprise any embodiments of the relevance system 405 described herein. The recommendation system may be designed and constructed to receive a URL 205 as input and to produce a set of one or more URLS 820 as output, such as based on the click co-occurrence map.

For any output URL, the recommendation system may provide a score, such as a recommendation or matching score, based on the level of matching via the co-occurrence map. The score may indicate or identify the number of click co-occurrences for the URL in the click co-occurrence map. The recommendation score may indicate the number of other users with similar click history or behavior who also clicked on the recommended output URL. In some embodiments, the recommendation score may be an order or ranking of the URL in the list of recommended URLs. In some embodiments, the score may be a relevance score if a user is specified with the URL input.

The recommendation system may comprise any type and form of interface to receive a URL 205, such as a graphical user, command line interface or programmatic interface. In some embodiments, the programmatic interface of the relevance system 405 may comprise an API, web-service or request/response mechanism. In some embodiments, the recommendation system may receive a plurality of URLs in a single request. In some embodiments, the recommendation system may receive an encoded URL and decodes the encoded URL.

The recommendation system, such as a responsive to receipt of a URL 205, may be designed and constructed to read, process or query a click co-occurrence map for or corresponding to the URL. The recommendation system may obtain or retrieve via the database a corresponding click co-occurrence map, such as by using the input URL as an index for retrieval. Via the click co-occurrence map, the recommendation system may identify or query the URLs that are mapped to the input URL. The recommendation system may output the set of mapped URLs 830 via any the interface, such as displaying via a graphical user interface, output via a command line interface or via a response of a programmatic interface. The recommendation system may rank the mapped URLs by the number of clicks on the mapped URLs. The recommendation system may output an enumeration of URLs 830 by ranking.

The recommendation system may filter any of the ranked or unranked URLs 830 based on a number of clicks threshold. The recommendation system may filter any of the ranked or unranked URLs 830 based on domain filtering. The recommendation system may filter any of the ranked or unranked URLs 830 using content based or content specific filtering. In some embodiments, if a user is also specified with the URL input, the recommendation system may also provide a relevance score for each of the URLs 830 by using any of the relevance scoring systems, methods and techniques previously described herein.

Figure 8B:
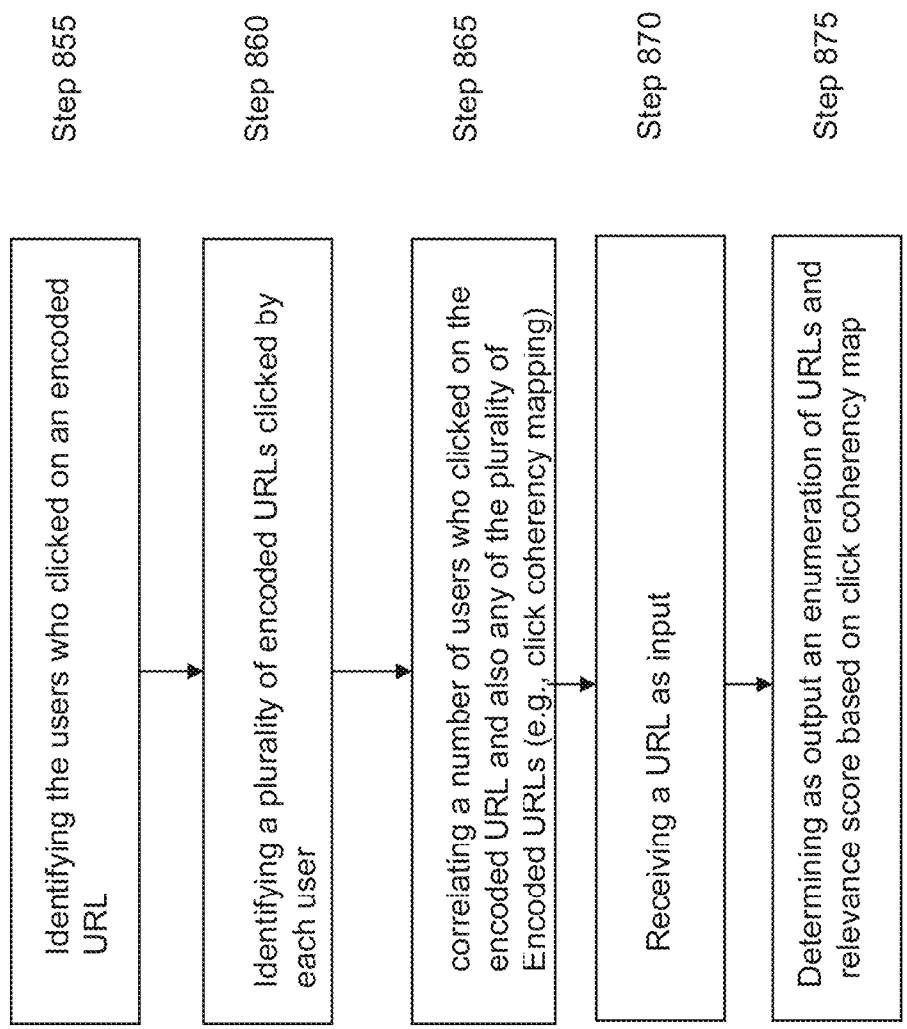
FIG. 8B is a flow diagram of an embodiment of a method for providing a recommended list of uniform resource locators (URLs) responsive to a uniform resource locator (URL).

Referring now to FIG. 8B, an embodiment of a method for providing a recommendation list of URLs or links given an input or URL link is depicted. In brief overview, at step 855, the system, such as any embodiments of linking system 120, identifies the users who clicked on an encoded URL. At step 860, the system identifies the plurality of other encoded URLs those users clicked on. At step 865, the system generates a click co-occurrence map, such as to correlate the encoded URL of step 855 to the plurality of other encoded URLs clicked by each user at step 860 who also clicked the encoded URL. At step 870, the system received a URL as input and at step 875, as output, the system provides an enumeration of recommended URLs based on a click co-occurrence map. In some embodiments, the output may also include a ranking and/or recommendation score.

At step 855, the system identifies each of the users who clicked on an encoded URL 805, requested to decode an encoded URL 805 or otherwise interacted with the encoded URL or corresponding URL. For each click stream and/or decoding of the encoded URL, the system may track for each encoded URL the users who clicked on the encoded URL. The system may identify each user via a user id 345. In some embodiments, the system identifies the user via an account or login of the linking system 120. In some embodiments, the system identifies the user via a cookie 255. The system such as via the link encoder and user tracker may track each instance of the user decoding an encoded link and store that information to the database 230 and/or to the user's profile 710. The system may track when the user decoded the link, what encoded link was decoded and identification of the link and store this information to the database, such as in the user's user profile.

At step 860, for each of the users identified as clicking on the encoded URL 805, the system identifies the other encoded URLs 810 those users also clicked or have clicked. The system via user tracker and click tracker may store in the database a history of encoded URLs each of the users have previously clicked on. The system may also continue to track, such as in real-time, the encoded URLs each of the users are clicking on. For each click stream and/or decoding of an encoded URL, the system may track by user the encoded URLs that user has clicked on. The system may track and store in the user's user profile any information identifying the encoded URLs/URLs that user has clicked on or otherwise interacted with.

At step 865, the system correlates the user and click tracking information, such as the user and click information obtained via steps 855 and 860 to generate and/or maintain one or more click co-occurrence maps. For each encoded URL 805 and for each of the users that clicked on or interacted with each encoded URL 805, the system may identify the other encoded URLs 810 that user also clicked on or interacted with. For each encoded URL 810, the click co-occurrence map may identify or track the number of such users who clicked both the encoded URL 805 and each encoded URL 810. The system may maintain a click co-occurrence map to correlate each encoded URL/URL 805 to the other encoded URLs/URLs 810. The system may maintain a separate click co-occurrence map for each encoded URL/URL. The system may maintain a click co-occurrence map for all encoded URL/URLs that is indexed by or organized by encoded URL. The system may update the click co-occurrence map upon processing each click stream. The system may update the click co-occurrence map upon decoding each encoded URL.

At step 870, the system receives an input identifying or comprising a URL. The system may receive the input via a request. The system may receive the URL as input via a graphical user interface. The system may receive the URL as input via a command line interface. The system may receive the URL as input via a programmatic interface. For example, the system may receive the URL as input via an API call, such as a web service call. The system may receive the URL as input via an HTTP request. The system may receive the URL as input from any component of the linking system 120. The system may receive the URL as input from any third party system, including applications, servers and systems. The system may receive the URL as input from a web page, script or other executable instructions executing on a web page or web server. The system may receive the URL as input from any type and form of mobile application executing on a mobile device, such as a smart phone.

The system may also receive with the URL input or otherwise associated with a request, any one or more parameters for filtering the output. These parameters may include geography information. These parameters may include language information or identification. These parameters may include identification or specification of domain filters and/or content filters. These parameters may include identification or specification of any thresholds, such as number of recommended URLs. These parameters may include identification or specification of a ranking or ordering of the output. These parameters may include identification or specification of providing or generating a score for the URLs in output, such as using any of the relevance scoring techniques described herein.

At step 875, the system provides as output 830 one or more URLs. The system may provide the output responsive to receipt of the URL 805 as input. The system may use the input URL to retrieve, lookup, query or obtain a click co-occurrence map, such as from database 230, for or corresponding to the input URL. Via the click co-occurrence map, the system may identify a plurality of encoded URLs clicked on by users who also clicked on the input URL. Via the click co-occurrence map, the system may determine a plurality of encoded URLs clicked on by the largest number of users who also clicked on the input URL. The system may provide the output 830 via a graphical user interface or command line interface. The system may provide the output 830 as a response to a request, such as an HTTP response to an HTTP request. The system may provide the output 830 as a response or data structure to an API call. The system may provide the output as an enumerated list of URLs. The system may provide the output as an enumerated list of URLs ranked in order based on number of user interactions/clicked and/or relevance.

The system may apply any filtering, such as domain or content filtering, based on any filtering parameters specified via the input or request. For example, the system may exclude URLs from the output that match or correspond to a domain. In another example, the system may exclude URLs from the output that link to or comprise content corresponding to or having keywords corresponding to specified content. The system may apply any threshold based on any threshold parameters specified via the input or request. For example, the system may provide as output a top 10 ranking of URLs. In another example, the system may provide an output of URLs that had at least a predetermined number of clicks (e.g., 100, 1000, etc). As may be requested via the input or the request or otherwise as a default, the system may determine or provide a score with each URL 830 in the output. The system may give each URL in the output a score based on the level or degree of matching or recommendation from analysis of the click co-occurrence map. If a user is specified with the input URL, the system may give each URL in the output a score based on any of the relevance scoring techniques described herein.

It should be understood that any of the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA or in any script language, such as Python or TCL. The software programs may be stored on or in one or more articles of manufacture as object code.

While various embodiments of the methods and systems have been described, these embodiments are exemplary and in no way limit the scope of the described methods or systems.

Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method of scoring relevance of content, the method comprising:

generating, by at least one server having one or more processors, responsive to requests for encoded links for a user, (i) a first encoded link to access a first resource of a first destination server via the at least one server and (ii) a second encoded link to access a second resource of a second destination server via the at least one server;

classifying, by the at least one server, the first resource and the second resource to a topic based on first content of the first resource accessible via the first encoded link and second content of the second resource accessible via the second encoded link;

maintaining, by the at least one server, responsive to classification, a relevance score indicating a degree of relevance between the topic and the user;

identifying, by the at least one server, a first event performed by the user to share the first encoded link generated by the at least one server;

identifying, by the at least one server, a second event performed by the user to share the second encoded link generated by the at least one server; and updating, by the at least one server, the relevance score for the user based on identifying the first event to share the first encoded link and the second event to share the second encoded link.

2. The method of claim 1, further comprising receiving, by the at least one server, a resource identifier referencing the resource and a user identifier referencing the user, and wherein maintaining the relevance score further comprises generating the relevance score responsive to receiving the resource identifier and the user identifier.

3. The method of claim 1, further comprising generating, by the at least one server, a data score for the relevance score based on an amount of data used to generate the relevance score, the data score indicating a degree of validity of the relevance score.

4. The method of claim 1, wherein identifying the first event further comprises receiving an identification of the first event of the user corresponding to sharing at least a portion of content from the resource via a content platform.

5. The method of claim 1, wherein classifying the first resource and the second resource to the topic further comprises extracting a keyword from a plurality of keywords on the resource in accordance with a list of keywords to identify.

6. The method of claim 1, further comprises determining, by the at least one server, a classification based on a plurality of events of the user with the encoded link to access the resource.

7. The method of claim 1, further comprising determining, by the at least one server, a classification for the first event including at least one of: a topical category, a user segment category, an action type category, and a link address category.

8. The method of claim 1, wherein updating the relevance score further comprises applying a model to a plurality of events of the user associated with the topic to generate the relevance score.

9. The method of claim 1, wherein identifying the first event further comprises identifying the first event performed by the user with the first encoded link to access the first resource using a cookie associated with the user, the first encoded link corresponding to a shortened version of a link to the first resource.

10. The method of claim 1, further comprising providing, by the at least server to a content selection service, the relevance score to select supplemental content to add to a third resource for the user.

11. A system for scoring relevance of content, the system comprising:

at least one server having one or more processors, configured to:

generate, responsive to requests for encoded links for a user, (i) a first encoded link to access a first resource of a first destination server via the at least one server and (ii) a second encoded link to access a second resource of a second destination server via the at least one server;

classify the first resource and the second resource to a topic based on first content of the first resource accessible via the first encoded link and second content of the second resource accessible via the second encoded link;

maintain, responsive to classification, a relevance score indicating a degree of relevance between the topic and the user;

identify a first event performed by the user to share the first encoded link generated by the at least one server;

identify a second event performed by the user to share the second encoded link generated by the at least one server; and update the relevance score for the user based on identification of the first event to share the first encoded link and the second event to share the second encoded link.

12. The system of claim 11, wherein the at least one server is further configured to:

receive a resource identifier referencing the resource and a user identifier referencing the user, and maintain the relevance score responsive to receiving the resource identifier and the user identifier.

13. The system of claim 11, wherein the at least one server is further configured to generate a data score for the relevance score based on an amount of data used to generate the relevance score, the data score indicating a degree of validity of the relevance score.

14. The system of claim 11, wherein the at least one server is further configured to receive an identification of the first event of the user corresponding to sharing at least a portion of content from the resource via a content platform.

15. The system of claim 11, wherein the at least one server is further configured to extract a keyword from a plurality of keywords on the resource in accordance with a list of keywords to identify.

16. The system of claim 11, wherein the at least one server is further configured to determine a classification based on a plurality of events of the user with the encoded link to access the resource.

17. The system of claim 11, wherein the at least one server is further configured to determine a classification of the first event including at least one of: a topical category, a user segment category, an action type category, and a link address category.

18. The system of claim 11, wherein the at least one server is further configured to apply a model a plurality of events of the user associated with the topic to update the relevance score.

19. The system of claim 11, wherein the at least one server is further configured to identify the first event performed by the user with the first encoded link to access the resource using a cookie associated with the user, the first encoded link corresponding to a shortened version of a link to the first resource.

20. The system of claim 11, wherein the at least one server is further configured to provide, to a content selection service, the relevance score to select supplemental content to add to a third resource for the user.

\* \* \* \* \*